United States Patent
Taki et al.

(10) Patent No.: US 11,242,087 B2
(45) Date of Patent: Feb. 8, 2022

(54) MOTOR CONTROL APPARATUS, MOTOR DRIVE SYSTEM, AND MOTOR CONTROL METHOD

(71) Applicant: DENSO CORPORATION, Kariya (JP)

(72) Inventors: Masaya Taki, Kariya (JP); Shuji Kuramitsu, Kariya (JP); Koichi Nakamura, Kariya (JP); Toshimitsu Sakai, Kariya (JP)

(73) Assignee: DENSO CORPORATION, Kariya (JP)

( * ) Notice: Subject to any disclaimer, the term of this patent is extended or adjusted under 35 U.S.C. 154(b) by 430 days.

(21) Appl. No.: 16/243,460

(22) Filed: Jan. 9, 2019

(65) Prior Publication Data
US 2019/0144028 A1 May 16, 2019

Related U.S. Application Data

(63) Continuation of application No. PCT/JP2017/024902, filed on Jul. 7, 2017.

(30) Foreign Application Priority Data

| Jul. 11, 2016 | (JP) | JP2016-136611 |
| Feb. 27, 2017 | (JP) | JP2017-35042 |
| Jun. 19, 2017 | (JP) | JP2017-119859 |

(51) Int. Cl.
*B62D 5/04* (2006.01)
*G06F 1/12* (2006.01)
(Continued)

(52) U.S. Cl.
CPC ........ *B62D 5/0463* (2013.01); *B62D 5/0403* (2013.01); *B62D 5/0412* (2013.01);
(Continued)

(58) Field of Classification Search
CPC ..... B62D 5/0481; B60W 50/02; B60W 50/04; G05B 23/00; G05B 2219/24002;
(Continued)

(56) References Cited

U.S. PATENT DOCUMENTS

| 5,777,870 A | 7/1998 | Takaku et al. |
| 2011/0234137 A1 | 9/2011 | Imamura et al. |

(Continued)

FOREIGN PATENT DOCUMENTS

| JP | 2011-148498 A | 8/2011 |
| JP | 2011148498 A * | 8/2011 |

(Continued)

OTHER PUBLICATIONS

International Search Report; International Application No. PCT/JP2017/024902; dated Sep. 26, 2017; 4 pages.
(Continued)

*Primary Examiner* — Aniss Chad
*Assistant Examiner* — Elijah W. Vaughan
(74) *Attorney, Agent, or Firm* — Maschoff Brennan

(57) ABSTRACT

A synchronization signal generating portion of a transmitter microcomputer generates a synchronization signal that is synchronized with a drive timing of the own microcomputer and also causes to synchronize the drive timing of microcomputers, and transmits to a receiver microcomputer. A timing corrector of the receiver microcomputer is capable of correcting the drive timing of the own microcomputer so as to synchronize with the received synchronization signal, and includes a timing determiner which determines whether the received synchronization signal is normal or abnormal. The receiver microcomputer permits the timing correction if the synchronization signal is determined to be normal in the timing determination, and prohibits timing correction and drives the motor asynchronously with the transmitter micro- (Continued)

computer if the synchronization signal is determined to be abnormal.

36 Claims, 40 Drawing Sheets

(51) Int. Cl.
| | |
|---|---|
| *B62D 6/08* | (2006.01) |
| *H02P 25/03* | (2016.01) |
| *H02P 25/22* | (2006.01) |
| *H02P 27/08* | (2006.01) |
| *G06F 1/06* | (2006.01) |
| *G06F 9/4401* | (2018.01) |

(52) U.S. Cl.
CPC ......... *B62D 5/0457* (2013.01); *B62D 5/0481* (2013.01); *B62D 6/08* (2013.01); *G06F 1/12* (2013.01); *H02P 25/03* (2016.02); *H02P 25/22* (2013.01); *G06F 1/06* (2013.01); *G06F 9/4401* (2013.01); *H02P 27/08* (2013.01)

(58) Field of Classification Search
CPC ........... G05B 2219/24186; G05B 2219/25041; G05B 2219/25047
See application file for complete search history.

(56) References Cited

U.S. PATENT DOCUMENTS

| | | |
|---|---|---|
| 2014/0062375 A1 | 3/2014 | Suzuki |
| 2014/0253006 A1 | 9/2014 | Satou et al. |

FOREIGN PATENT DOCUMENTS

| | | | |
|---|---|---|---|
| JP | 5412095 B2 * | 2/2014 | .............. H02P 27/08 |
| JP | 5412095 B2 | 2/2014 | |
| JP | 5672278 B2 | 2/2015 | |
| WO | 2018/012417 A1 | 1/2018 | |

OTHER PUBLICATIONS

U.S. Appl. No. 16/243,519 and its entire file history, filed Jan. 9, 2019, Sakai, et al.
U.S. Appl. No. 16/243,503 and its entire file history, filed Jan. 9, 2019, Taki, et al.

\* cited by examiner

MOTOR CONTROL APPARATUS, MOTOR DRIVE SYSTEM, AND MOTOR CONTROL METHOD

CROSS REFERENCE TO RELATED APPLICATIONS

The present application is a continuation application of International Patent Application No. PCT/JP2017/024902 filed on Jul. 7, 2017, which designated the U.S. and claims the benefit of priority from Japanese Patent Application No. 2016-136611 filed on Jul. 11, 2016, Japanese Patent Application No. 2017-35042 filed on Feb. 27, 2017, and Japanese Patent Application No. 2017-119859 filed on Jun. 19, 2017. The entire disclosures of all of the above applications are incorporated herein by reference.

TECHNICAL FIELD

The present disclosure relates to a motor control apparatus including multiple microcomputers that control drive of a motor, a motor drive system including the motor control apparatus, and a motor control method.

BACKGROUND

A motor control apparatus includes multiple microcomputers that is provided redundantly, drive-controls a motor, and operates in accordance with clocks. In a case where all the microcomputers are operated with a single clock generation circuit, motor drive is stopped when the clock generation circuit is in failure. Provision of the clock generation circuits independently for the respective microcomputers may improve reliability.

SUMMARY

A motor control apparatus according to a present disclosure includes multiple motor drive circuits, multiple microcomputers, and multiple clock generation circuits.

The multiple motor drive circuits drives one or more motors each including multiple coil sets.

The multiple microcomputers include a drive signal generator and a drive timing generator. The drive signal generator generates a motor drive signal as a command to each of the motor drive circuits. The drive timing generator generates drive timing as pulse timing of the motor drive signal.

The multiple clock generation circuits independently generate clocks as operation reference of the multiple microcomputers.

Each clock generation circuit, each microcomputer, and each motor drive circuit are provided in association with one another. The constituent elements in each system control electrification to a corresponding one of the coil sets to allow the motor control apparatus to drive the motor.

BRIEF DESCRIPTION OF DRAWINGS

The above object, other objects, features, and advantages of the present disclosure will be further clarified in the following detailed description with reference to the accompanying drawings. The drawings include.

DETAILED DESCRIPTION

A motor control apparatus according to each of multiple embodiments will be described with reference to the drawings. An EPS-ECU as the "motor control apparatus" according to each of the embodiments is included in an electric power steering apparatus of a vehicle, and controls electrification of a motor that outputs steering assist torque. The EPS-ECU and the motor configure a "motor drive system".

Substantially identical configurations among the multiple embodiments will be denoted by an identical reference sign and will not be described repeatedly. Each of the following first to sixth embodiments will inclusively be referred to as "the present embodiment".

A configuration of the electric power steering apparatus, a configuration of the motor drive system or the like to be adopted will initially be described as common matters according to each of the embodiments with reference to FIGS. 1 to 6.

Figure 1:
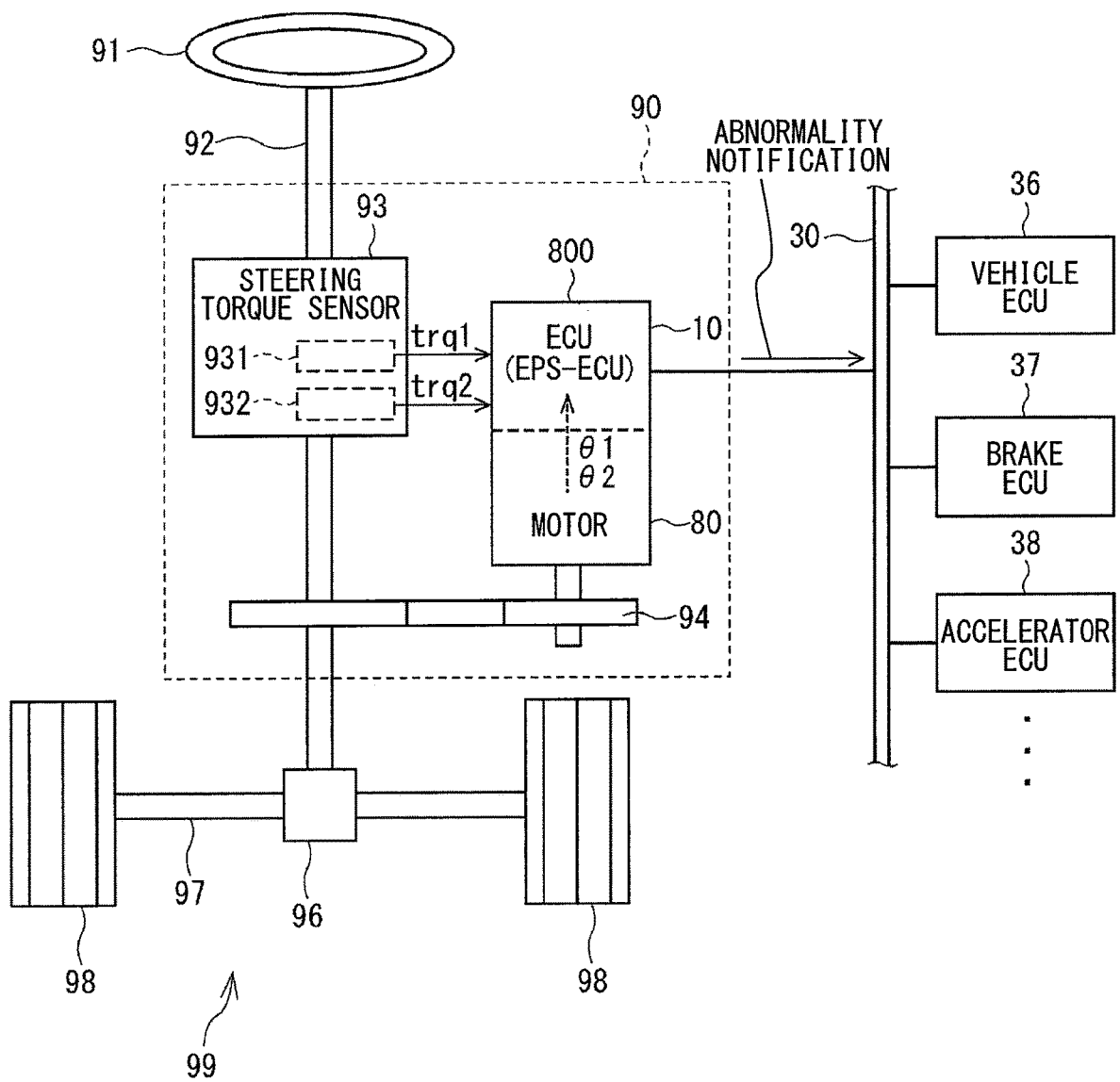
FIG. 1 is a diagram showing a configuration of an electric power steering apparatus including an ECU according to each embodiment functioning as a mechatronically integrated motor drive system.
Figure 2:
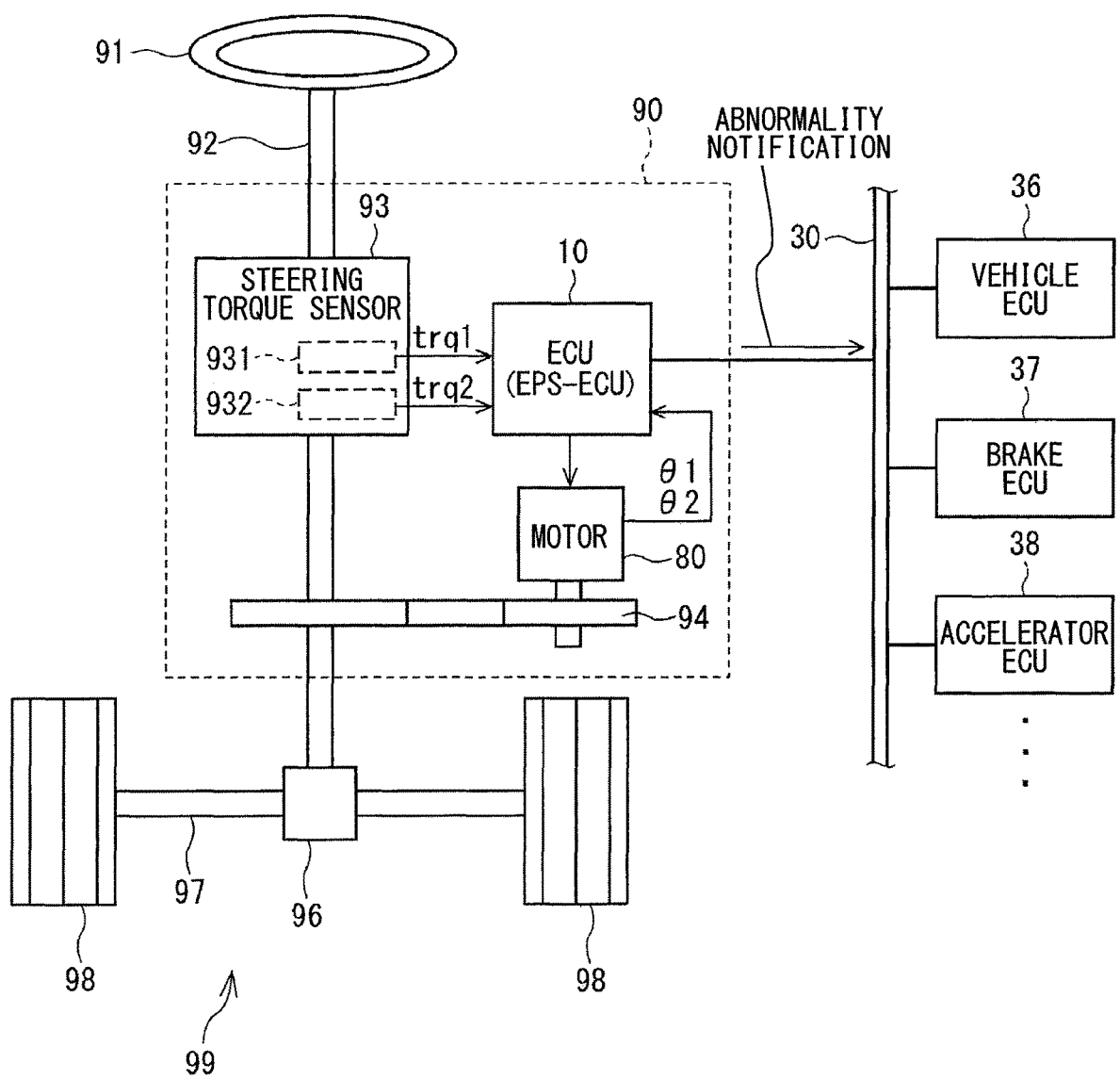
FIG. 2 is a diagram showing configuration of an electric power steering apparatus including the ECU according to each embodiment functioning as a mechatronically separate motor drive system.

FIGS. 1 and 2 depict an entire configuration of a steering system 99 including an electric power steering apparatus 90. FIG. 1 depicts a "mechatronically integrated" configuration including an EPS-ECU 10 integrally provided at an axial end of a motor 80. FIG. 2 depicts a "mechatronically separate" configuration including the EPS-ECU 10 and the motor 80 connected via a harness. The electric power steering apparatus 90 depicted in FIGS. 1 and 2 is of a column assist type. These configurations are similarly applicable to an electric power steering apparatus of a rack assist type.

The steering system 99 includes a steering wheel 91, a steering shaft 92, a pinion gear 96, a rack shaft 97, wheels 98, the electric power steering apparatus 90, or the like.

The steering shaft 92 is connected to the steering wheel 91. The pinion gear 96 is provided at a distal end of the steering shaft 92 and meshes with the rack shaft 97. The rack shaft 97 has two ends provided with a pair of wheels 98 via tie rods, respectively. When a driver turns the steering wheel 91, the steering shaft 92 connected to the steering wheel 91 is rotated. The pinion gear 96 converts rotary motion of the steering shaft 92 to linear motion of the rack shaft 97. The pair of wheels 98 is steered at an angle according to the amount of displacement of the rack shaft 97.

The electric power steering apparatus 90 includes a steering torque sensor 93, the EPS-ECU 10, the motor 80, a reduction gear 94, and the like.

The EPS-ECU 10 is communicable with "other control devices in the vehicle" such as a vehicle ECU 36, a brake ECU 37, and an accelerator ECU 38, via a bus of a CAN 30 or the like. The EPS-ECU 10 notifies other ECUs in the vehicle of abnormality in a procedure upon abnormality to be described later. In the description of the embodiments, the EPS-ECU 10 will simply be called the "ECU 10" whereas the other ECUs such as the vehicle ECU 36 will be each called "other ECU in the vehicle".

The steering torque sensor 93 is provided at an intermediate portion on the steering shaft 92 and detects steering torque of the driver. The steering torque sensor 93 according to the modes depicted in FIGS. 1 and 2 is duplicated to include a first torque sensor 931 and a second torque sensor 932 and dually detect first steering torque trq1 and second steering torque trq2.

If the steering torque sensor is not provided redundantly, a single detection value of steering torque trq can commonly be applied to two systems. In a case where adoption of the steering torque trq1 and the steering torque trq2 detected redundantly is not specifically meaningful hereinafter, the steering torque trq1 and the steering torque trq2 will collectively be referred to as the single steering torque trq.

The ECU 10 drive-controls the motor 80 in accordance with the steering torque trq1 and the steering torque trq2 to cause the motor 80 to generate desired assist torque. The assist torque outputted from the motor 80 is transmitted to the steering shaft 92 via the reduction gear 94.

The ECU 10 acquires electrical angles θ1 and θ2 of the motor 80 detected by rotation angle sensors, and the steering torque trq1 and the steering torque trq2 detected by the steering torque sensor 93. The ECU 10 drive-controls the motor 80 in accordance with the above information and information such as motor current internally detected in the ECU 10.

Figure 3:
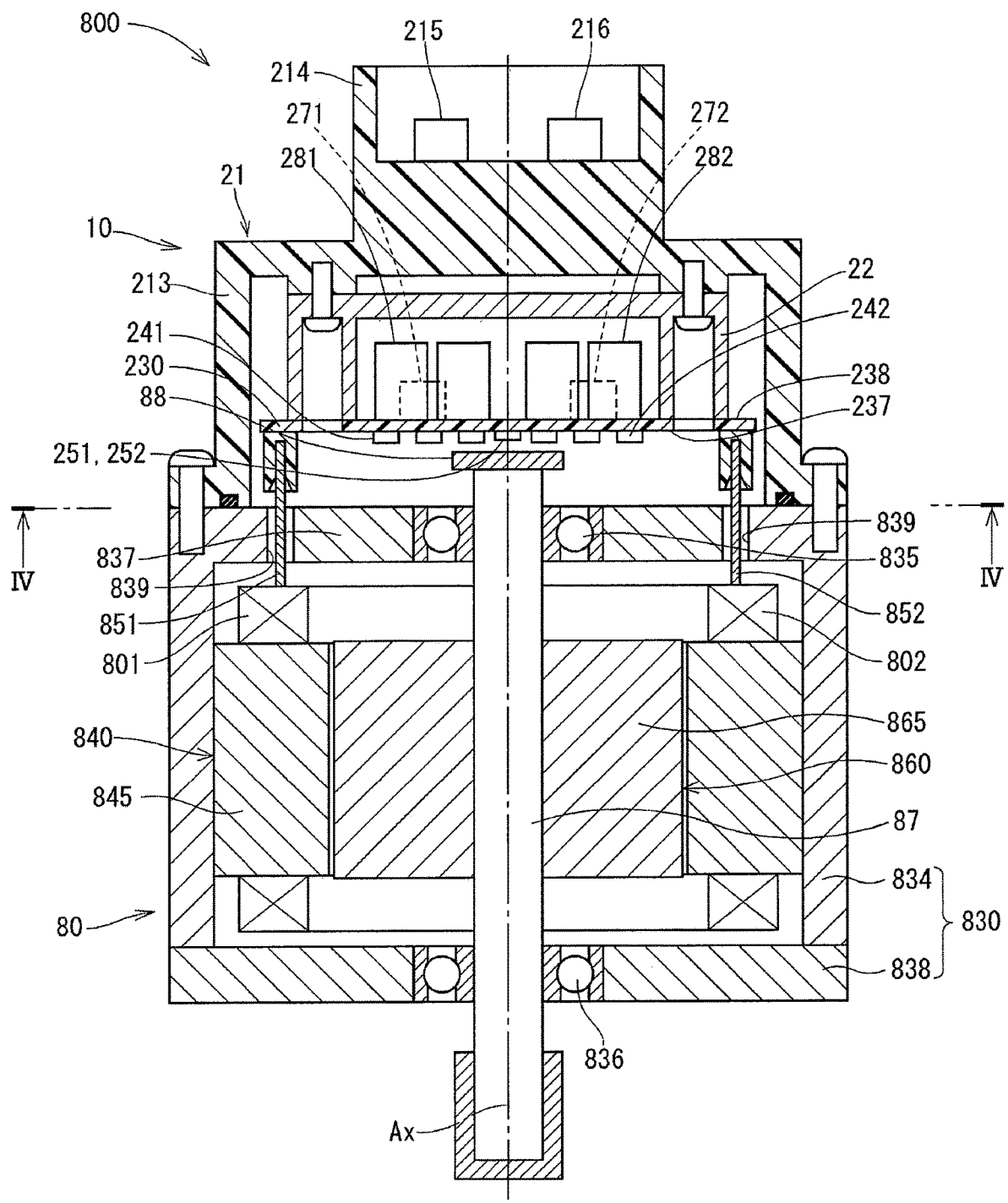
FIG. 3 is an axially sectional view of a dual-system mechatronically integrated motor.
Figure 4:
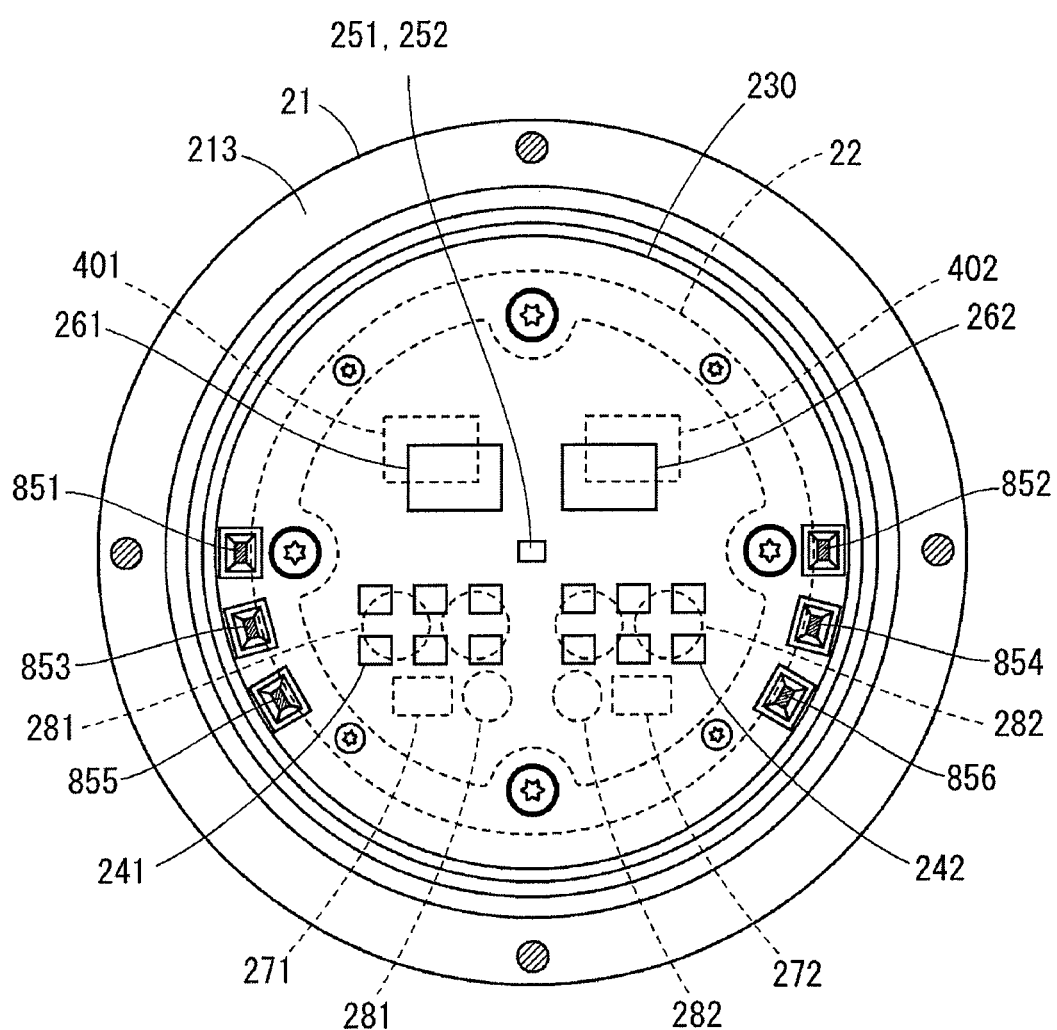
FIG. 4 is a sectional view taken along line IV-IV indicated in FIG. 3.

A configuration of a mechatronically integrated motor 800 including the motor 80 and the ECU 10 integrally provided at an axial end of the motor 80 will be described with reference to FIGS. 3 and 4. The ECU 10 according to the mode depicted in FIG. 3 is disposed opposite to an output end of the motor 80 to be coaxial with an axis Ax of a shaft 87. The ECU 10 according to another embodiment may be disposed at the output end of the motor 80 to be integral to the motor 80.

The motor 80 is a three-phase brushless motor, and includes a stator 840, a rotor 860, and a housing 830 accommodating the stator 840 and the rotor 860.

The stator 840 includes a stator core 845 fixed to the housing 830, and two three-phase coil sets 801 and 802 assembled to the stator core 845. The first coil set 801 includes respective-phase coils having lead wires 851, 853, and 855 extending therefrom. The second coil set 802 includes respective-phase coils having lead wires 852, 854, and 856 extending therefrom.

The rotor 860 includes the shaft 87 supported by a rear bearing 835 and a front bearing 836, and a rotor core 865 into which the shaft 87 is fitted. The rotor 860 is provided inside the stator 840 and is rotatable relatively to the stator 840. The shaft 87 has an end provided with a permanent magnet 88.

The housing 830 includes a case 834 having a bottomed tubular shape and including a rear frame end 837, and a front frame end 838 provided at an end of the case 834. The case 834 and the front frame end 838 are fastened to each other by a bolt or the like. The lead wires 851, 852, and the like of the coil sets 801 and 802 extend toward the ECU 10 through a lead wire insertion hole 839 provided in the rear frame end 837 to be connected to a substrate 230.

The ECU 10 includes a cover 21, a heat sink 22 fixed to the cover 21, the substrate 230 fixed to the heat sink 22, and various electronic components mounted to the substrate 230. The cover 21 protects the electronic components from external impact, and prevents entry of dust, water, and the like into the ECU 10.

The cover 21 includes an external connector portion 214 with an external power feeder cable and an external signal cable, and a cover portion 213. The external connector portion 214 has power feed terminals 215 and 216 each connected to the substrate 230 via a path (not depicted).

The substrate 230 is exemplified by a printed circuit board, which is positioned to face the rear frame end 837 and is fixed to the heat sink 22. The substrate 230 is provided with the electronic components for the two systems independently from each other, to form fully redundant configurations. The present embodiment provides the single substrate 230, but another embodiment may provide two or more substrates.

The substrate 230 has two principal surfaces including a motor surface 237 facing the rear frame end 837 and a cover surface 238 being opposite to the motor surface 237 and facing the heat sink 22.

The motor surface 237 is mounted with multiple switching elements 241 and 242, rotation angle sensors 251 and 252, custom ICs 261 and 262, and the like.

The multiple switching elements 241 and 242 according to the present embodiment includes six switching elements for each of the systems, and configures three-phase upper and lower arms of motor drive circuits. The rotation angle sensors 251 and 252 are disposed to face the permanent magnet 88 provided at a distal end of the shaft 87. The custom ICs 261, 262 and the microcomputers 401, 402 have a control circuit of the ECU 10. The custom ICs 261 and 262 are provided with clock monitoring portions 661 and 662, and the like depicted in FIG. 7 and the like. A microcomputer may be referred to as a microcontroller.

The cover surface 238 is mounted with the microcomputers 401 and 402, capacitors 281 and 282, inductors 271 and 272, and the like. The first microcomputer 401 and the second microcomputer 402 are particularly disposed, with a predetermined space provided therebetween, on the cover surface 238 as an identical surface of the identical substrate 230.

The capacitors 281 and 282 smooth electric power supplied from a power source and prevent noise outflow due to switching operation or the like of the switching elements 241 and 242. The inductors 271 and 272 and the capacitors 281 and 282 configure a filter circuit.

Figure 5:
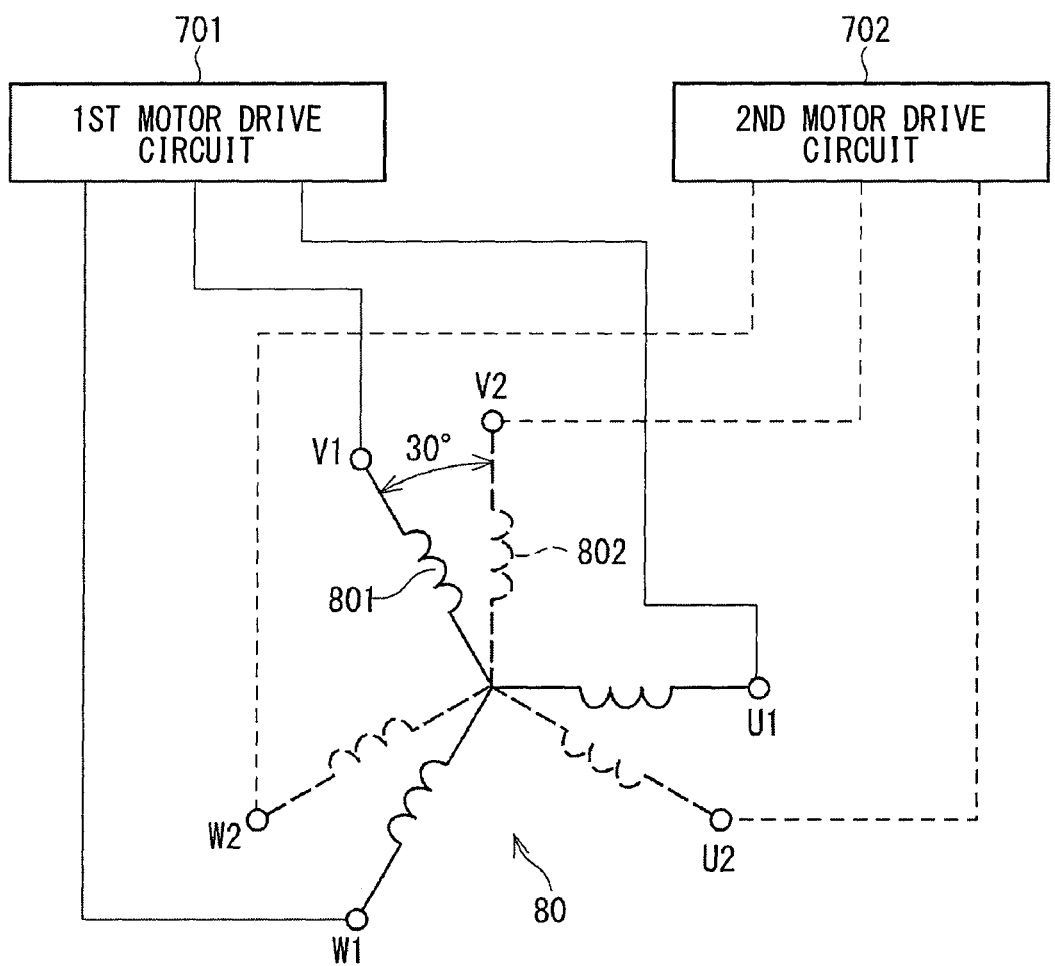
FIG. 5 is a diagram schematically showing a configuration of a multiphase coaxial motor.
Figure 6:
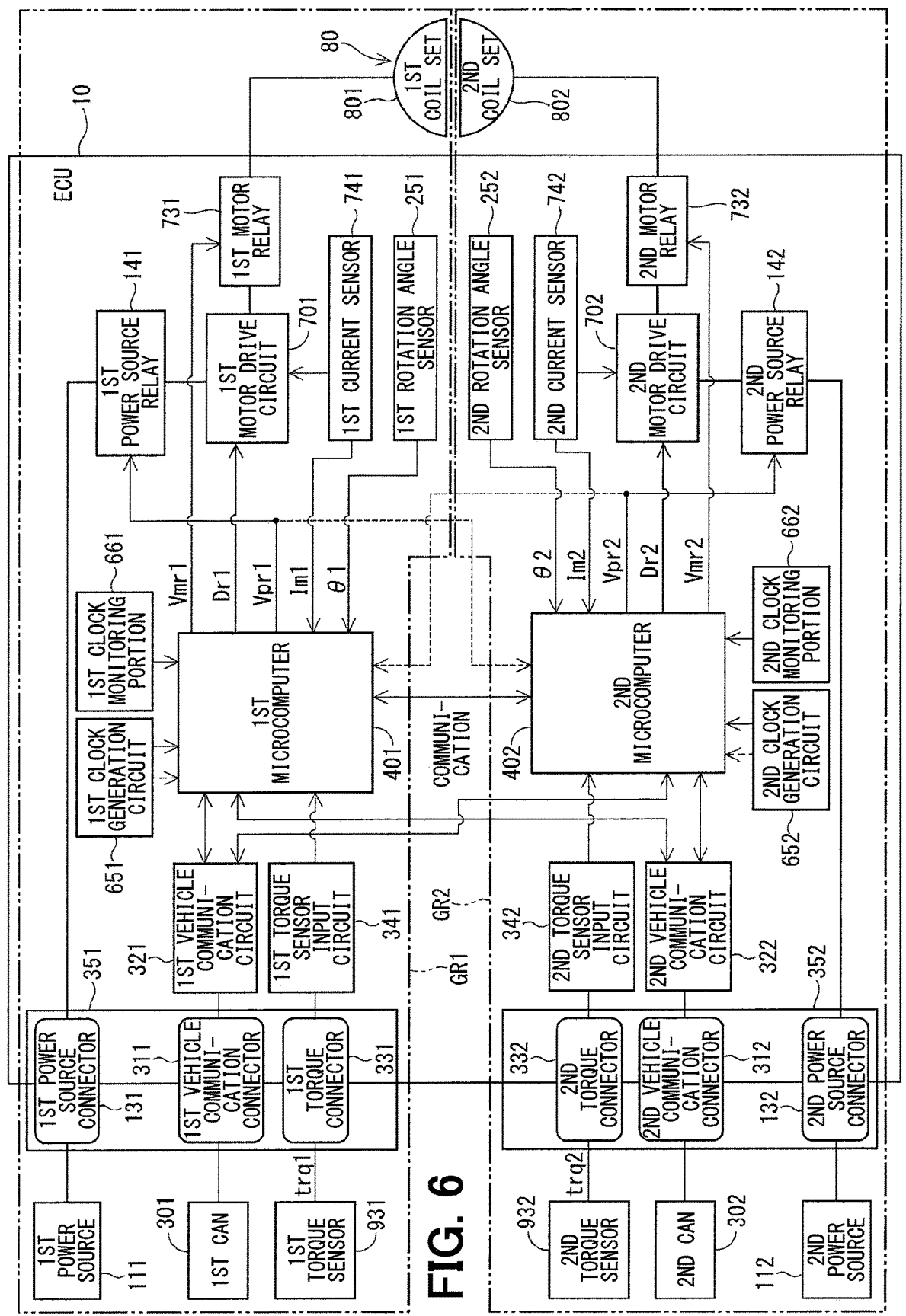
FIG. 6 is a diagram showing an entire configuration of the ECU, which corresponds to a motor control apparatus, according to each embodiment.

As depicted in FIGS. 5 and 6, the motor 80 to be controlled by the ECU 10 is the three-phase brushless motor including the two three-phase coil sets 801 and 802 provided coaxially.

The coil sets 801 and 802 are equal in electrical characteristic, and are disposed at the common stator to be shifted by an electrical angle of 30 degrees, as depicted in FIG. 3 of JP 5672278 B2 and the like. The coil sets 801 and 802 are controlled to allow electrification of phase current having equal amplitude and phases shifted from each other by 30 degrees, for example.

FIG. 6 depicts the first coil set 801, as well as the first microcomputer 401, a motor drive circuit 701, and the like relevant to electrification control of the first coil set 801, which configure a first system GR1. FIG. 6 also depicts the second coil set 802, as well as the second microcomputer 402, a second motor drive circuit 702, and the like relevant to electrification control of the second coil set 802, which configure a second system GR2. The first system GR1 and the second system GR2 include two element groups completely independent from each other and form redundant configurations of so-called "full dual systems".

For distinction as necessary in the description, constituent elements of or signals for the first system GR1 will have names beginning with "first", whereas constituent elements of or signals for the second system GR2 will have names beginning with "second". Common matters between these systems will be described collectively without adding "first" or "second". The constituent elements of or the signals for the first system will each have "1" at the end of the reference sign, whereas the constituent elements of or the signals for the second system will each have "2" at the end of the reference sign.

Hereinafter, one of the systems including a constituent element will be called the "own system", and the remaining one of the systems will be called the "other system". Similarly, in the microcomputers 401 and 402 for the two systems, the microcomputer in the own system will be called the "own microcomputer" whereas the microcomputer in the other system will be called the "other microcomputer".

The ECU 10 has a first connector portion 351 including a first power source connector 131, a first vehicle communication connector 311, and a first torque connector 331. The ECU 10 further has a second connector portion 352 including a second power source connector 132, a second vehicle communication connector 312, and a second torque connector 332. Each of the connector portions 351 and 352 may be provided as a single connector, or can include multiple divided connectors.

The first power source connector 131 is connected to a first power source 111. The first power source 111 supplies electric power to the first coil set 801 via the power source connector 131, a power source relay 141, the first motor drive circuit 701, and a motor relay 731. The first power source 111 also supplies electric power to the first microcomputer 401 and sensors in the first system GR1.

The second power source connector 132 is connected to a second power source 112. The second power source 112 supplies electric power to the second coil set 802 via the power source connector 132, a power source relay 142, the second motor drive circuit 702, and a motor relay 732. The second power source 112 also supplies electric power to the second microcomputer 402 and sensors in the second system GR2.

In a case where the power sources are not provided redundantly, the power source connectors 131 and 132 of the two systems may be connected to a common power source.

In a case where CANs are provided redundantly as vehicle communication networks, the first vehicle communication connector 311 is connected between a first CAN 301 and a first vehicle communication circuit 321, and the second vehicle communication connector 312 is connected between a second CAN 302 and a second vehicle communication circuit 322.

In another case where the CANs are not provided redundantly, the vehicle communication connectors 311 and 312 of the two systems may be connected to the common CAN 30. There may be provided, other than the CAN, a vehicle communication network of any standard, such as a CAN with flexible data rate (CAN-FD) or a FlexRay.

Each of the vehicle communication circuits 321 and 322 bidirectionally communicates with the microcomputers 401 and 402 in the own and other systems.

The first torque connector 331 is connected between the first torque sensor 931 and a first torque sensor input circuit 341. The first torque sensor input circuit 341 notifies the first microcomputer 401 of the steering torque trq1 detected by the first torque connector 331.

The second torque connector 332 is connected between the second torque sensor 932 and a second torque sensor input circuit 342. The second torque sensor input circuit 342 notifies the second microcomputer 402 of the steering torque trq2 detected by the second torque connector 332.

The microcomputers 401 and 402 each execute various processing including software processing of causing a CPU to execute a program preliminarily stored in a substantive memory device such as a ROM, and hardware processing executed by a dedicated electronic circuit.

The microcomputers 401 and 402 operate in accordance with reference clocks generated by clock generation circuits 651 and 652, respectively. The clock monitoring portions 661 and 662 monitor the reference clocks generated by the clock generation circuits 651 and 652, respectively. Generation and monitoring of the reference clocks will be described in detail later.

The first microcomputer 401 generates a motor drive signal Dr1 for operation of the switching elements 241 of the first motor drive circuit 701, and commands the first motor drive circuit 701 by means of the motor drive signal Dr1. The first microcomputer 401 generates a first power source relay drive signal Vpr1 and a first motor relay drive signal Vmr1.

The second microcomputer 402 generates a motor drive signal Dr2 for operation of the switching elements 242 of the second motor drive circuit 702, and commands the second motor drive circuit 702 by means of the motor drive signal Dr2. The second microcomputer 402 generates a second power source relay drive signal Vpr2 and a second motor relay drive signal Vmr2.

The power source relay drive signal Vpr1 or Vpr2 generated by the microcomputer 401 or 402 is transmitted as a command to the power source relay 141 or 142 of the own system, and is also transmitted for notification to the other microcomputer.

The microcomputers 401 and 402 are configured to execute communication between the microcomputers to mutually transmit and receive information. The microcomputers 401 and 402 execute the communication between the microcomputers to mutually transmit and receive a current detection value, a current command value, and the like, to cause the first system GR1 and the second system GR2 to drive the motor 80 in cooperation with each other. The communication between the microcomputers has communication frames including the current detection value and the like. The communication frames may further include the current command value, a current limiting value, an update counter, a status signal, a CRC signal functioning as an error detection value signal, a check sum signal, or the like. The present embodiment is applicable regardless of contents of the communication between the microcomputers. Different information may be transmitted and received as necessary, or the data exemplified above may be excluded partially or entirely.

In a case where each of the microcomputers receives the power source relay drive signal Vpr1 or Vpr2 from the other microcomputer but does not receive any signal from the other microcomputer by means of the communication between the microcomputers, the other microcomputer is determined as being normal and the communication between the microcomputers is determined as being abnormal.

In another case where each of the microcomputers does not receive the power source relay drive signal Vpr1 or Vpr2 from the other microcomputer and does not receive any signal from the other microcomputer by means of the communication between the microcomputers, the other microcomputer is determined as being abnormal.

The first motor drive circuit 701 is a three-phase inverter including the multiple switching elements 241, and converts electric power to be supplied to the first coil set 801. The switching elements 241 of the first motor drive circuit 701 are controlled to be turned ON and OFF in accordance with the motor drive signal Dr1 outputted from the first microcomputer 401.

The second motor drive circuit 702 is a three-phase inverter including the multiple switching elements 242, and converts electric power to be supplied to the second coil set 802. The switching elements 242 of the second motor drive circuit 702 are controlled to be turned ON and OFF in accordance with the motor drive signal Dr2 outputted from the second microcomputer 402.

The first power source relay 141 is provided between the first power source connector 131 and the first motor drive circuit 701, and is controlled in accordance with the first power source relay drive signal Vpr1 from the first microcomputer 401. In a case where the first power source relay 141 is ON, electrification is permitted between the first power source 111 and the first motor drive circuit 701. In another case where the first power source relay 141 is OFF, electrification is blocked between the first power source 111 and the first motor drive circuit 701.

The second power source relay 142 is provided between the second power source connector 132 and the second motor drive circuit 702, and is controlled in accordance with the second power source relay drive signal Vpr2 from the second microcomputer 402. In a case where the second power source relay 142 is ON, electrification is permitted between the second power source 112 and the second motor drive circuit 702. In another case where the second power source relay 142 is OFF, electrification is blocked between the second power source 112 and the second motor drive circuit 702.

Each of the power source relays 141 and 142 according to the present embodiment is a semiconductor relay such as a MOSFET. If each of the power source relays 141 and 142 has a parasitic diode as in the MOSFET, it is desired to provide a reverse connection protective relay (not depicted) that is connected in series to the power source relays 141 and 142 to allow the parasitic diodes to be directed reversely to each other. The power source relays 141 and 142 may be mechanical relays.

The first motor relay 731 is provided on an each-phase power path between the first motor drive circuit 701 and the first coil set 801, and is controlled in accordance with the first motor relay drive signal Vmr1 from the first microcomputer 401. In a case where the first motor relay 731 is ON, electrification is permitted between the first motor drive circuit 701 and the first coil set 801. In another case where the first motor relay 731 is OFF, electrification is blocked between the first motor drive circuit 701 and the first coil set 801.

The second motor relay 732 is provided on an each-phase power path between the second motor drive circuit 702 and the second coil set 802, and is controlled in accordance with the second motor relay drive signal Vmr2 from the second microcomputer 402. In a case where the second motor relay 732 is ON, electrification is permitted between the second motor drive circuit 702 and the second coil set 802. In another case where the second motor relay 732 is OFF, electrification is blocked between the second motor drive circuit 702 and the second coil set 802.

There is provided a first current sensor 741 that detects current Im1 flowing to each phase of the first coil set 801 and transmits the detected current Im1 to the first microcomputer 401. There is provided a second current sensor 742 that detects current Im2 flowing to each phase of the second coil set 802 and transmits the detected current Im2 to the second microcomputer 402.

In a case where the rotation angle sensors 251 and 252 are provided redundantly, the first rotation angle sensor 251 detects the electrical angle θ1 of the motor 80 and transmits the detected electrical angle θ1 to the first microcomputer 401. The second rotation angle sensor 252 detects the electrical angle θ2 of the motor 80 and transmits the detected electrical angle θ2 to the second microcomputer 402.

In another case where the rotation angle sensors are not provided redundantly, the electrical angle θ2 of the second system may be calculated in accordance with an equation "θ2=θ1+30 degrees" from the electrical angle θ1 of the first system detected by the first rotation angle sensor 251.

(Configuration of ECU)

The ECU according to each embodiment will be described below in terms of the configuration and the functional effect thereof. FIG. 6 depicts the two redundant systems including configurations not to be described where appropriate. The ECU according to each embodiment will be denoted by a reference sign of a three-digit number including "10" followed by the ordinal number of the embodiment.

First Embodiment

The first embodiment will be described with reference to FIGS. 7 to 21.

Figure 7:
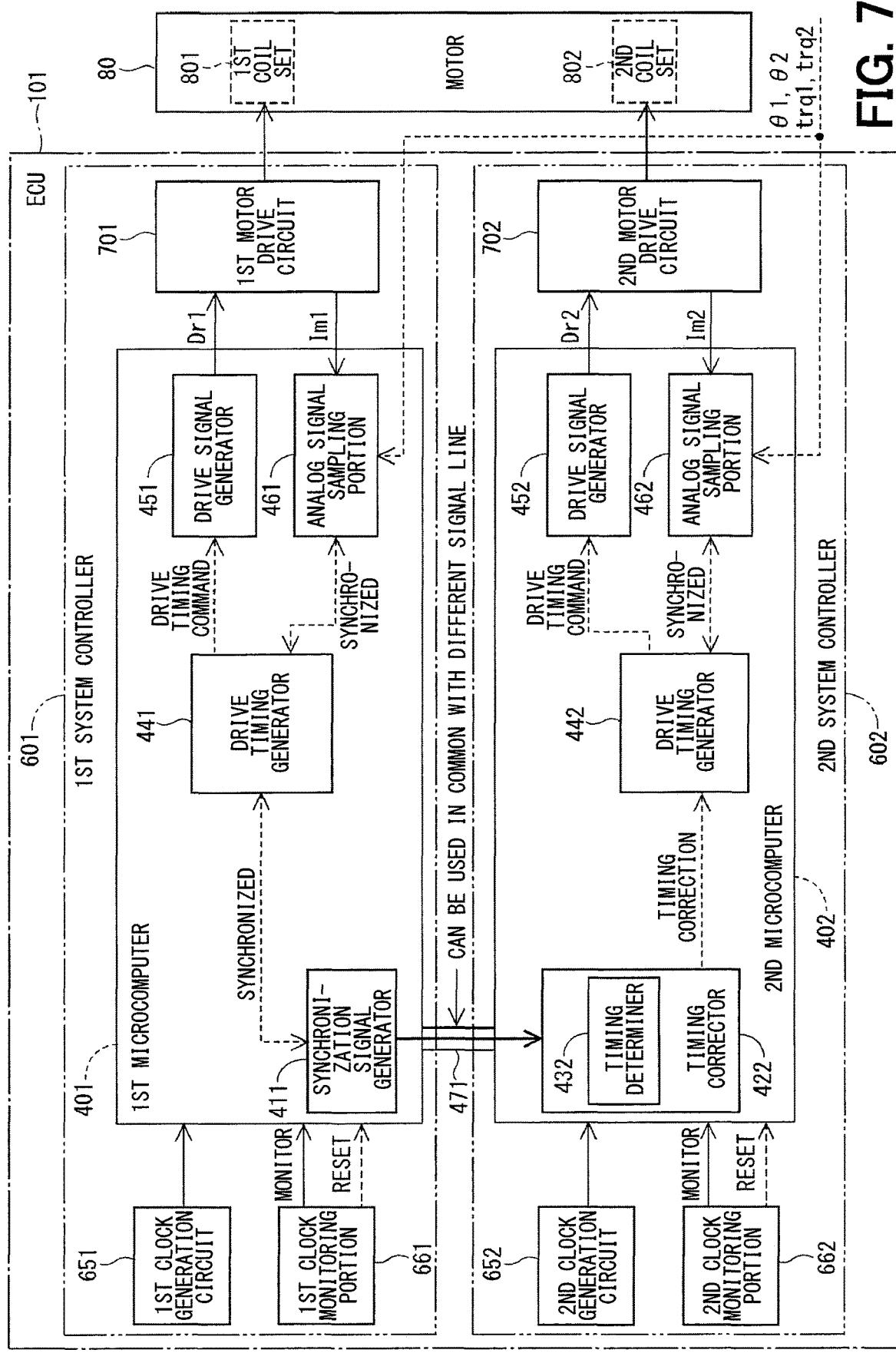
FIG. 7 is a diagram showing a detailed configuration of an ECU, which corresponds to a motor control apparatus, according to a first embodiment.

FIG. 7 depicts detailed configurations of the microcomputers 401 and 402, the motor drive circuits 701 and 702, and the like, which are extracted from the constituent elements depicted in FIG. 6.

FIG. 7 depicts an ECU 101 including a first system controller 601 that controls electrification to the first coil set 801, and a second system controller 602 that controls electrification to the second coil set 802. The controllers 601 and 602 of the respective systems include the clock generation circuits 651 and 652, the clock monitoring portions 661 and 662, the microcomputers 401 and 402, and the motor drive circuits 701 and 702, respectively. In other words, a "system" corresponds to a unit of constituent elements including the clock generation circuit, the clock monitoring portion, the microcomputer, and the motor drive circuit provided in association with one another.

The first clock generation circuit 651 and the second clock generation circuit 652 independently generate reference clocks as operation reference of the first microcomputer 401 and the second microcomputer 402, respectively.

The first clock monitoring portion 661 monitors the reference clock generated by the first clock generation circuit 651 and transmitted to the first microcomputer 401. The second clock monitoring portion 662 monitors the reference clock generated by the second clock generation circuit 652 and transmitted to the second microcomputer 402. The clock monitoring portion 661 or 662 transmits a reset signal (denoted by "RESET" in the drawings) to the microcomputer 401 or 402 upon detection of abnormality of the reference clock.

The microcomputers 401 and 402 receive vehicle information transmitted via the CANs 301 and 302, information such as the steering torque trq1 and the steering torque trq2, the phase current Im1 and the phase current Im2, and the electrical angles θ1 and θ2, which are transmitted from the corresponding sensors, respectively. The microcomputers 401 and 402 generate the motor drive signals Dr1 and Dr2 through control arithmetic according to the various received information, and transmit the motor drive signals Dr1 and Dr2 to the motor drive circuits 701 and 702, respectively. The control arithmetic is executed at timing determined by the clock generated by each of the clock generation circuits 651 and 652.

The motor drive circuits 701 and 702 electrify the coil sets 801 and 802 in accordance with the motor drive signals Dr1 and Dr2 transmitted as commands from the microcomputers 401 and 402, respectively. Each of the motor drive circuits 701 and 702 is typically exemplified by a power converter circuit including multiple switching elements such as MOSFETs having bridge connection. The motor drive signals Dr1 and Dr2 are switching signals for turning ON or OFF the switching elements. In the present embodiment exemplifying driving the three-phase brushless motor, the motor drive circuits 701 and 702 are three-phase inverters.

Each of the microcomputers 401 and 402 independently includes a ROM that stores a control program and fixed values such as parameters, a RAM that temporarily stores an arithmetic processing result, and the like, and is not configured to refer to the ROM or the RAM in the other microcomputer.

On this assumption, the two microcomputers 401 and 402 are connected to each other via a synchronization signal line 471. FIG. 7 exemplifies provision of the single synchronization signal line 471. The second embodiment to be described later or another embodiment providing three or more microcomputers may exemplify provision of multiple synchronization signal lines. In other words, the ECU according to the present embodiment ordinarily includes at least one synchronization signal line.

The synchronization signal line is not limited to a dedicated line for transmission of a synchronization signal to be described later, but may also be used in common with a signal line for communication of information other than the synchronization signal, such as a clock line for the communication between the microcomputers, or a serial communication line for communication of information such as current.

As disclosed in JP 2011-148498 A and the like, the synchronization signal may be provided for notification not by means of communication via the synchronization signal line but by means of level change of a port signal from the first microcomputer 401 to the second microcomputer 402.

The first microcomputer 401 and the second microcomputer 402 are commonly configured by including drive timing generators 441 and 442, drive signal generators 451 and 452, and analog signal sampling portions 461 and 462, respectively.

The drive timing generators 441 and 442 generate drive timing as pulse timing of the motor drive signals Dr1 and Dr2 with use of a PWM carrier wave commonly applicable to the respective phases or the like, and command the drive timing to the drive signal generators 451 and 452, respectively. The drive signal generators 451 and 452 compare the PWM carrier wave with a DUTY ratio of a voltage command signal or the like to generate the motor drive signals Dr1 and Dr2 as PWM signals, and transmit the motor drive signals Dr1 and Dr2 as commands to the motor drive circuits 701 and 702, respectively.

Each of the analog signal sampling portions 461 and 462 samples an analog signal.

Mainly assumed examples of the analog signal include detection values of the motor current Im1 and the motor current Im2 of the respective systems. The three-phase motor has the motor current Im1 and the motor current Im2 corresponding to U-phase current, V-phase current, and W-phase current of the coil sets 801 and 802, respectively. FIG. 7 includes arrows assuming a case where the acquired motor current Im1 and the motor current Im2 are detected by shunt resistors included in the motor drive circuits 701 and 702. FIG. 7 may further include arrows directed from outside the ECU 101 to the analog signal sampling portions 461 and 462, assuming a case where the motor current Im1 and the motor current Im2 are acquired from current sensors provided at the motor 80. As indicated by broken lines, the analog signal sampling portions 461 and 462 may acquire analog signals of the electrical angles θ1 and θ2, the steering torque trq1, and the steering torque trq2.

The analog signal sampling portions 461 and 462 are synchronized with the drive timing generators 441 and 442, and sample the analog signals at timing different from switch timing of the motor drive signals Dr1 and Dr2, respectively.

Figure 8:
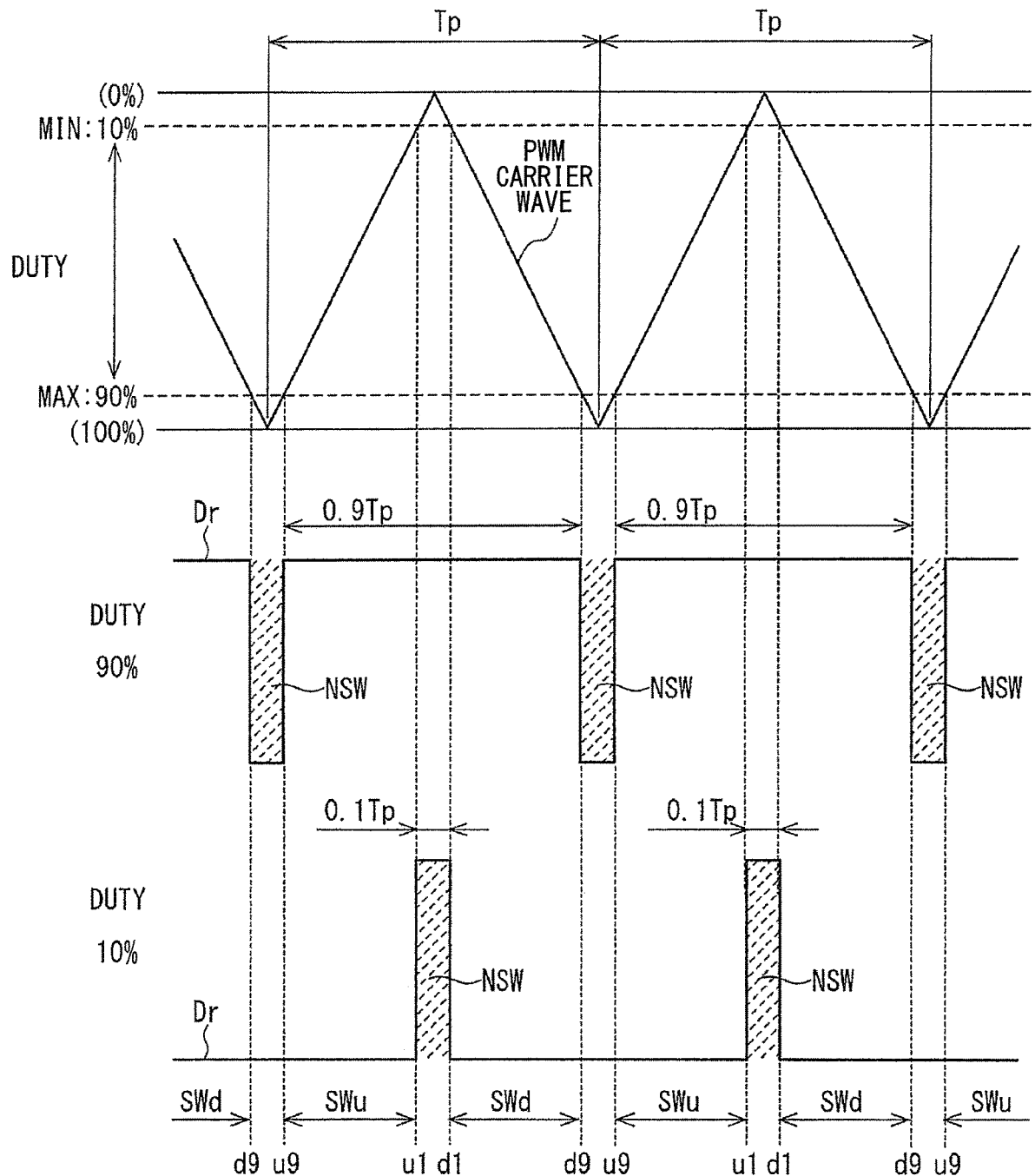
FIG. 8 is a chart indicating a relation between motor drive signals and analog signal sample timing.

FIG. 8 indicates generation of the motor drive signals Dr with use of a PWM carrier wave having a cycle Tp commonly applied to the respective phases. Examples of the assumed DUTY ratio include a value within a range from 10% to 90%, 0%, and 100%. The present description assumes that the DUTY ratio of 0% corresponds to peaks of the PWM carrier wave and the DUTY ratio of 100% corresponds to bottoms of the PWM carrier wave. The cycle Tp of the PWM carrier wave corresponds to a pulse cycle of the motor drive signal Dr.

At the DUTY ratio of 90%, the motor drive signal Dr has a pulse rising at time u9 and falling at time d9 with an ON period expressed as 0.9 Tp.

At the DUTY ratio of 10%, the motor drive signal Dr has a pulse rising at time u1 and falling at time d1 with the ON period expressed as 0.1 Tp.

At the DUTY ratio in the range from 10% to 90%, the motor drive signal Dr has a pulse rising during a period SWu from the time u9 to the time u1 and falling during a period SWd from the time d1 to the time d9. While the DUTY ratio is 0% or 100%, the pulse has neither rising nor falling. During "non-switching periods NSW" hatched by broken lines, the switching elements of all the phases have no switching of the motor drive signal Dr. The non-switching periods NSW in PWM control each correspond to a minute period including timing of the bottom or the peak of the carrier wave.

The pulse has rising or falling upon switching from the DUTY ratio other than 0% to 0% or switching from the DUTY ratio other than 100% to 100%. Switching can be avoided at carrier wave peak timing during the non-switching periods NSW by setting DUTY ratio switch timing at carrier wave bottom timing. In contrast, switching can be avoided at carrier wave bottom timing during the non-switching periods NSW by fixing the DUTY ratio switch timing at carrier wave peak timing. Furthermore, in a case where the DUTY ratio is set to be switched once in N times of bottom or peak timing of the PWM carrier wave, switching will not occur during (N−1) times of bottom or peak timing with no DUTY ratio switching.

In view of this, the analog signal sampling portions 461 and 462 are synchronized with the drive timing generators 441 and 442 and sample at timing with no DUTY ratio switching to 0% or 100% during the non-switching periods NSW. This suppresses influence of switching noise to a sampled signal to improve sampling accuracy.

More specifically, sampling may be preferably executed after elapse of decay time of surge voltage generated by switching.

In the first embodiment, the first microcomputer 401 includes a synchronization signal generator 411 whereas the second microcomputer 402 includes a timing corrector 422. The first microcomputer 401 functions as a "transmitter microcomputer" that transmits a synchronization signal whereas the second microcomputer 402 functions as a "receiver microcomputer" that receives the synchronization signal. Each of the microcomputers 401 and 402 will call the microcomputer itself by the "own microcomputer".

The synchronization signal generator 411 in the first microcomputer 401 generates a synchronization signal that is synchronized with the drive timing generated by the drive timing generator 441 in the own microcomputer and synchronizes drive timing of the two microcomputers 401 and 402. The synchronization signal generator 411 transmits the synchronization signal to the second microcomputer 402 via the synchronization signal line 471.

The timing corrector 422 in the second microcomputer 402 receives the synchronization signal from the first microcomputer 401, and corrects the drive timing generated by the drive timing generator 442 in the own microcomputer to be synchronized with the received synchronization signal. This correction will be called "timing correction". As indicated by broken lines in the second microcomputer 402 in FIG. 7, timing correction includes transmission of a timing correction command from the timing corrector 422 to the drive timing generator 442, and correction of the drive timing according to the timing correction command by the drive timing generator 442.

JP 5412095 B2 (corresponding to an example of a related art) discloses a configuration in which "the second microcomputer 402 corrects the drive timing in accordance with the synchronization signal transmitted from the first microcomputer 401". In comparison to this related art, the first embodiment provides a timing determiner 432 that is further included in the timing corrector 422 and functions as a "received signal determiner". Before the timing determiner 432 is described next, points solved by the related art and difficulties unsolved by the related art will be described with reference to FIGS. 9 to 11.

Figure 9:
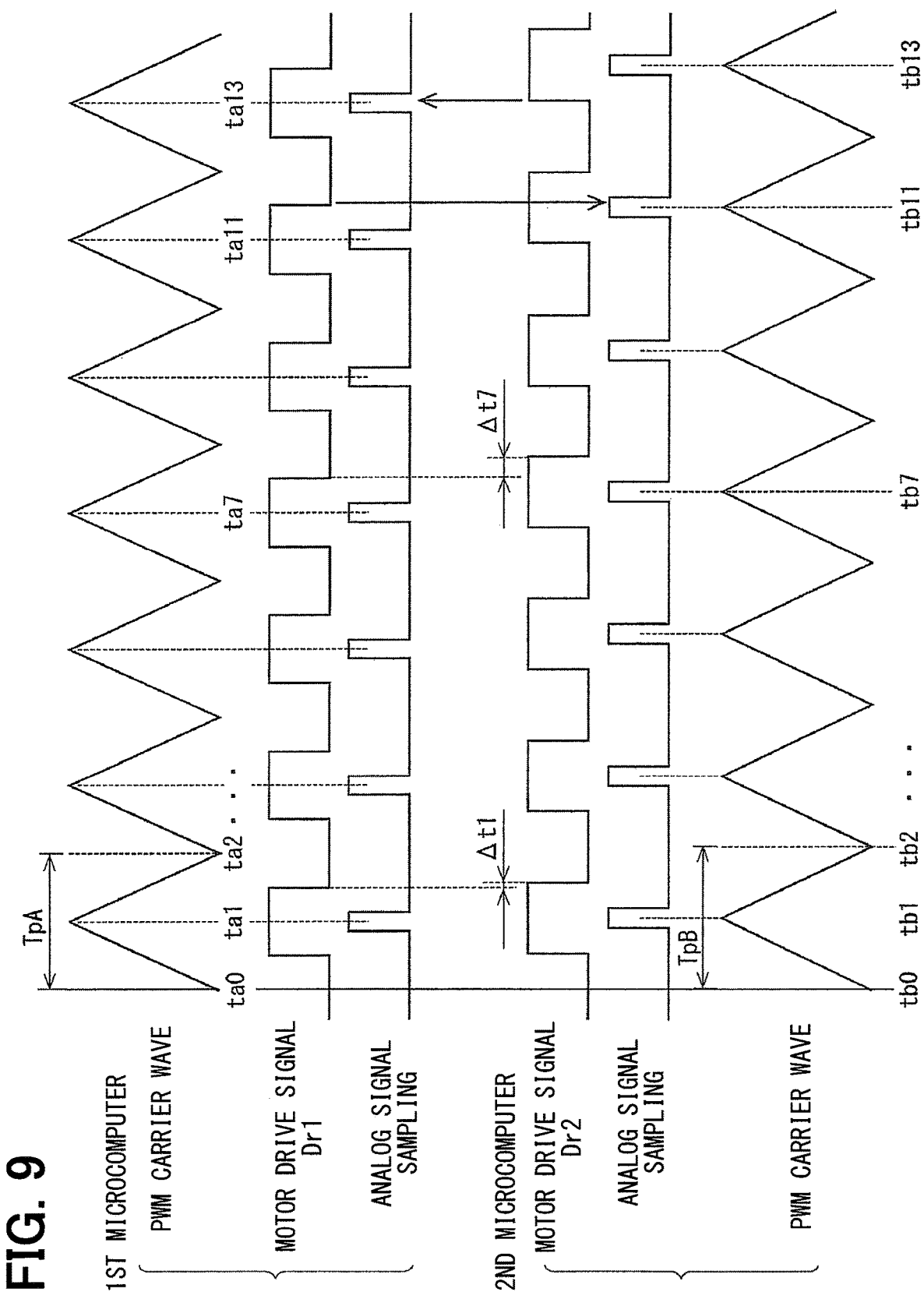
FIG. 9 is a timing chart indicating a clock shift between microcomputers of two systems.

FIG. 9 indicates a gradual shift of timing of the motor drive signals Dr1 and Dr2 of the two microcomputers 401 and 402 due to production variation or the like between the clock generation circuits 651 and 652.

Timing charts in FIG. 9 and subsequent figures indicate a pulse cycle of the first motor drive signal Dr1 denoted by TpA and a pulse cycle of the second motor drive signal Dr2 denoted by TpB. The first microcomputer 401 has a PWM carrier wave having bottom timing and peak timing alternately appearing from reference time ta0 and denoted in sequence by ta1, ta2, . . . . Similarly, the second microcomputer 402 has a PWM carrier wave having bottom timing and peak timing alternately appearing from reference time tb0 and denoted in sequence by tb1, tb2, . . . . The reference time ta0 and the reference time tb0 agree with each other.

The pulse cycles have a relation expressed as TpA<TpB after the reference time ta0 and tb0, so that the second motor drive signal Dr2 is gradually delayed from the first motor drive signal Dr1. A first cycle causes a relatively small timing shift $\Delta t1$. Such a timing shift gradually cumulates to be as large as $\Delta t7$ in a fourth cycle. Increase in timing shift causes torque pulsation as disclosed in the related art.

After timing ta11 in FIG. 9, the first motor drive signal Dr1 has fall timing matching analog signal sample timing of the second microcomputer 402. After the timing tb11, the second motor drive signal Dr2 has a rise timing matching analog signal sample timing of the first microcomputer 401. Sample timing matching a pulse edge of the motor drive signal Dr1 or Dr2 has deterioration in sampling accuracy due to switching noise.

The related art discloses connecting the two microcomputers 401 and 402 via the synchronization signal line 471 and correcting an arithmetic timing shift in accordance with a synchronization signal. This method is indicated in FIG. 10.

Figure 10:
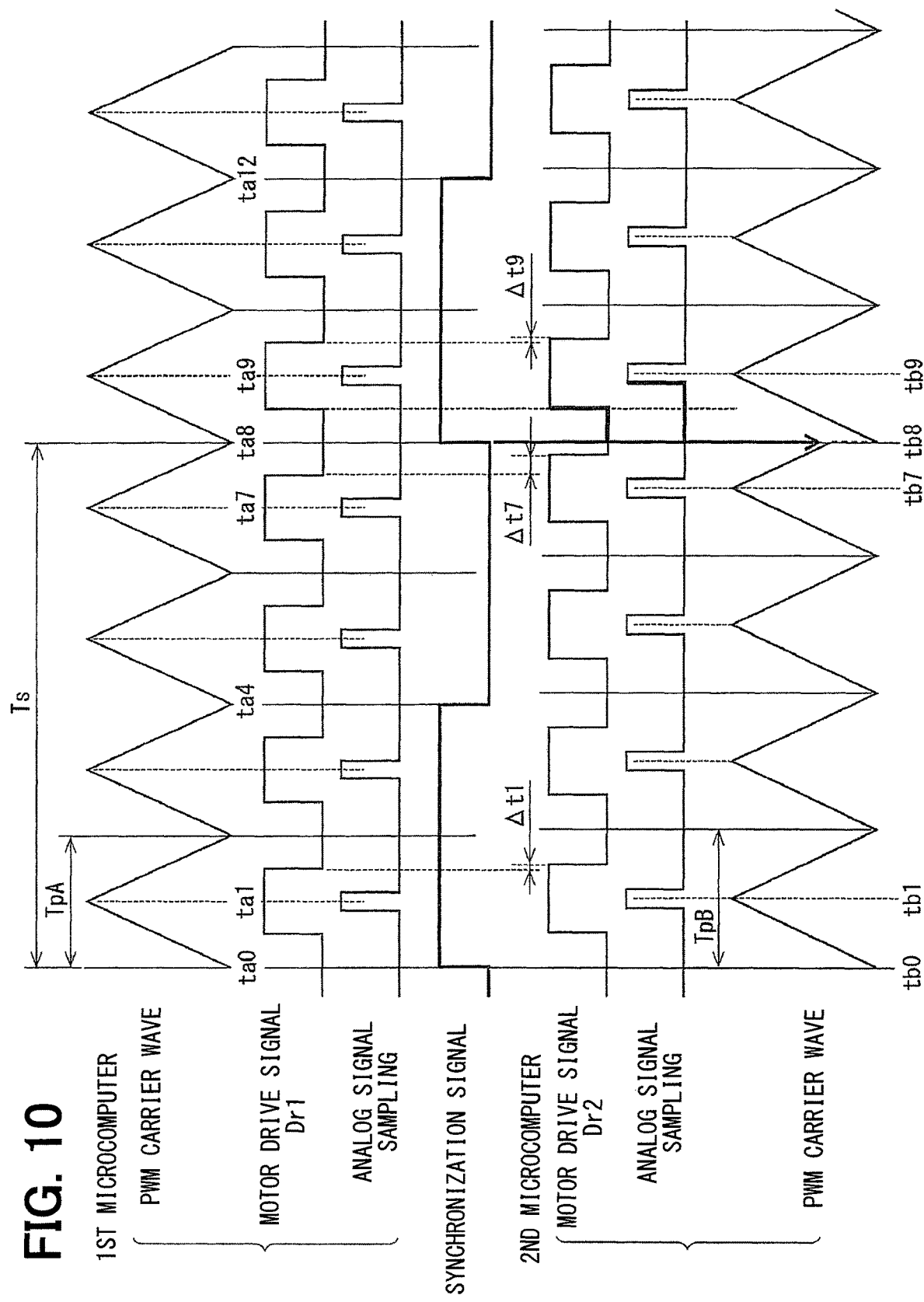
FIG. 10 is an explanatory timing chart indicating timing correction according to a synchronization signal as a related art.

As in FIG. 10, the synchronization signal is generated as a pulse signal having a cycle Ts corresponding to four times of the pulse cycle TpA of the first motor drive signal Dr1. The pulse repetitively rises or falls at every fourth one of bottom timing and peak timing of the PWM carrier wave. The pulse rises at the timing ta0 and timing ta8 and falls at timing ta4 and ta12. FIG. 10 exemplifies timing correction of the second microcomputer 402 to be synchronized with the pulse rise timing ta0 and ta8.

Specifically, timing correction is executed after the timing shift $\Delta t7$ cumulates as in FIG. 9, to match timing tb8 of the second microcomputer 402 with the pulse rise timing ta8 of the synchronization signal.

The timing shift is reset to zero at the timing tb8, so that a subsequent single cycle causes a timing shift $\Delta t9$ suppressed to be substantially equal to the initial timing shift $\Delta t1$. Drive timing is corrected to be synchronized before a timing shift grows to cause torque pulsation or affect sampling accuracy, for continuation of excellent motor drive. A specific synchronization method is not limited to that exemplified in FIG. 10 and may be set appropriately.

In this manner, in the ECU including the multiple microcomputers that operates in accordance with the clocks generated by the clock generation circuits independent from each other, timing correction is executed between the multiple microcomputers with use of the synchronization signal to achieve motor drive with control timing synchronized between the multiple microcomputers. This configuration suppresses torque pulsation. This configuration further prevents analog signal sample timing from matching the switch timing of the motor drive signals Dr1 and Dr2.

The transmitted synchronization signal is, however, not always normal. Specifically, the first clock generation circuit 651 configured to operate the first microcomputer 401, the synchronization signal generator 411 in the first microcomputer 401, or the synchronization signal line 471 may be in failure or the like to cause abnormality of the transmitted synchronization signal itself. A difficulty arising upon reception of an abnormal synchronization signal by the second microcomputer 402 will be described next.

Figure 11:
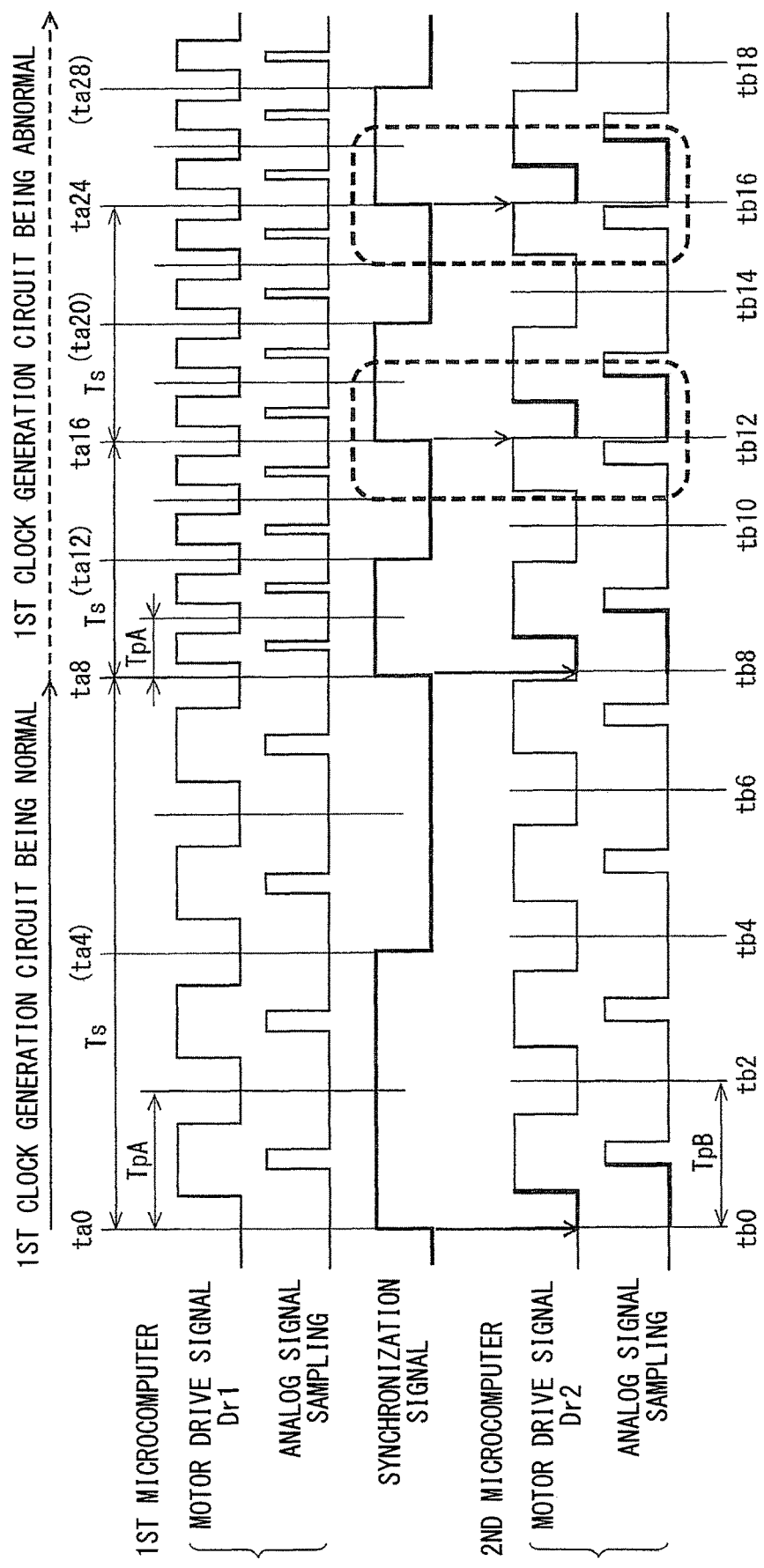
FIG. 11 is an explanatory timing chart indicating a difficulty of the related art upon synchronization signal abnormality.

FIG. 11 indicates an assumed defect upon abnormality of the first clock generation circuit 651 configured to operate the first microcomputer 401.

As indicated in FIG. 11, the clock generation circuit 651 operates normally from the reference time ta0 to the timing ta8, but has increase in clock frequency from the timing ta8 to abnormally shorten the pulse cycle TpA of the first motor drive signal Dr1. Along therewith, a synchronization signal generated in accordance with the clock generated by the clock generation circuit 651 is increased in frequency to shorten the cycle Ts.

If a control arithmetic fails to follow such an increased clock frequency in this case, the first microcomputer 401 has control breakdown to cause unavoidable motor drive stop.

Meanwhile, the second microcomputer 402 operates normally and the pulse cycle TpB of the second motor drive signal Dr2 is kept constant. A case of correcting drive timing of the second microcomputer 402 at synchronization signal pulse rise timing ta0, ta8, ta16, and ta24 is assumed. At the timing ta16 and ta24 surrounded with broken lines, timing correction is executed while the second motor drive signal Dr2 is ON to be forcibly switched OFF.

This may cause generation of an unintended pulse and unstable switching control of the second motor drive circuit 702. This may also cause uneven analog signal sampling intervals to adversely affect sampling accuracy.

Such a situation where failure caused at the first system controller 601 affects operation of the microcomputer 402 in the other system will be referred to as "failure propagation". FIG. 11 exemplifies a serious situation where the second microcomputer 402 executes timing correction according to the abnormal synchronization signal transmitted from the first microcomputer 401 to disable motor drive that should be executed normally only by the second system.

The motor control apparatus is redundantly configured to include the two systems originally in order to achieve continuous motor drive according to operation of a normal one of the systems even in a case where the other one of the systems has abnormality. However, such an object is never achieved upon failure propagation.

The electric power steering apparatus 90 particularly requires continuous motor drive for prevention of assist function stop, even upon torque pulsation and deterioration in analog signal sampling accuracy. The related art may cause failure propagation.

In order to solve such a difficulty, in the ECU 101 according to the first embodiment, the timing corrector 422 in the second microcomputer 402 includes the timing determiner 432 that functions as a "received signal determiner" and executes "received signal determination" of whether a received synchronization signal is normal or abnormal.

The second microcomputer 402 permits timing correction in a case where the timing determiner 432 determines normality of the received synchronization signal. In another case where the synchronization signal is determined as being abnormal, the second microcomputer 402 prohibits timing correction and drives the motor asynchronously with the first microcomputer 401.

That is, the receiver microcomputer initially determines whether the synchronization signal transmitted from the transmitter microcomputer and possibly causing failure propagation is normal. In a case where the synchronization signal is determined as being normal, drive timing of the receiver microcomputer is corrected to be synchronized with drive timing of the transmitter microcomputer to achieve excellent motor drive.

In another case where the synchronization signal is determined as being abnormal, timing correction is not executed to preferentially prevent failure propagation. The receiver microcomputer should be disconnected from the transmitter microcomputer and continue asynchronous motor drive, for continuation of the minimum assist function.

A format of "timing determination" executed as "received signal determination" by the timing determiner 432 will be described next with reference to FIGS. 12 to 14.

The first embodiment provides a method of determining whether the received synchronization signal has a pulse edge, i.e. rise or fall timing, included in a "synchronization permissive interval". The "synchronization permissive interval" may alternatively be called "correction permissive interval". Hereinafter, "reception timing of the pulse edge of the synchronization signal" will simply be called "synchronization signal reception timing".

Figure 12:
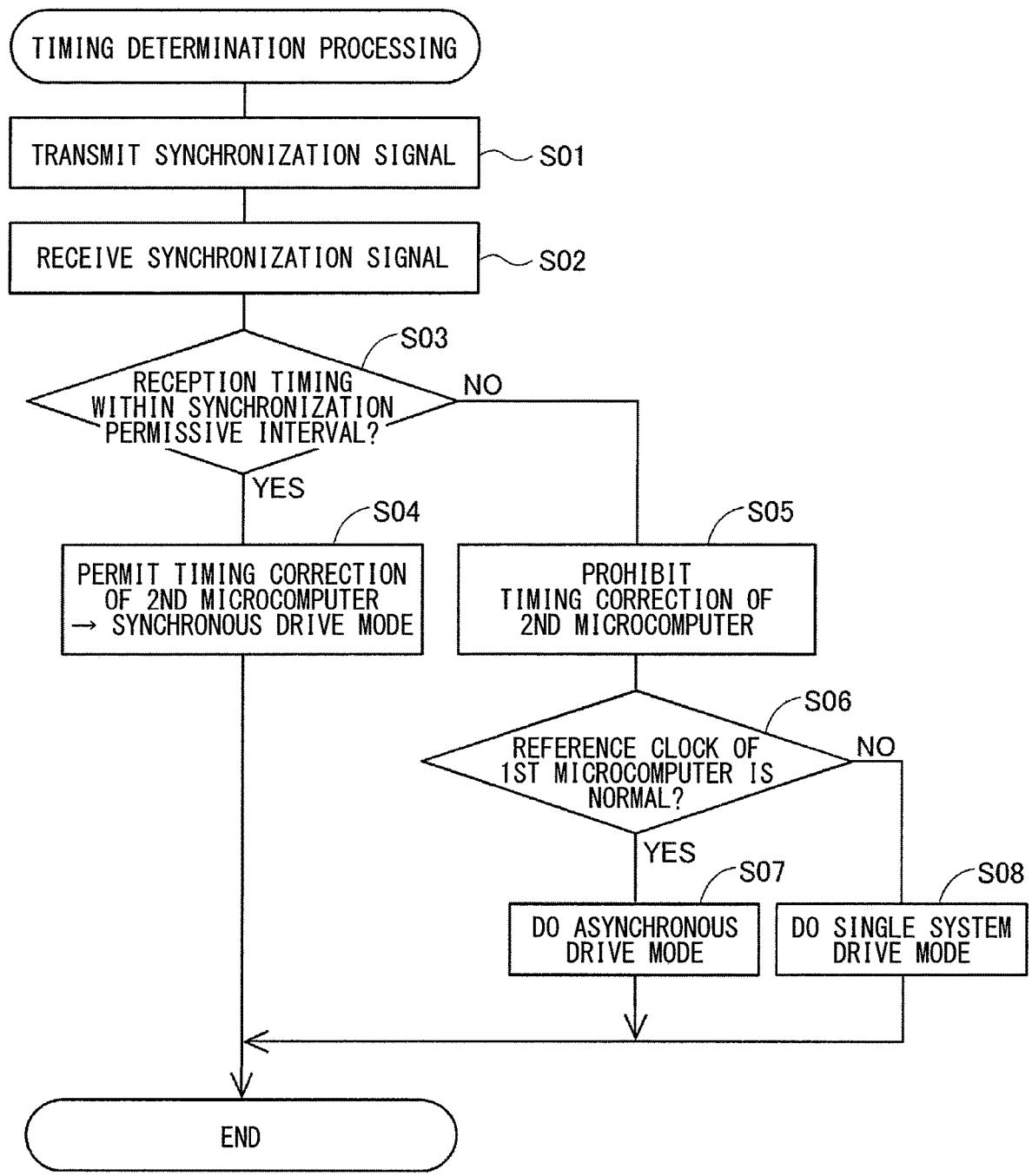
FIG. 12 is a flowchart of timing determination processing according to the first embodiment.

FIG. 12 is a flowchart of the timing determination processing in a motor control method. The flowcharts to be referred to hereinafter include sign "S" indicating a step. Assume that steps in the flowcharts of FIGS. 12 and 15 to 18 excluding S01 in FIG. 12 are executed by the timing corrector and the timing determiner in the receiver microcomputer, or the entire receiver microcomputer.

In a synchronization signal transmission step S01 in FIG. 12, the synchronization signal generator 411 in the first microcomputer 401 transmits a synchronization signal to the second microcomputer 402.

In a synchronization signal reception step S02, the timing corrector 422 receives the synchronization signal.

In a received signal determination step S03, the timing determiner 432 determines whether synchronization signal reception timing is included in the synchronization permissive interval, for determination of whether the synchronization signal is normal or abnormal.

If YES in S03, the second microcomputer 402 permits timing correction of the second microcomputer 402 in a timing correction permission step S04. The first microcomputer 401 and the second microcomputer 402 then synchronously drive the motor 80. This is called a "synchronous drive mode".

If NO in S03, the received synchronization signal is determined as being abnormal. The second microcomputer 402 prohibits timing correction of the second microcomputer 402 in a timing correction prohibition step S05, and drives the motor 80 asynchronously with the first microcomputer 401 as the procedure upon abnormality.

The mode of "driving the motor asynchronously with the first microcomputer 401" by the second microcomputer 402 includes an "asynchronous drive mode" and a "single system drive mode".

In the asynchronous drive mode, the first microcomputer 401 and the second microcomputer 402 drive the motor asynchronously with each other.

In the single system drive mode, the second microcomputer 402 stops drive of the motor 80 by the first microcomputer 401 and the second microcomputer 402 by itself drives the motor. In this case, the first microcomputer 401 may voluntarily stop operating, so that the second microcomputer 402 continues solely driving the motor. Alternatively, the second microcomputer 402 having determined abnormality may actively stop the first microcomputer 401.

The single system drive mode and the asynchronous drive mode can be switched depending on abnormality of the synchronization signal. According to exemplary FIG. 12, in S06, the clock monitoring portion 661 determines whether the reference clock of the first microcomputer 401 is normal.

If YES in S06, the reference clock of the first microcomputer 401 is normal and only the synchronization signal is abnormal as relatively minor abnormality. The asynchronous drive mode is accordingly selected in S07. If the synchronization signal has abnormality due to noise, the synchronization signal returns to a normal state without the noise. The synchronization signal may return to a normal state when the first microcomputer 401 is reset.

If NO in S06, the reference clock of the first microcomputer 401 is abnormal as serious abnormality inhibiting normal operation. The single system drive mode with only the normal second microcomputer 402 is accordingly selected in S08.

The ECU 101 drives the motor 80 in the synchronous drive mode with a normal synchronization signal, and in the single system drive mode or the asynchronous drive mode with an abnormal synchronization signal. In other words, a motor control apparatus having three drive modes of the synchronous drive mode, the asynchronous drive mode, and the single system drive mode is regarded as corresponding to the ECU according to the present embodiment.

Exemplary setting of the synchronization permissive interval will be described next. Assume a case in FIG. 10 or the like of generating a pulse of the synchronization signal at bottom or peak timing of the PWM carrier wave. As indicated in FIG. 8, timing of the synchronization signal does not match switch timing of the motor drive signals Dr in this case.

In a case where the motor drive signals Dr1 and Dr2 have a timing shift ideally equal to zero, the timing corrector 422 receives the synchronization signal at timing matching bottom or peak timing of the PWM carrier wave of the second microcomputer 402. The maximum range of a clock shift while the clock generation circuits 651 and 652 operate normally is estimated in such an ideal state.

Assume an exemplary case where the clock generation circuits 651 and 652 generate clocks varied at most by ±x % and timing is corrected in accordance with the synchronization signal at the cycle Ts [s].

In this case, the microcomputer 401 and 402 have internally counted time varied from the original clocks generated by the clock generation circuits 651 and 652 within a range from at least "(100−x)/100" times to at most "(100+x)/100" times.

The microcomputers 401 and 402 thus have a maximum shift amount ΔTmax [s] generated in a single synchronization cycle and expressed by equation 1.

$$\Delta Tmax = Ts \times \{(100+x)-(100-x)\}/100 = Ts \times 2x/100 \quad \text{(Equation 1)}$$

The synchronization permissive interval needs to be set to be equal to or more than the shift amount ΔTmax for prevention of erroneous correction prohibition during normal drive. The synchronization permissive interval is set to be also within system permissive time to enable appropriate timing determination processing.

Assume an exemplary case where the synchronization cycle Ts is 1 ms and the clock generation circuits 651 and 652 generate clocks varied maximally within ±1%. The maximum shift amount ΔTmax [s] generated from certain synchronization to subsequent synchronization is 0.02 [ms] as obtained in accordance with the equation 1.

$$\Delta Tmax = 1\ [ms] \times (2 \times 1/100) = 0.02\ [ms]$$

Figure 13:
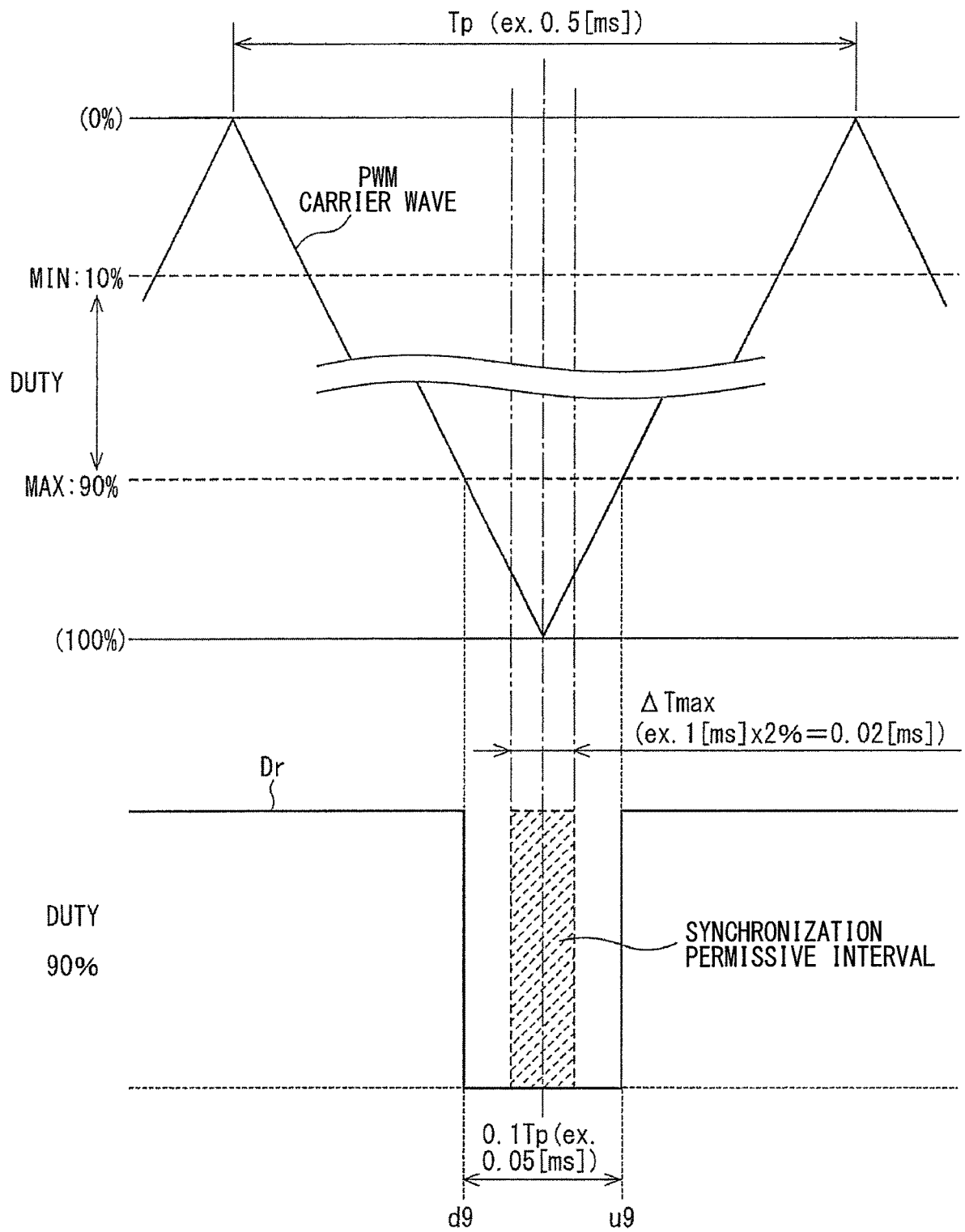
FIG. 13 is an explanatory chart indicating a synchronization permissive interval exemplarily set in accordance with the first embodiment.

As indicated in FIG. 13, assume that the PWM carrier wave cycle Tp is 0.5 [ms] and the DUTY ratio is in the range from 10% to 90%. In a case of driving at the DUTY ratio of 90%, the non-switching period from the falling time d9 to the subsequent rising time u9 of the motor drive signal Dr is 0.1 Tp or 0.05 [ms].

In another case where the synchronization permissive interval is set to have 0.02 [ms] as the maximum shift amount ΔTmax, having 0.01 [ms] each before and after bottom timing of the PWM carrier wave, the synchronization permissive interval is reliably included in the non-switching period of 0.05 [ms].

In view of this, if the clock generation circuits 651 and 652 generate clocks varied maximally within ±1%, the synchronization permissive interval is set to at least 2% of the synchronization signal cycle Ts to prevent erroneous correction prohibition during normal drive. The microcomputers 401 and 402 can keep driving synchronously with each other while drive timing is synchronized therebetween.

Variation between the clocks exceeding ±1% due to failure of the second clock generation circuit 652 can be detected by the second clock monitoring portion 662. The second microcomputer 402 is thus assumed to have a correctly set synchronization permissive interval.

The synchronization permissive interval, which is set during the non-switching period of the motor drive signal Dr at the maximum DUTY ratio, prevents a pulse being ON from being forcibly switched OFF due to timing correction. Even if an abnormal synchronization signal enters the synchronization permissive interval at timing different from expected synchronization timing, the motor drive signal Dr can secure a pulse width at the maximum DUTY ratio for achievement of operation without any difficulties.

Overmodulation control of output at a DUTY ratio in the range from 10% to 90% as well as at 0% and at 100% may match synchronization signal reception timing with DUTY ratio switch timing. Such a case has simple synchronization with DUTY ratio switch timing. The DUTY ratio kept at 100% or the like has no switch OFF timing, and synchronization at any timing thus has no actual influence.

In a case where DUTY ratio is switched from a value other than 100% to 100%, a normal pulse width ends completely at the DUTY ratio before the switching, and output at the DUTY ratio of 100% then starts simply at earlier or later timing. In another case where DUTY ratio is switched from 100% to a value other than 100%, output at the DUTY ratio of 100% ends at earlier or later timing with no influence on a period of output at the subsequent DUTY ratio. None of these cases has output at an abnormal DUTY ratio with slight influence on motor drive. The same applies to output at the DUTY ratio of 0% with output simply switched between ON and OFF at the DUTY ratio of 100%.

Figure 14:
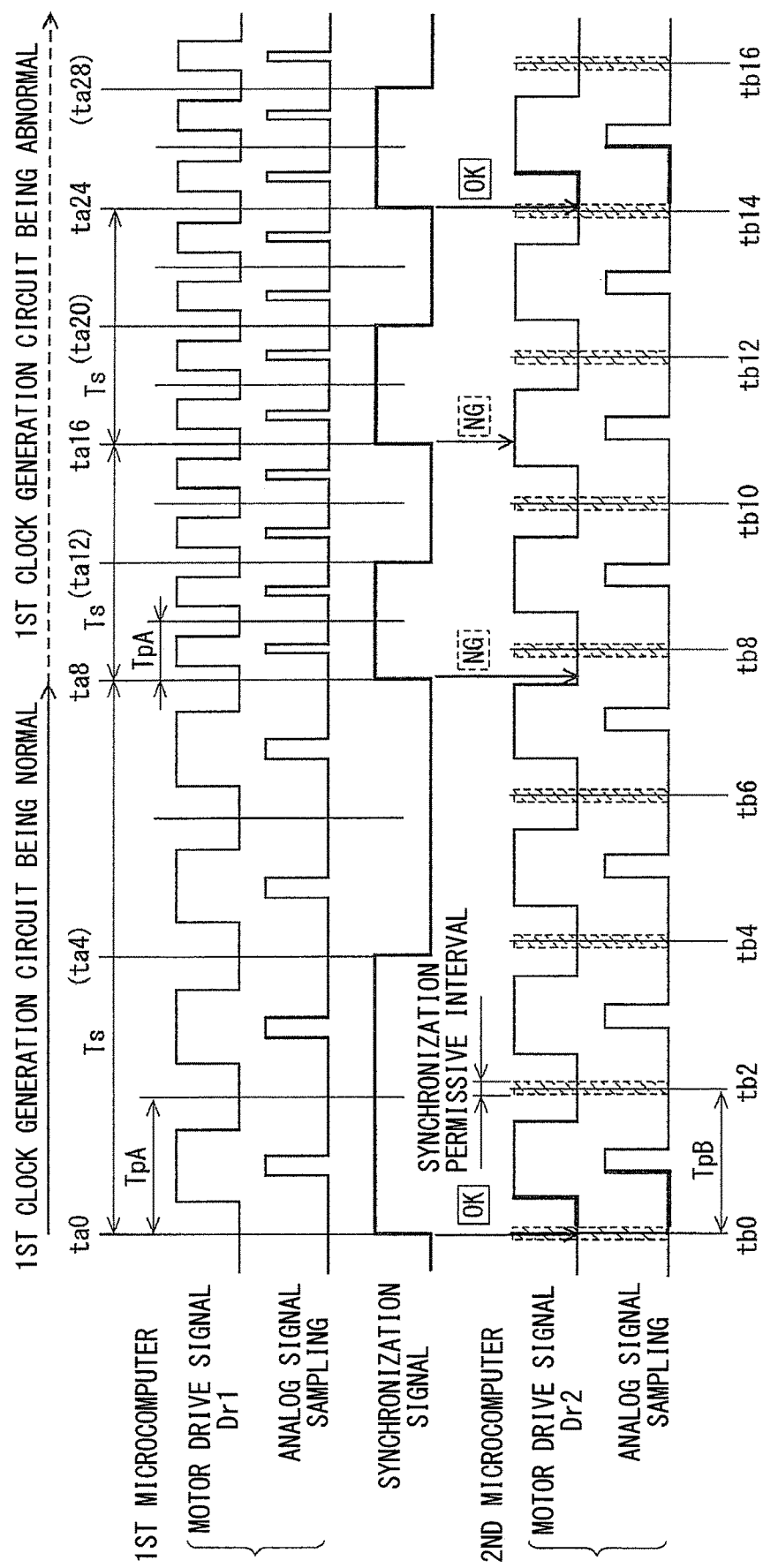
FIG. 14 is a timing chart upon synchronization signal abnormality according to the first embodiment.

FIG. 14 is a timing chart indicating timing determination upon synchronization signal abnormality according to the synchronization permissive interval exemplified above. FIG. 14 indicates results of timing determination at the pulse rise timing ta8, ta16, and ta24 of the synchronization signal when the first clock generation circuit 651 has abnormality as in FIG. 11. Timing of the synchronization signal within one of the synchronization permissive intervals is indicated by "OK" whereas timing outside the synchronization permissive intervals is indicated by "NG".

Synchronization signal reception timing is out of the synchronization permissive interval at the timing ta8 and ta16, so that the timing corrector 422 does not execute timing correction. The second microcomputer 402 drives the motor 80 asynchronously with the first microcomputer 401 in this case.

The second microcomputer 402 can thus prevent failure propagation from the first microcomputer 401. Particularly at the timing ta16, the motor drive signal Dr2 being ON is prevented from being forcibly switched OFF due to timing correction according to the abnormal synchronization signal.

Synchronization signal reception timing is included in the synchronization permissive interval at the timing ta24, so that the timing corrector 422 executes timing correction. Even if the cycle Ts of the synchronization signal is abnormal, rise itself at the timing ta24 is substantially at normal timing. Even if the timing corrector 422 executes timing correction in accordance with the received synchronization signal, such timing correction will have substantially no influence on the motor drive signal Dr2.

As described above, according to the basic technical idea of the first embodiment, the timing determiner 432 in the second microcomputer 402 determines normality or abnormality of the synchronization signal transmitted from the first microcomputer 401.

When the received synchronization signal is determined as being normal, the second microcomputer 402 permits timing correction and drives the motor 80 synchronously with the first microcomputer 401. This suppresses torque pulsation of the motor 80. This also prevents sample timing of the analog signal sampling portions 461 and 462 from matching switch timing of the motor drive signals Dr1 and Dr2. In a case where the synchronization signal has a square wave at the DUTY ratio of 50%, its rise timing and fall timing are included in the non-switching periods NSW, with side effect of reduction in influence of synchronization signal switching to the analog signals.

In another case where the synchronization signal is determined as being abnormal, the second microcomputer 402 prohibits timing correction and drives the motor asynchronously with the first microcomputer 401. This prevents control breakdown of the second microcomputer 402 due to failure propagation from the first microcomputer 401.

Particularly in the electric power steering apparatus 90, at least the normal second microcomputer 402 continuously drives the motor for continuation of the assist function.

Switching of the motor drive signals Dr1 and Dr2 may affect analog signal sampling as well as the synchronization signal. Assume a case where the synchronization signal is affected by switching of the motor drive signal Dr1 or Dr2 and has an erroneous pulse edge. In an ordinary format having no synchronization permissive interval, the receiver microcomputer recognizes pulse rise at unexpected timing to cause erroneous timing correction.

The format according to the first embodiment with the synchronization permissive interval being set during the non-switching period NSW is expected to be effective also to this difficulty. Specifically, the motor drive signals Dr1 and Dr2 are always switched outside the synchronization permissive interval in the configuration according to the first embodiment. Even when the synchronization signal is affected to cause an erroneous pulse edge, the pulse edge has timing expected to be out of the synchronization permissive interval. Even when the receiver microcomputer recognizes such a pulse edge of the synchronization signal caused due to switching of the motor drive signal Dr1 or Dr2, the pulse edge is out of the synchronization permissive interval and can be determined as abnormal synchronization timing. This prevents the receiver microcomputer from executing timing correction at erroneous timing.

Various application processing according to the first embodiment will be described next with reference to FIGS. 15 to 18.

(Processing Upon Booting)

Assume a case where the microcomputers boot independently and start driving the motor at different drive timing. Even when the motor is driven normally, synchronization signal reception timing is not included in the synchronization permissive interval and timing correction may thus not be permitted. Processing upon booting depicted in FIGS. 15 and 16 will accordingly be executed upon booting the receiver microcomputer.

Figure 15:
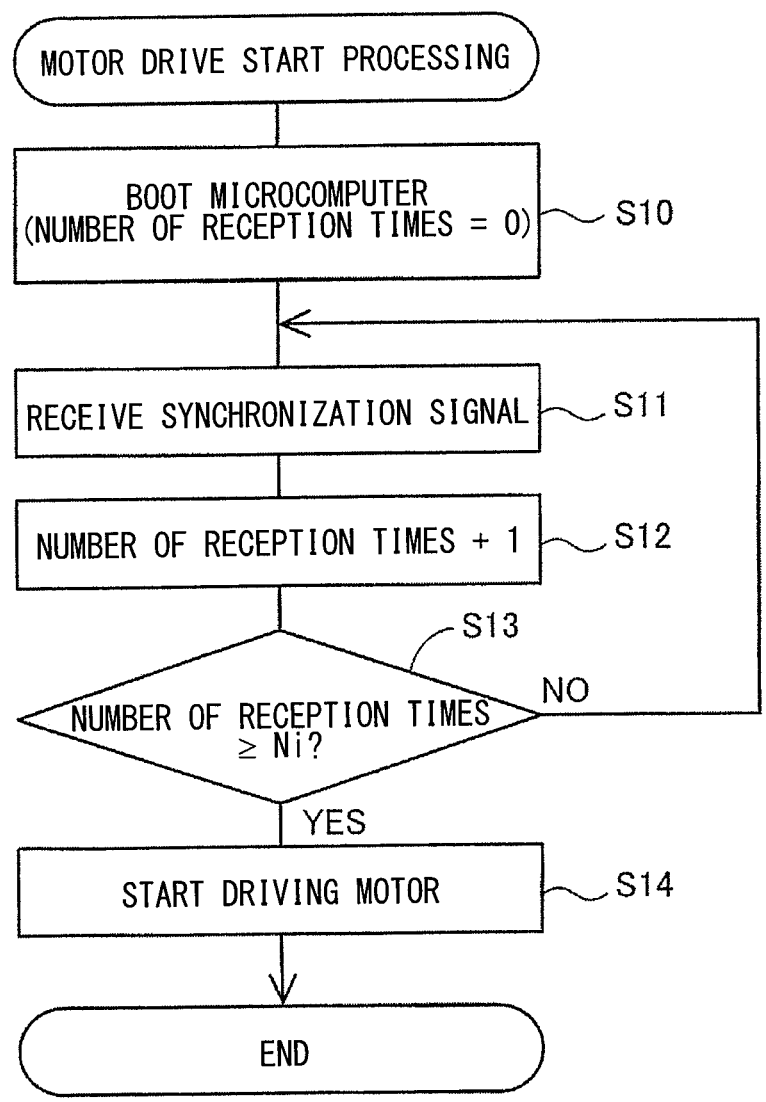
FIG. 15 is a flowchart of motor drive start processing upon microcomputer booting.

FIG. 15 is a flowchart of motor drive start processing upon microcomputer booting.

In S10, the second microcomputer 402 as the receiver microcomputer boots. The number of reception times upon booting has an initial value of zero. The timing corrector 422 receives a synchronization signal in S11 and increments the number of reception times in S12.

S13 includes determination of whether the number of reception times has reached an initial number of times Ni (≥2).

If YES in S13, the second microcomputer 402 starts driving the motor in S14. If NO in S13, the process flow returns to before S11.

The receiver microcomputer stands by motor drive start until receiving the synchronization signal from the transmitter microcomputer Ni times, and starts driving the motor synchronously with the transmitter microcomputer when receiving the synchronization signal Ni times. This enables appropriate synchronous drive start after the multiple microcomputers get ready for synchronization.

Figure 16:
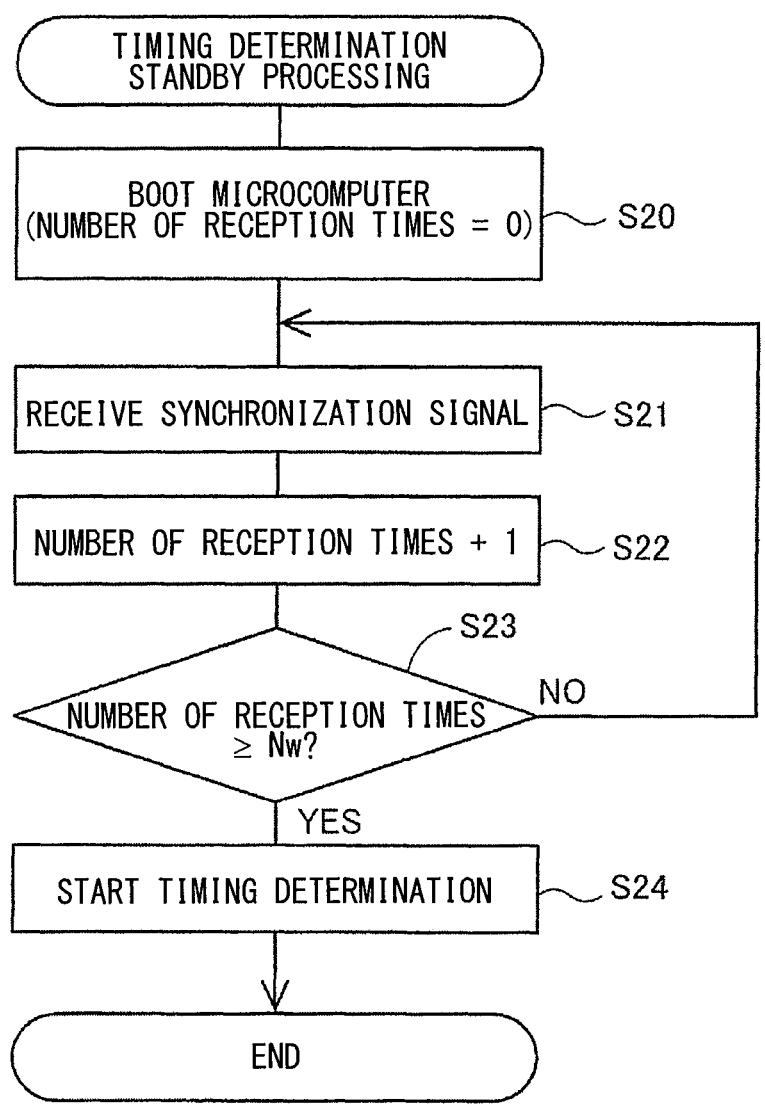
FIG. 16 is a flowchart of timing determination standby processing upon microcomputer booting.

FIG. 16 is a flowchart of timing determination standby processing upon microcomputer booting.

S20 to S22 are similar to S10 to S12 depicted in FIG. 15.

S23 includes determination of whether the number of reception times has exceeded a predetermined number of standby times Nw (≥1).

If YES in S23, the timing determiner 432 starts timing determination in S24. If NO in S23, the process flow returns to before S21.

The receiver microcomputer having booted permits timing correction without any condition until the synchronization signal is received Nw times. Timing determination is started as to the synchronization signals received (Nw+1)-th time and later. This appropriately prevents excessive prohibition of timing correction immediately after booting.

(Restoration Processing)

Even in a case where the transmitter microcomputer is reset or reinitialized to operate normally after transition to asynchronous drive due to temporary synchronization signal abnormality, synchronous drive will not restart directly. Restoration processing depicted in FIG. 17 will accordingly be executed.

Figure 17:
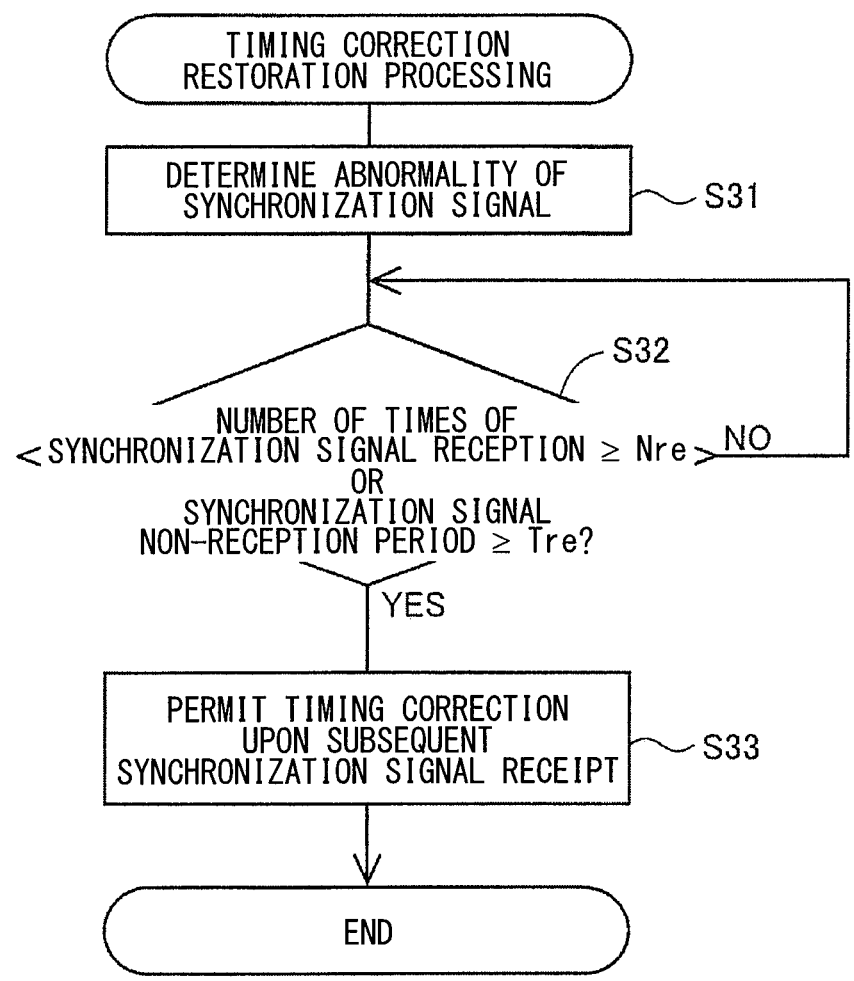
FIG. 17 is a flowchart of timing correction restoration processing after synchronization signal abnormality determination.

FIG. 17 is a flowchart of timing correction restoration processing after synchronization signal abnormality determination.

In S31, the timing corrector 422 determines the synchronization signal as being abnormal because synchronization signal reception timing is out of the synchronization permissive interval.

S32 includes determination of whether the number of times of synchronization signal reception after abnormality determination has reached a predetermined number of restoration times Nre (≥2), or whether no synchronization signal is received for predetermined restoration time Tre.

If YES in S32, the timing corrector 422 cancels timing correction prohibition in S33. Timing correction is permitted if reception timing is included in the synchronization permissive interval and the synchronization signal is determined as being normal after subsequent synchronization signal reception.

(Abnormality Confirmation Processing)

The synchronization signal may be erroneously determined as being abnormal because synchronization signal reception timing is out of the synchronization permissive interval due to temporary synchronization signal pulse disorder or the like, even though the transmitter microcomputer has no substantial abnormality. Timing correction may be prohibited excessively in this case. Abnormality confirmation processing depicted in FIG. 18 will accordingly be executed.

Figure 18:
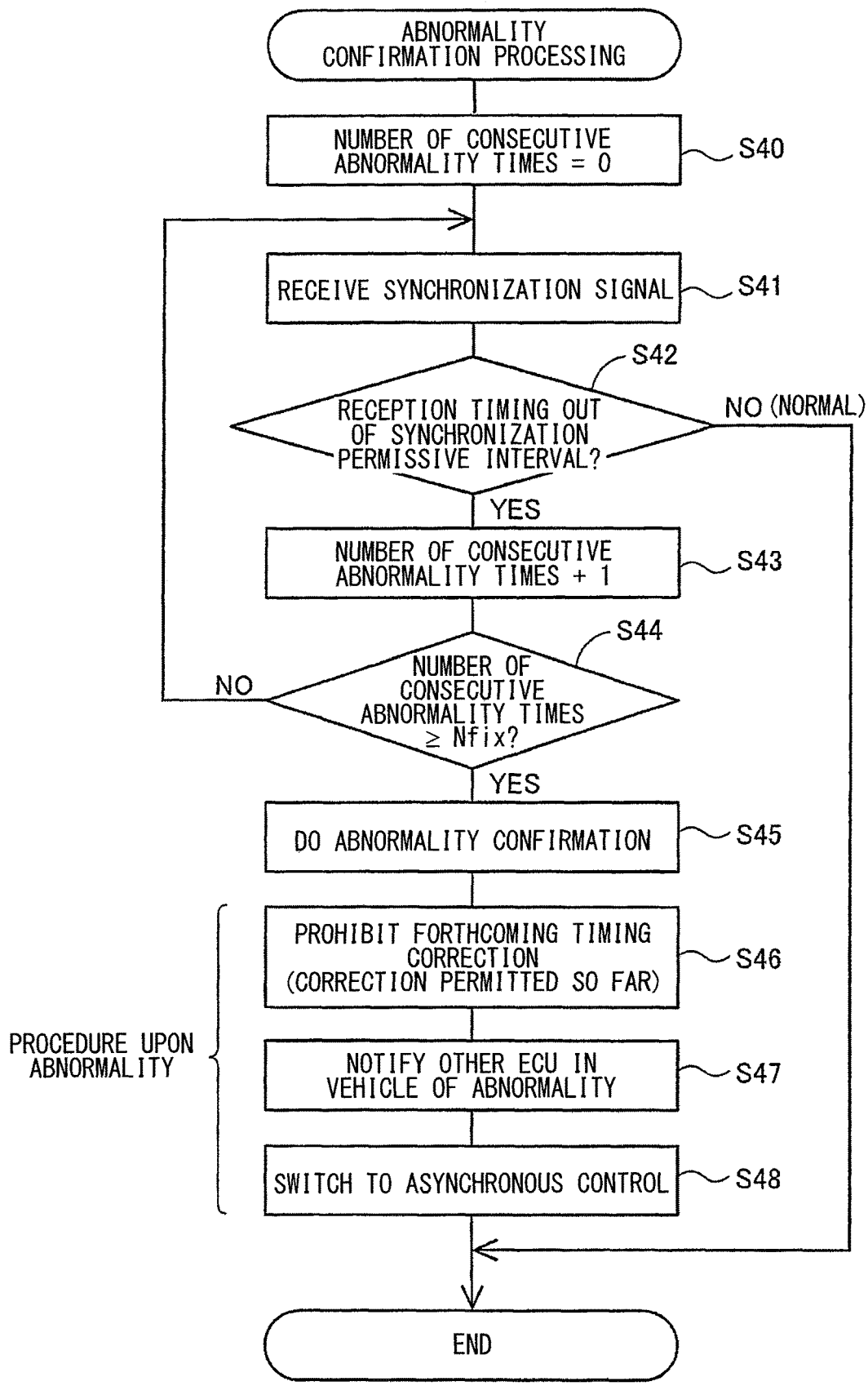
FIG. 18 is a flowchart of synchronization signal abnormality confirmation processing.

FIG. 18 is a flowchart of synchronization signal abnormality confirmation processing.

In S40, the timing determiner 432 sets, to zero, an initial value of the number of consecutive abnormality times as "the number of consecutive times of synchronization signal abnormality determination".

In S41, the timing corrector 422 receives the synchronization signal.

In S42, the timing determiner 432 determines whether synchronization signal reception timing is out of the synchronization permissive interval. If the synchronization signal is normal and if NO in S42, the processing ends. In this case, timing correction is executed in S04 in FIG. 12.

If YES in S42, the number of consecutive abnormality times is incremented in S43.

S44 includes determination of whether the number of consecutive abnormality times has reached a predetermined number of confirmation times Nfix. If YES in S44, the process flow proceeds to S45. If NO in S44, the process flow returns to before S41.

When the timing determiner 432 confirms synchronization signal abnormality in S45, the second microcomputer 402 prohibits forthcoming timing correction in S46, as the procedure upon abnormality. In other words, timing correction may be permitted and the second microcomputer 402 may continuously drive synchronously with the first microcomputer 401 until abnormality is confirmed. This prevents erroneous timing determination.

In S47, the second microcomputer 402 may execute, as the procedure upon abnormality, abnormality notification to "the other ECU 36 in the vehicle and the like" depicted in FIGS. 1 and 2, or alarm indication to a driver.

In S48, the second microcomputer 402 may switch to asynchronous control as the procedure upon abnormality. This asynchronous control includes modification or adjustment of a control condition in the asynchronous drive mode or the single system drive mode depicted in FIG. 12.

In the synchronous drive mode for the two systems, the current limiting value for each system is set to a half of the total current command value for the two systems. In the single system drive mode, the current limiting value for the normal single system is switched to substantially twice the value upon dual system drive to achieve motor output equivalent to normal output. According to the present embodiment, when the first microcomputer 401 generates an abnormal synchronization signal, the first microcomputer 401 is estimated to have failure and the current limiting value of the second microcomputer 402 is substantially doubled. Another embodiment may include control according to sensor signals acquired by the microcomputers while the motor is driven under synchronous control, and control according to only the sensor signal acquired by the own microcomputer without use of the sensor signal acquired by the other microcomputer while synchronous control is not available. Such a procedure exemplifies "switching to asynchronous control".

Second Embodiment

The second embodiment will be described with reference to FIGS. 19 and 20.

Figure 19:
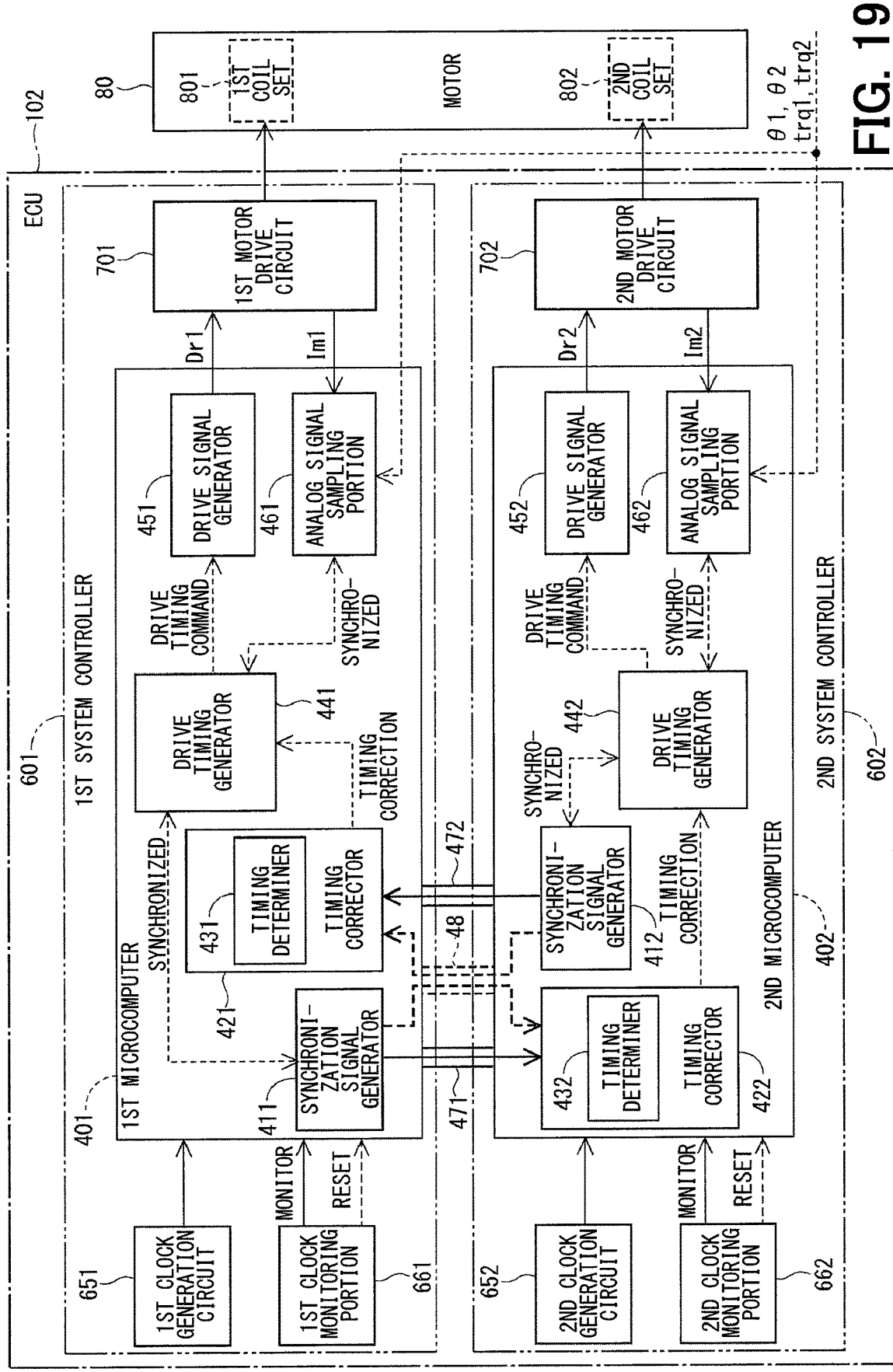
FIG. 19 is a configuration diagram of an ECU, which corresponds to a motor control apparatus, according to a second embodiment.

As depicted in FIG. 19, the second embodiment provides an ECU 102 including the first and second microcomputers 401 and 402 provided with synchronization signal generators 411 and 412 and timing correctors 421 and 422, respectively. The first microcomputer 401 and the second microcomputer 402 function as the "transmitter microcomputer" and the "receiver microcomputer", respectively, and mutually transmit and receive a synchronization signal.

A synchronization signal line according to this mode may include, as depicted by solid lines, a first synchronization signal line 471 for transmission from the first microcomputer 401 to the second microcomputer 402, and a separate second synchronization signal line 472 for transmission from the second microcomputer 402 to the first microcomputer 401. These synchronization signal lines 471, 472 may alternatively be replaced with a synchronization signal line 48 for bidirectional communication as depicted by a broken line. The synchronization signal line 48 for bidirectional communication, or at least one of the synchronization signal lines 471 and 472 for unidirectional communication, may be used in common with another signal line for communication between the microcomputers.

Figure 20:
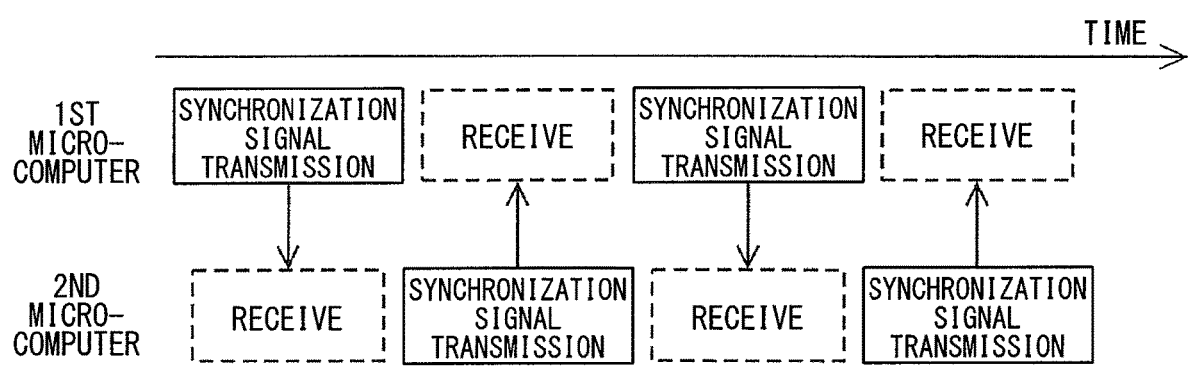
FIG. 20 is a chart indicating bidirectional synchronization signal transmission/reception timing according to the second embodiment.

When the common synchronization signal line 48 is adopted as a bidirectional signal line, as depicted in FIG. 20, timing of synchronization signal transmission from the first microcomputer 401 to the second microcomputer 402 is set not to match timing of reverse synchronization signal transmission. FIG. 20 particularly exemplifies a case where the microcomputers 401 and 402 alternately transmit the synchronization signals.

As in the first embodiment, the synchronization signals may be bidirectionally provided for notification not by means of bidirectional communication via the synchronization signal line but by means of level change of a port signal from the transmitter microcomputer to the receiver microcomputer.

In a case where the microcomputers 401 and 402 are boot at different timing, the initially booted microcomputer may transmit the synchronization signal to the subsequently booted microcomputer.

Still alternatively, the first microcomputer 401 may mainly transmit the synchronization signal to the second microcomputer 402, and the synchronization signal may be transmitted reversely only in a certain case. For example, the first microcomputer 401 may be booted synchronously with the synchronization signal from the second microcomputer 402 upon booting, and the second microcomputer 402 may then operate synchronously with the synchronization signal from the first microcomputer 401. When the first microcomputer 401 has abnormality and is reset, the first microcomputer 401 may determine own operation start timing and start operation in accordance with the synchronization signal from the second microcomputer 402. In this case, the first microcomputer 401 can restart driving the motor synchronously with the second microcomputer 402 after restoration from the abnormality.

The second embodiment provides the first microcomputer 401 and the second microcomputer 402 functioned identically with each other with complete redundancy. This configuration is ready for any failure pattern in any one of the systems, and thus achieves improvement in reliability.

The common synchronization signal line 48 for bidirectional communication is adopted and timing of synchronization signal transmission in one of the directions is set not to match timing of synchronization signal transmission in the other one of the directions. This achieves reduction in the number of components of the ECU as well as simplification in configuration of the ECU.

Third and Fourth Embodiments

The third and fourth embodiments will be described with reference to FIGS. 21 and 22.

The ECU 10 according to the third and fourth embodiments basically includes the configuration depicted in FIG. 7 according to the first embodiment. The third and fourth embodiments provide received signal determination not by determination of synchronization signal reception timing but by adoption of a synchronization signal having a specific pulse pattern for determination of normality or abnormality of the synchronization signal. The "timing determiner 432" in the timing corrector 422 of the second microcomputer 402 is thus replaced with a "received signal determiner 432".

Processing to be executed when the received signal determiner 432 according to the third or fourth embodiment determines the synchronization signal as being normal or abnormal is similar to that according to the first embodiment.

The specific pulse pattern has a number of pulses, duration, or an interval prescribed per cycle. Unlike FIGS. 11 and 14, FIGS. 21 and 22 do not clearly indicate a cause of synchronization signal abnormality but simply indicate difference between a normal pulse pattern and an abnormal pulse pattern.

Figure 21:
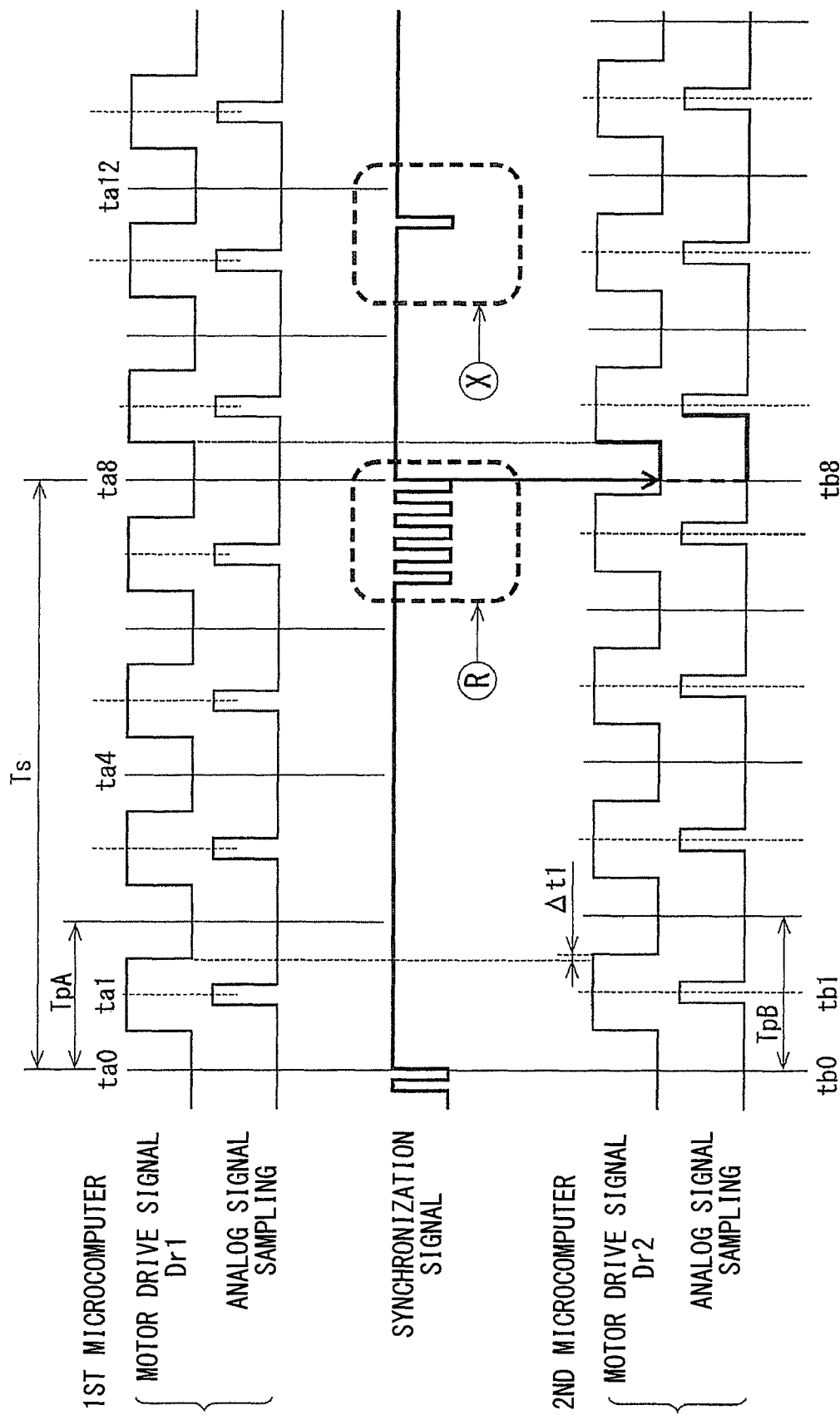
FIG. 21 is a timing chart according to a third embodiment, with a synchronization signal having a specific pulse pattern.

As indicated in a portion R in FIG. 21 according to the third embodiment, the synchronization signal is determined as being normal if a clock having predetermined duration is inputted k times as a prescribed number of times. The receiver microcomputer executes timing correction, in other words, synchronization of drive timing between the microcomputers, at k-th clock input timing.

If the synchronization signal has different pulse duration or has a different consecutive number of times as indicated in a portion X, timing correction is not executed and the motor is driven asynchronously.

The fourth embodiment includes, when a clock line for serial communication or the like is adopted as a synchronization signal line in a configuration for commonality between a synchronization signal and a different signal, calculation of reliability of received data according to the CRC method or the like with reception of serial communication as a trigger. Synchronization between the microcomputers is permitted if proper communication is found to be executed.

Figure 22:
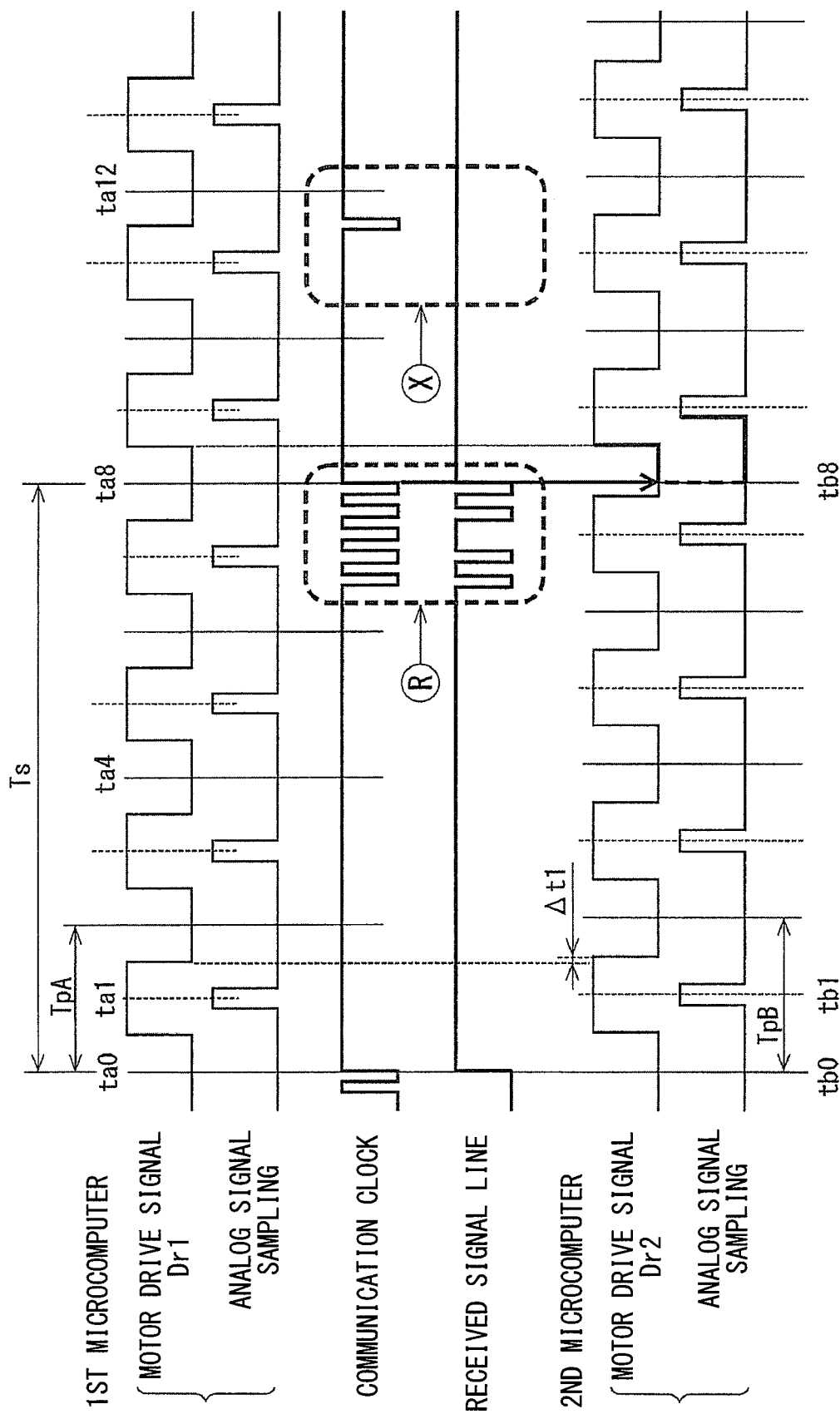
FIG. 22 is a timing chart according to a fourth embodiment, with a synchronization signal having a specific pulse pattern.

FIG. 22 indicates a pulse of a communication clock and a pulse of a received signal line according to the fourth embodiment. In the portion R, timing correction is executed with reception completion timing as a reference when CRC normality is determined. Timing correction may be executed in accordance with any appropriately set specific method, such as synchronization through correction by time required for CRC calculation.

In the portion X, timing correction is not executed with determination as abnormal timing due to CRC inconsistency.

In this manner, the received signal determiner 432 is configured to determine normality or abnormality of the synchronization signal in accordance with a specific pulse pattern, instead of the method by means of synchronization signal reception timing in the first embodiment.

Processing depicted in FIGS. 15 to 18 is applicable also to the format according to the third or fourth embodiment for execution of received signal determination according to a specific pulse pattern. The third or fourth embodiment is applicable to the format according to the second embodiment of bidirectional synchronization signal transmission and reception.

Fifth Embodiment

The fifth embodiment will be described with reference to FIGS. 23 to 34.

Figure 23:
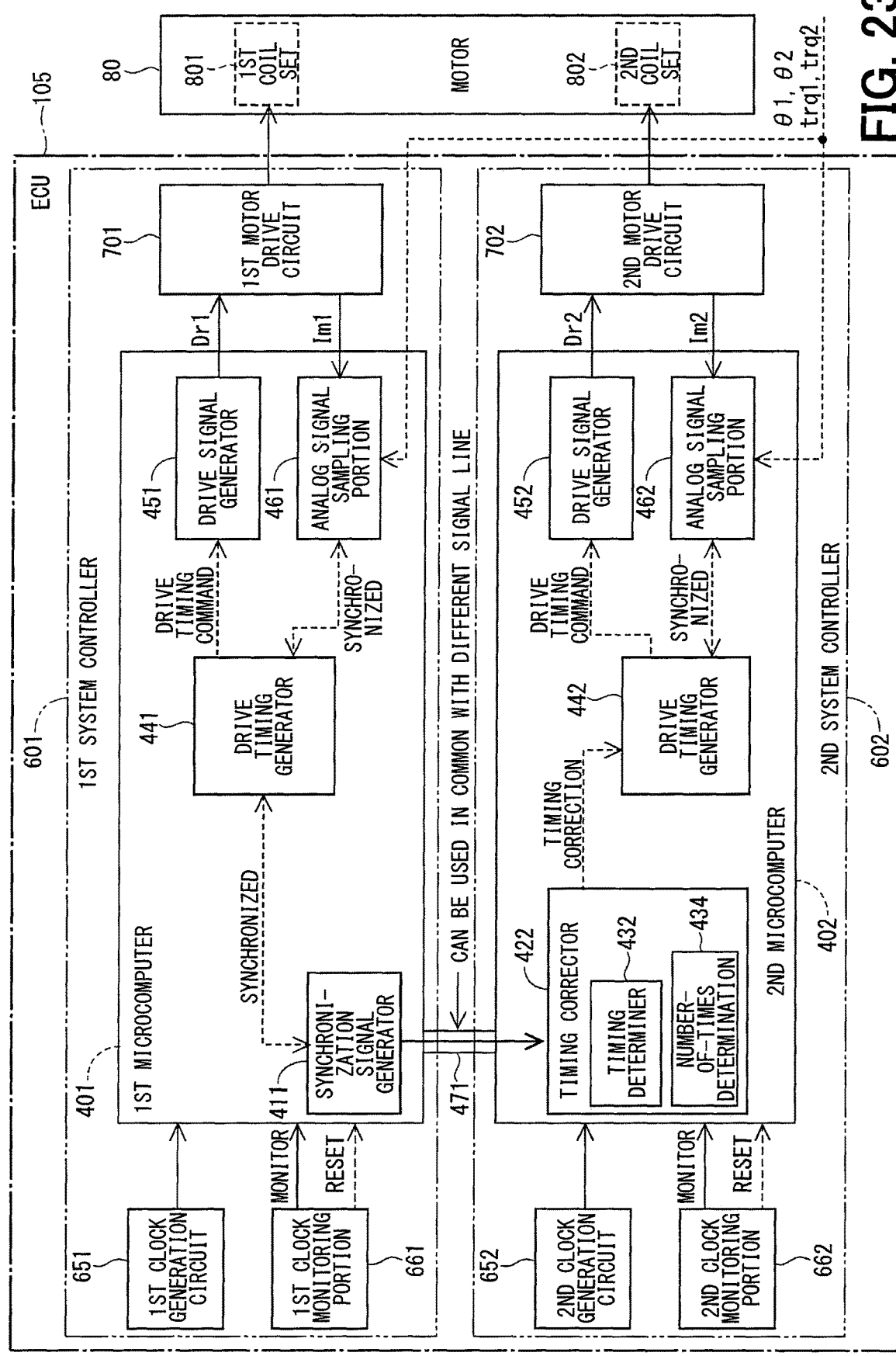
FIG. 23 is a configuration diagram of an ECU, which corresponds to a motor control apparatus, according to fifth and sixth embodiments.

FIG. 23 depicts a configuration of an ECU 105 commonly adopted in the fifth and sixth embodiments. In comparison to the ECU 101 according to the first embodiment, the ECU 105 includes the second microcomputer 402 provided with the timing corrector 422 including the timing determiner 432 as well as a number-of-times determiner 434.

The number-of-times determiner 434 monitors the number of times of synchronization signal reception or the number of times of normality determination in timing determination and execution of timing correction, during a number-of-times monitoring period set to be at least overlapped with part of the synchronization permissive interval. Hereinafter, "the number of times of execution of timing correction" will be abbreviated as "the number of correction times". The number-of-times determiner 434 executes "number-of-times determination" of determining whether the number of times of synchronization signal reception or the number of correction times is normal or abnormal.

The timing corrector 422 executes two types of determination processing, namely, timing determination by the timing determiner 432 and number-of-times determination by the number-of-times determiner 434. The second microcomputer 402 permits timing correction when the received synchronization signal is determined as being normal in timing determination and the number of times of synchronization signal reception or the number of correction times is determined as being normal in number-of-times determination.

The first embodiment includes normality determination in timing determination as a necessary and sufficient condition for permission of timing correction. In contrast, the fifth and sixth embodiments include normality determination in timing determination as a necessary condition but not as a sufficient condition for permission of timing correction.

In short, according to the inclusive technical idea of the first, fifth, and sixth embodiments, the second microcomputer 402 permits timing correction "in accordance with at least determination of the received synchronization signal as being normal in timing determination".

Number-of-times determination by the number-of-times determiner 434 will be described in detail below in terms of technical significance, a specific format, and a functional effect thereof. That is, the fifth embodiment provides abnormality determination if the number of times of synchronization signal reception or the number of correction times is too large, whereas the sixth embodiment provides abnormality determination if the number of times of synchronization signal reception or the number of correction times is too small.

The fifth and sixth embodiments assume, similarly to the first embodiment, application to the format of timing determination according to whether the synchronization signal is received during the synchronization permissive interval. The number-of-times monitoring period is set "to be at least overlapped with part of the synchronization permissive interval" in this case.

Application to the format of timing determination with use of a signal having a specific pulse pattern according to the third and fourth embodiments will be described in other embodiments.

The fifth embodiment will be described initially.

Figure 24:
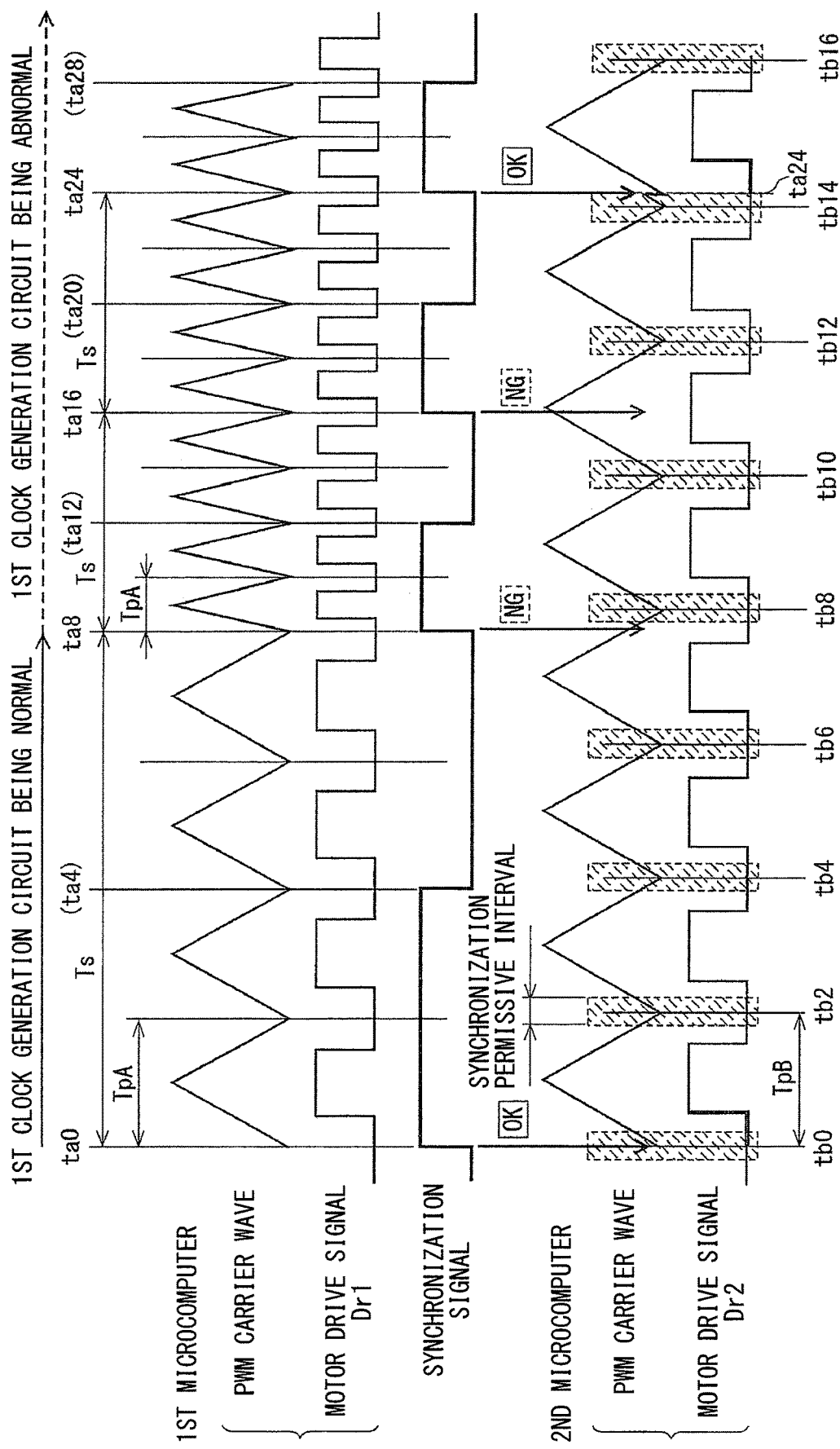
FIG. 24 is a timing chart indicating PWM carrier waves in place of analog signal sampling waveforms indicated in FIG. 14.

FIG. 24 indicates PWM carrier waves in place of the analog signal sampling waveforms indicated in the timing chart upon synchronization signal abnormality in FIG. 14. As described earlier, timing correction is executed at the timing ta24 because synchronization signal reception timing is included in the synchronization permissive interval even after abnormality occurrence. Timing correction is executed without difficulty because the timing ta24 of synchronization signal reception is close to bottom timing tb14 of the PWM carrier wave of the second microcomputer 402.

The PWM carrier wave of the second microcomputer 402 upon timing correction will be observed below.

Figure 25:
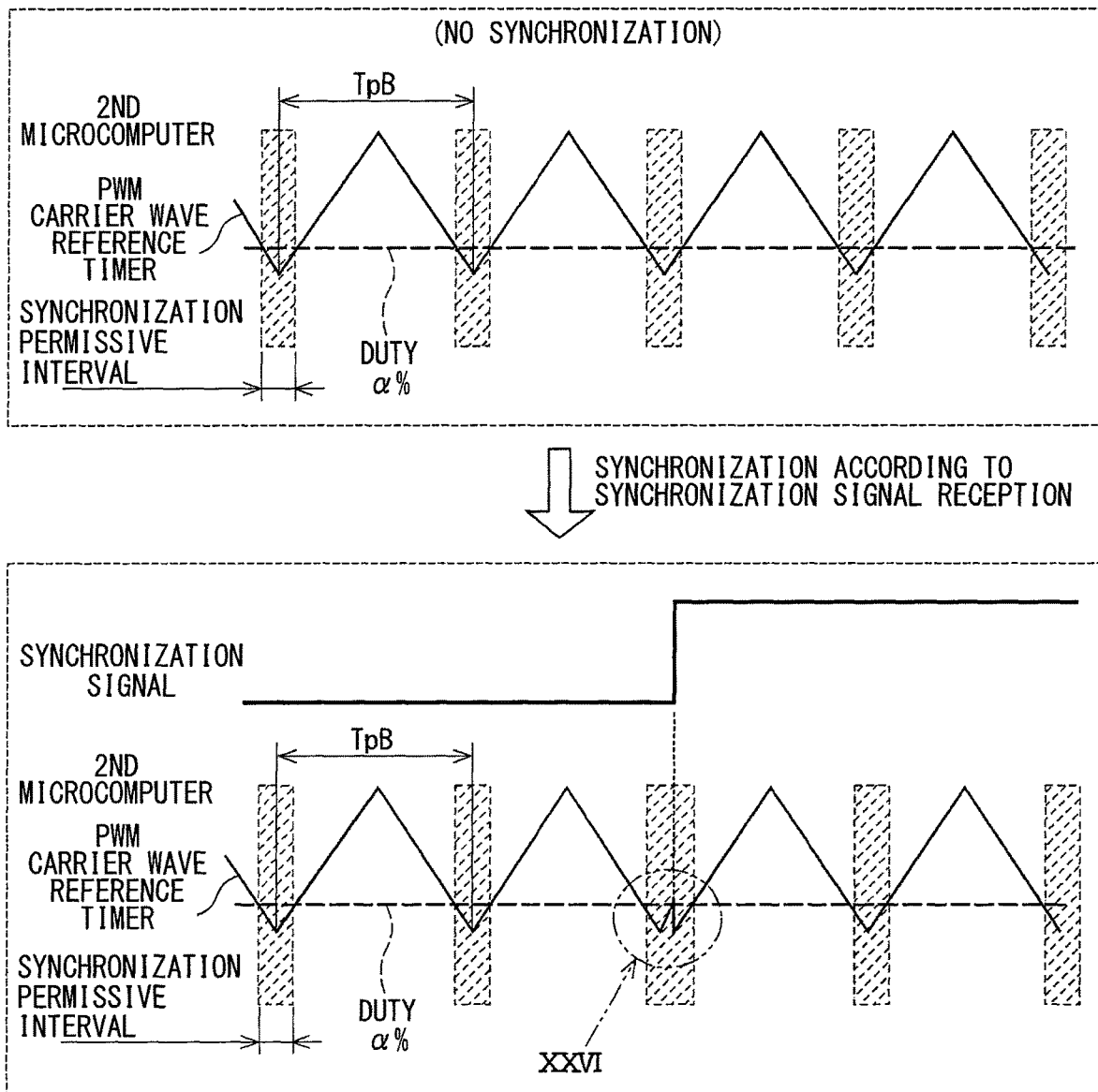
FIG. 25 is an explanatory chart indicating update of the synchronization permissive interval through timing correction.

FIG. 25 indicates a waveform of the PWM carrier wave of the second microcomputer 402, and the waveform indicates operation of a reference timer that generates the PWM carrier wave. When the second microcomputer 402 is not synchronized with the first microcomputer 401, the PWM carrier wave reference timer of the second microcomputer 402 operates at the constant cycle TpB. When timing correction is executed in accordance with the synchronization signal received from the first microcomputer 401, the reference timer of the second microcomputer 402 is also synchronized. The synchronization permissive interval, which corresponds to "a period from fall timing to rise timing of the motor drive signal Dr at the DUTY ratio of α% (e.g. α=95%)", is also updated.

Figure 26:
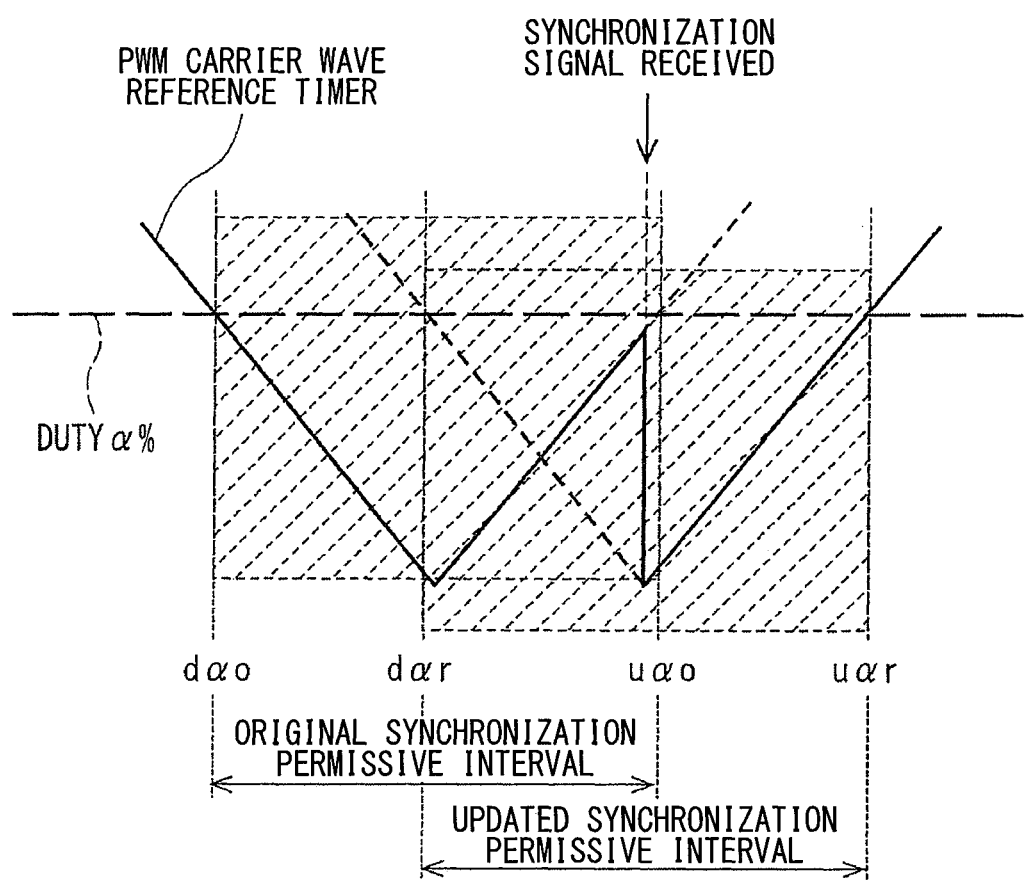
FIG. 26 is an enlarged view of a XXVI portion indicated in FIG. 25.

As indicated in an enlarged view of the PWM carrier wave reference timer upon synchronization signal receipt in FIG. 26, the synchronization permissive interval is originally set as "a period from fall timing dαo to rise timing uαo". When timing correction is executed due to synchronization signal reception and the reference timer is synchronized, the synchronization permissive interval is updated to "a period from fall timing dαr to rise timing uαr". If the second microcomputer 402 receives the synchronization signal immediately after bottom timing of the PWM carrier wave, the synchronization permissive interval has end timing delayed from the original timing before reception.

Figure 27:
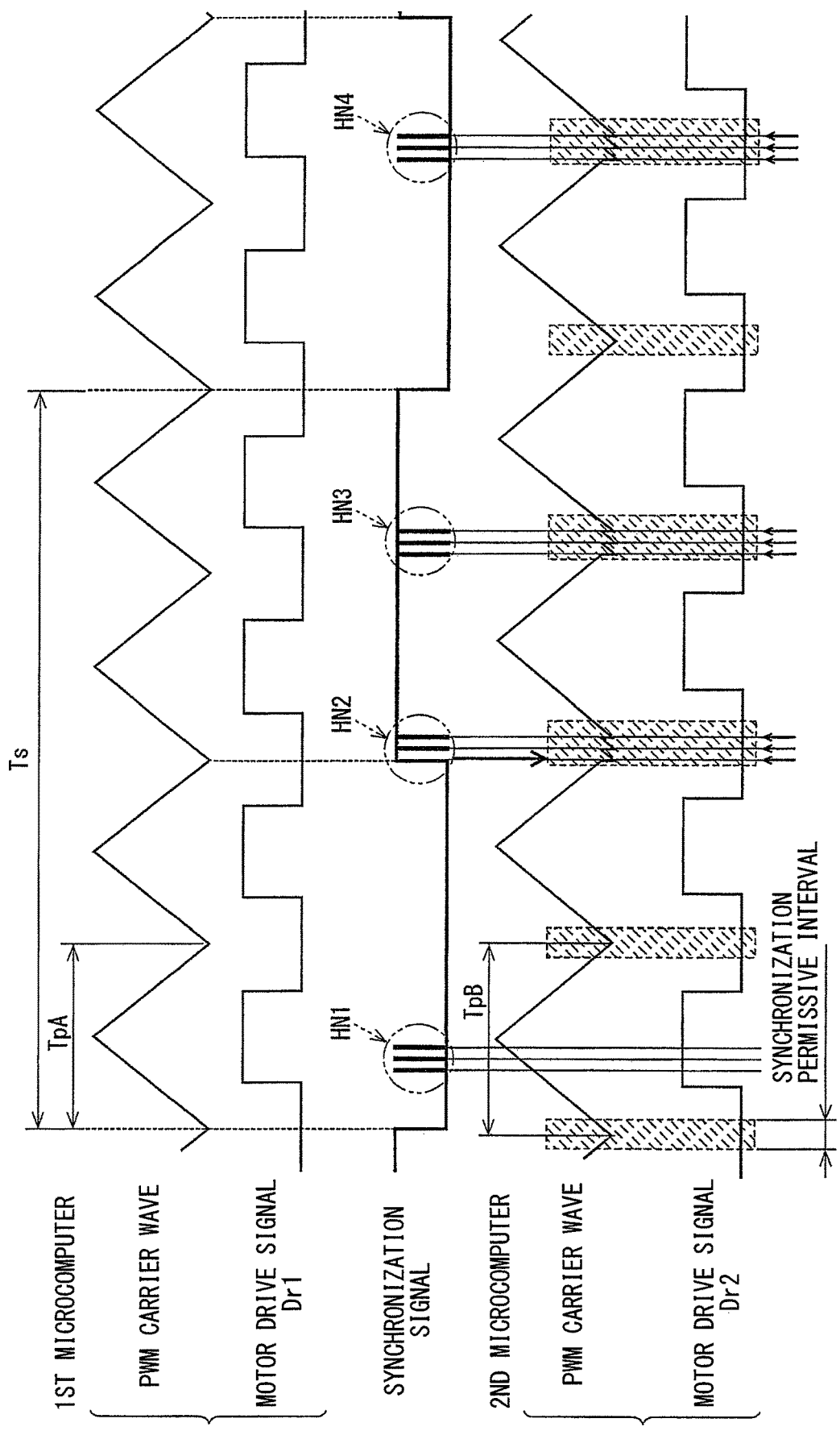
FIG. 27 is an explanatory timing chart indicating operation of a receiver microcomputer in a case where high frequency noise is superimposed on a synchronization signal.

In view of such a principle, operation of the second microcomputer 402 in a case where high frequency noise is superimposed on the synchronization signal will be described next with reference to FIG. 27. Portions HN1 to HN4 each schematically indicate high frequency noise superimposed on the synchronization signal at corresponding timing.

The high frequency noise HN1 is generated at timing outside the synchronization permissive interval. Abnormality is determined in timing determination and timing correction is thus not executed in this case.

The high frequency noise HN2 is generated consecutively at a rising edge of the synchronization signal during the synchronization permissive interval. The high frequency noise HN3 is generated during the synchronization permissive interval while the pulse of the synchronization signal is ON. The high frequency noise HN4 is generated during the synchronization permissive interval while the pulse of the synchronization signal is OFF. Normality is determined in timing determination and timing correction is thus permitted in this case.

If noise is received multiple times during the identical synchronization permissive interval, timing correction is executed and the synchronization permissive interval is updated each time. If subsequent noise is received during the updated synchronization permissive interval, the synchronization permissive interval is updated again to be extended.

Figure 28:
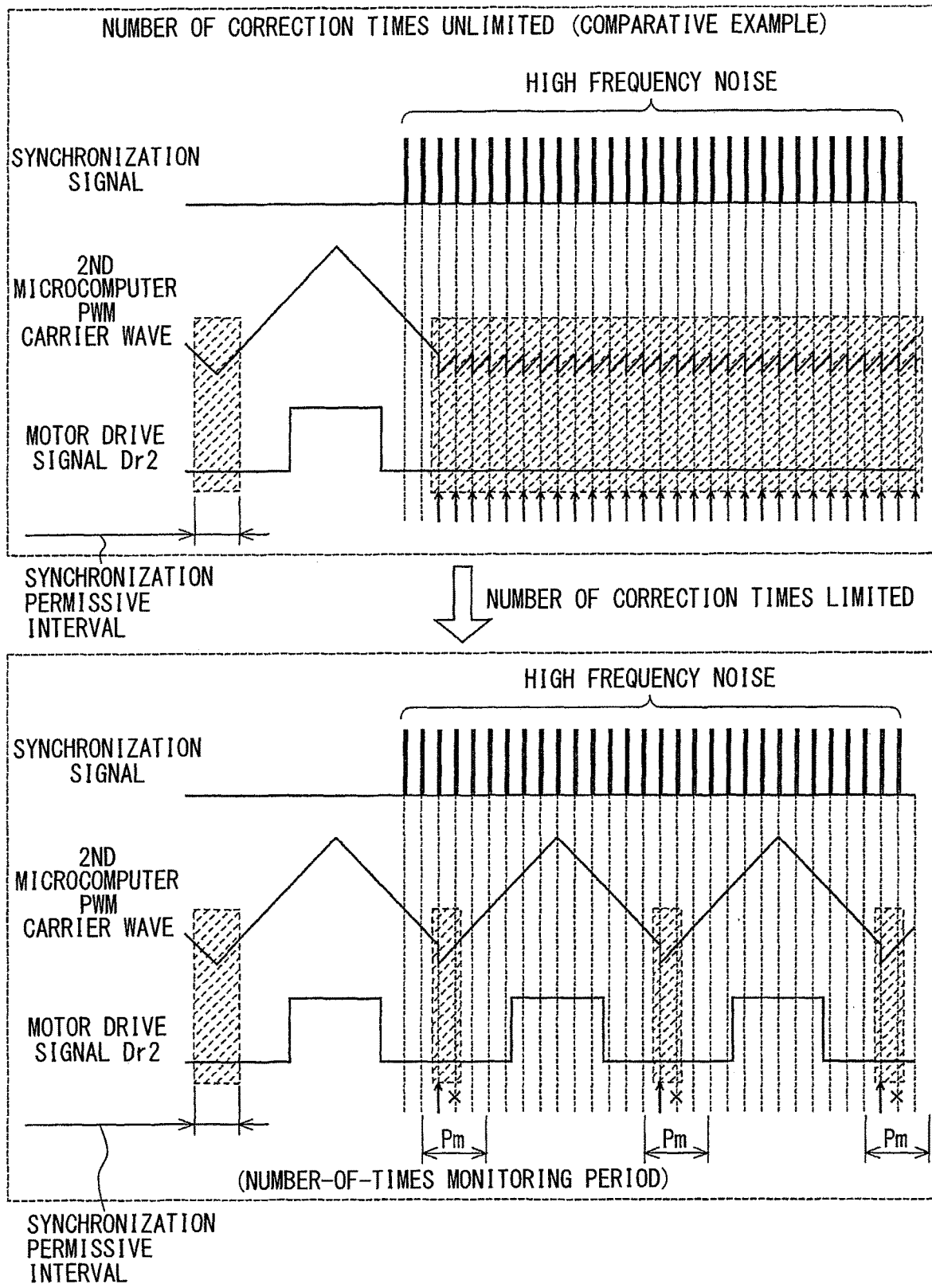
FIG. 28 is an explanatory timing chart indicating operation of the receiver microcomputer in a case where high frequency noise is consecutively superimposed on a synchronization signal.

FIG. 28 indicates operation of the second microcomputer 402 in a case where high frequency noise is consecutively superimposed on the synchronization signal.

As indicated in an upper portion of FIG. 28 according to a comparative example with no limitation to the number of times of timing correction, when high frequency noise is consecutively superimposed on the synchronization signal, the synchronization permissive interval is kept updated. The motor drive signal Dr2 is then kept OFF to bring into an uncontrollable state while motor drive is kept stopped. Synchronous control as the original object of the two-redundant-system configuration may fail depending on timing of noise superimposed on the synchronization signal.

The format for execution of timing determination upon every receipt of the synchronization signal requires enormous arithmetic capacity for timing determination itself when the synchronization signal is received multiple times with superimposition of high frequency noise.

As indicated in a lower portion of FIG. 28, the second microcomputer 402 according to the fifth embodiment limits the number of times of timing correction at least during a number-of-times monitoring period Pm overlapped with part of the synchronization permissive interval. The second microcomputer 402 permits timing correction only once during a single synchronization permissive interval Pm, and then prohibits second or subsequent timing correction until a predetermined period elapses. Timing correction will not be executed even if second noise is received within the identical synchronization permissive interval Pm, so that the PWM carrier wave rises and the motor drive signal Dr2 is switched ON.

The fifth embodiment thus prevents the second microcomputer 402 from being synchronized with the first microcomputer 401 to come into a motor drive uncontrollable state even in a case where high frequency noise is superimposed on the synchronization signal.

Limiting the number of times of timing determination itself leads to prevention of consumption of enormous arithmetic capacity due to execution of timing determination multiple times.

FIGS. 29 to 34 are flowcharts of specific number-of-times determination arithmetic executed by the number-of-times determiner 434 according to the fifth embodiment.

Four process examples will be numbered by (1) to (4), which is also referred to as the first process example to the fourth process example. The flowcharts according to the process examples as well as the sixth embodiments have common step numbers for substantially identical steps, and thus each have some missing number. The process examples have explanatory notes provided with item numbers such as [a1], and an explanatory note same as that of any preceding process example will have the same item number.

When the synchronization signal is determined as being abnormal in timing determination or number-of-times determination in each of the process examples, the second microcomputer 402 may execute the procedure upon abnormality depicted in FIG. 18 or the like.

First Process Example

Figure 29:
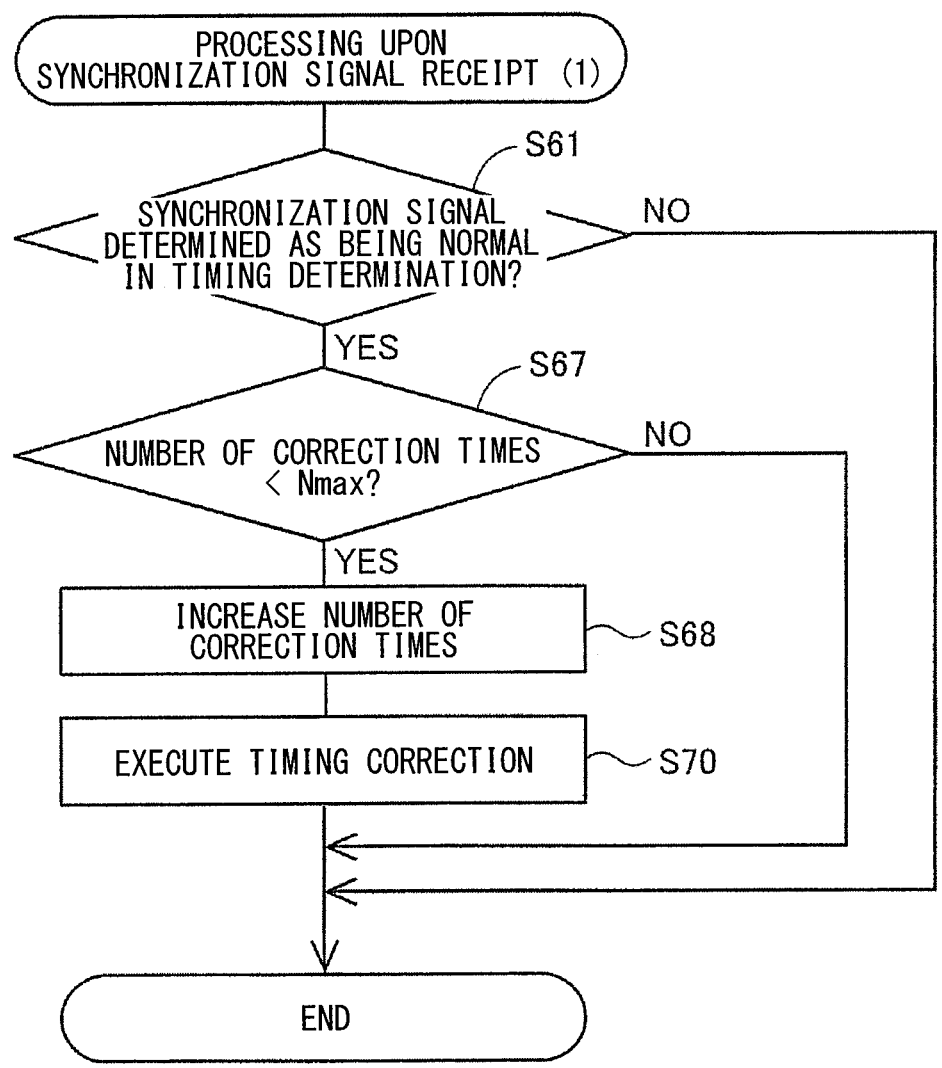
FIG. 29 is a flowchart of processing upon synchronization signal receipt (1) according to a process example (1)
Figure 30:
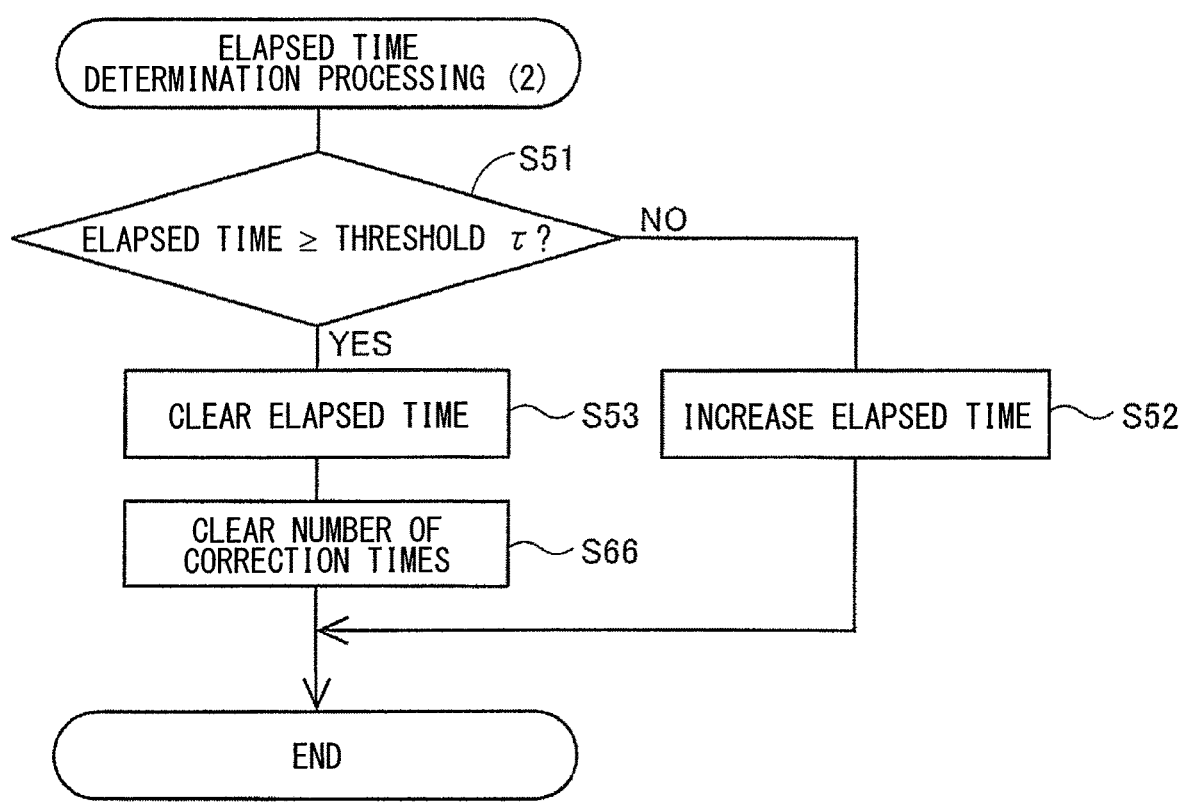
FIG. 30 is a flowchart of elapsed time determination processing (1) according to the process example (1)

FIGS. 29 and 30 are flowcharts of processing upon synchronization signal receipt (1) and elapsed time determination processing (1), respectively, according to the first process example. According to the first process example, the number-of-times determiner 434 determines normality if the number of correction times during the number-of-times monitoring period preliminarily set is not more than a maximum number of times Nmax, and determines abnormality if the number of correction times exceeds the maximum number of times Nmax.

The number-of-times determiner 434 clears the number of correction times each time the elapsed time reaches a threshold $\tau$. The number-of-times determiner 434 then increases the number of correction times each time the synchronization signal is received during the synchronization permissive interval and normality is determined in timing determination. If the increased number of correction times exceeds the maximum number of times Nmax, timing correction will not thereafter be executed even during the synchronization permissive interval.

The processing upon synchronization signal receipt (1) will be described with reference to FIG. 29.

If the synchronization signal is determined as being normal in timing determination upon synchronization signal receipt, YES is determined in S61 and the process flow proceeds to S67. If the synchronization signal is determined as being abnormal in timing determination, NO is determined in S61 and the process flow ends.

YES is determined in S67 if the number of correction times after last clearing is normal with the number of correction times before increased being less than the maximum number of times Nmax and the number of correction times increased once being not more than the maximum number of times Nmax. After the number of correction times is increased in S68, timing correction is executed in S70. NO is determined in S67 and the process flow ends if the number of correction times is abnormal with the number of correction times before increased being not less than the maximum number of times Nmax and the number of correction times increased once exceeding the maximum number of times Nmax.

If NO in S61 or NO in S67, timing correction is not executed.

The elapsed time determination processing (1) will be described with reference to FIG. 30.

Before the elapsed time reaches the threshold $\tau$ after the last clearing, NO is determined in S51 and the elapsed time is increased in S52. If the elapsed time reaches the threshold $\tau$, YES is determined in S51, the elapsed time is cleared in S53, and the number of correction times is cleared in S66.

Explanatory notes of the first process example will be described below.

[a1] The processing upon synchronization signal receipt is desirably executed while interrupting synchronization signal reception.

If synchronization signal reception timing is stored and the elapsed time from the synchronization signal reception timing may be corrected upon execution of timing correction, the processing upon synchronization signal receipt may be executed without interrupting.

[b1] The elapsed time determination processing may be executed during interruption set to occur if the elapsed time reaches the threshold τ. There is no need to execute the elapsed time determination processing in this case.

Alternatively, interruption may be set to occur during each of divisional periods (τ/p) obtained by dividing the threshold τ by p (p is an integer equal to or larger than two), and the elapsed time may be regarded as reaching the threshold τ if interruption occurs p times.

Second Process Example

Figure 31:
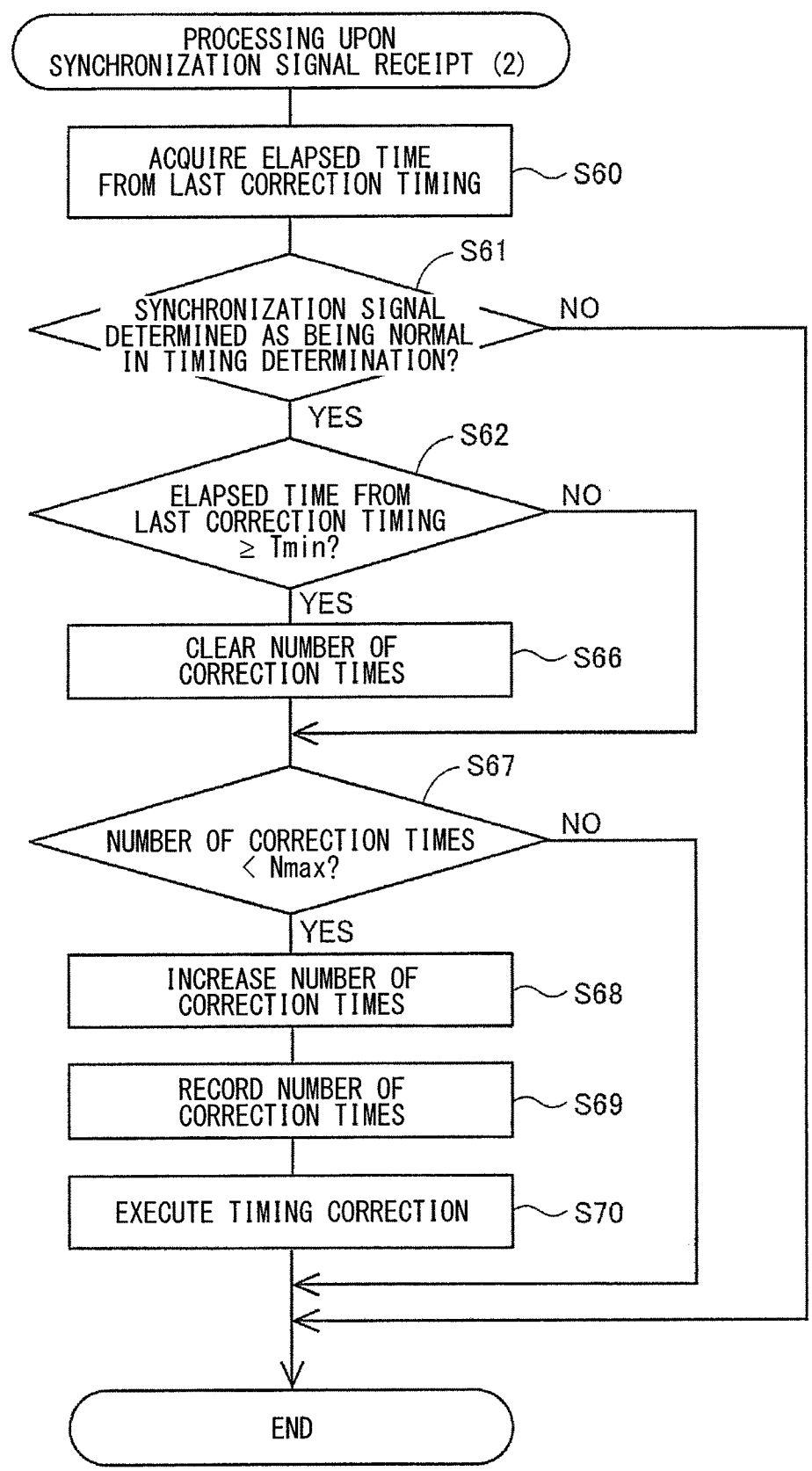
FIG. 31 is a flowchart of processing upon synchronization signal receipt (2) according to a process example (2)

FIG. 31 is a flowchart of processing upon synchronization signal receipt (2) according to the second process example. According to the second process example, the number-of-times determiner 434 determines normality if the number of correction times during the single synchronization permissive interval is not more than the maximum number of times Nmax, and determines abnormality if the number of correction times exceeds the maximum number of times Nmax.

The number-of-times determiner 434 stores correction timing if the timing correction is executed during the synchronization permissive interval. The number-of-times determiner 434 turns ON a synchronization permissive interval elapse flag when the synchronization permissive interval elapses. Upon receipt of a subsequent synchronization signal, the number-of-times determiner 434 clears the number of correction times if the synchronization permissive interval elapse flag is ON or the elapsed time from last correction timing is not less than minimum time Tmin. Timing correction executed in this case is regarded as first timing correction during the corresponding synchronization permissive interval.

Upon receipt of the subsequent synchronization signal, the number-of-times determiner 434 increases the number of correction times if the synchronization permissive interval elapse flag is not ON or the elapsed time from last correction timing is less than the minimum time Tmin. The number-of-times determiner 434 determines abnormality if the increased number of correction times exceeds the maximum number of times Nmax.

The processing upon synchronization signal receipt (2) will be described with reference to FIG. 31.

Upon synchronization signal receipt, the elapsed time from last correction timing is acquired in S60.

If the synchronization signal is determined as being normal in timing determination, YES is determined in S61 and the process flow proceeds to S62. If the synchronization signal is determined as being abnormal in timing determination, NO is determined in S61 and the process flow ends.

After YES is determined in S61, YES is determined in S62 if the elapsed time from last correction timing is not less than the minimum time Tmin, the number of correction times is cleared in S66, and the process flow proceeds to S67. NO is determined in S62 if the elapsed time from last correction timing is less than the minimum time Tmin, and the process flow skips S66 and proceeds to S67.

YES is determined in S67 if the number of correction times after last clearing is normal with the number of correction times before increased being less than the maximum number of times Nmax and the number of correction times increased once being not more than the maximum number of times Nmax. After the number of correction times is increased subsequently in S68, correction timing is recorded in S69 and timing correction is executed in S70.

NO is determined in S67 and the process flow ends if the number of correction times is abnormal with the number of correction times before increased being not less than the maximum number of times Nmax and the number of correction times increased once exceeding the maximum number of times Nmax.

If NO in S61 or NO in S67, timing correction is not executed.

Explanatory notes of the second process example will be described below.

The item [a1] relevant to the processing upon synchronization signal receipt is in common with that in the first process example.

[b2] The elapsed time determination processing may include determining a flag turned ON during interruption, when an interruption timer is preliminarily started after elapse of the synchronization permissive interval in correction timing recording processing.

[c] The number-of-times determiner 434 alternatively determines the elapsed time upon acquisition of the elapsed time from last correction timing and turns ON an elapse determination flag. The number-of-times determiner 434 may determine that the elapse determination flag is ON if the synchronization signal is determined as being normal in timing determination, and turn OFF the elapse determination flag upon correction timing recording.

[d] If elapsed time from last capture timing may be acquired in input capture processing by the second microcomputer 402 with synchronization signal reception or the like as a trigger, the number-of-times determiner 434 may integrate the elapsed time to obtain the elapsed time.

Third Process Example

Figure 32:
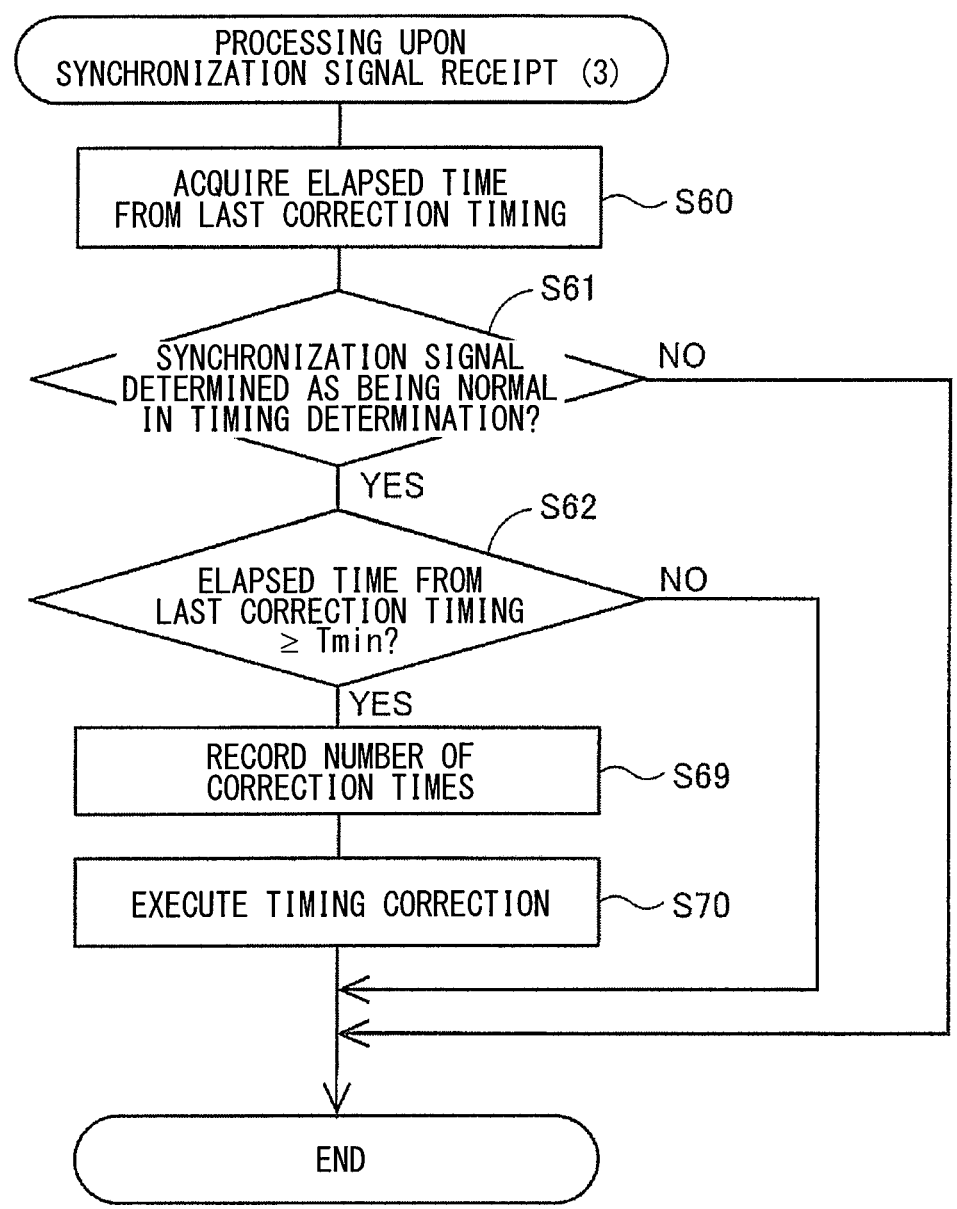
FIG. 32 is a flowchart of processing upon synchronization signal receipt (3) according to a process example (3)

FIG. 32 is a flowchart of processing upon synchronization signal receipt (3) according to the third process example. According to the third process example, the number-of-times determiner 434 determines that the number of correction times exceeds an expected number of times if normality is determined in timing determination and the elapsed time from last correction timing is shorter than the minimum time Tmin corresponding to a minimum interval between expected correction timing. The second microcomputer 402 will not permit subsequent timing correction even during the synchronization permissive interval until the elapsed time reaches the minimum time Tmin after execution once of timing correction.

Assuming that timing correction is normally executed twice during 200 [μs], the minimum time Tmin is set to (200/2)=100 [μs]. The second microcomputer 402 will not execute subsequent timing correction until 100 [μs] elapses after execution once of timing correction.

The processing upon synchronization signal receipt (3) will be described with reference to FIG. 32.

Upon synchronization signal receipt, the elapsed time from last correction timing is acquired in S60.

If the synchronization signal is determined as being normal in timing determination, YES is determined in S61 and the process flow proceeds to S62. If the synchronization signal is determined as being abnormal in timing determination, NO is determined in S61 and the process flow ends.

After YES is determined in S61, YES is determined in S62 if the elapsed time from last correction timing is not less than the minimum time Tmin, the correction timing is recorded in S69, and timing correction is executed in S70. NO is determined in S62 and the process flow ends if the elapsed time from last correction timing is less than the minimum time Tmin.

If NO in S61 or in S62, timing correction is not executed.

Explanatory notes of the third process example will be described below.

The item [a1] relevant to the processing upon synchronization signal receipt is in common with that in each of the process examples (1) and (2).

[b3] The elapsed time determination processing may include determining that the elapsed time has reached the minimum time Tmin during interruption, when an interruption timer is preliminarily started after elapse of the minimum time Tmin in the correction timing recording processing.

The items [c] and [d] are in common with those in the second process example.

Fourth Process Example

Figure 33:
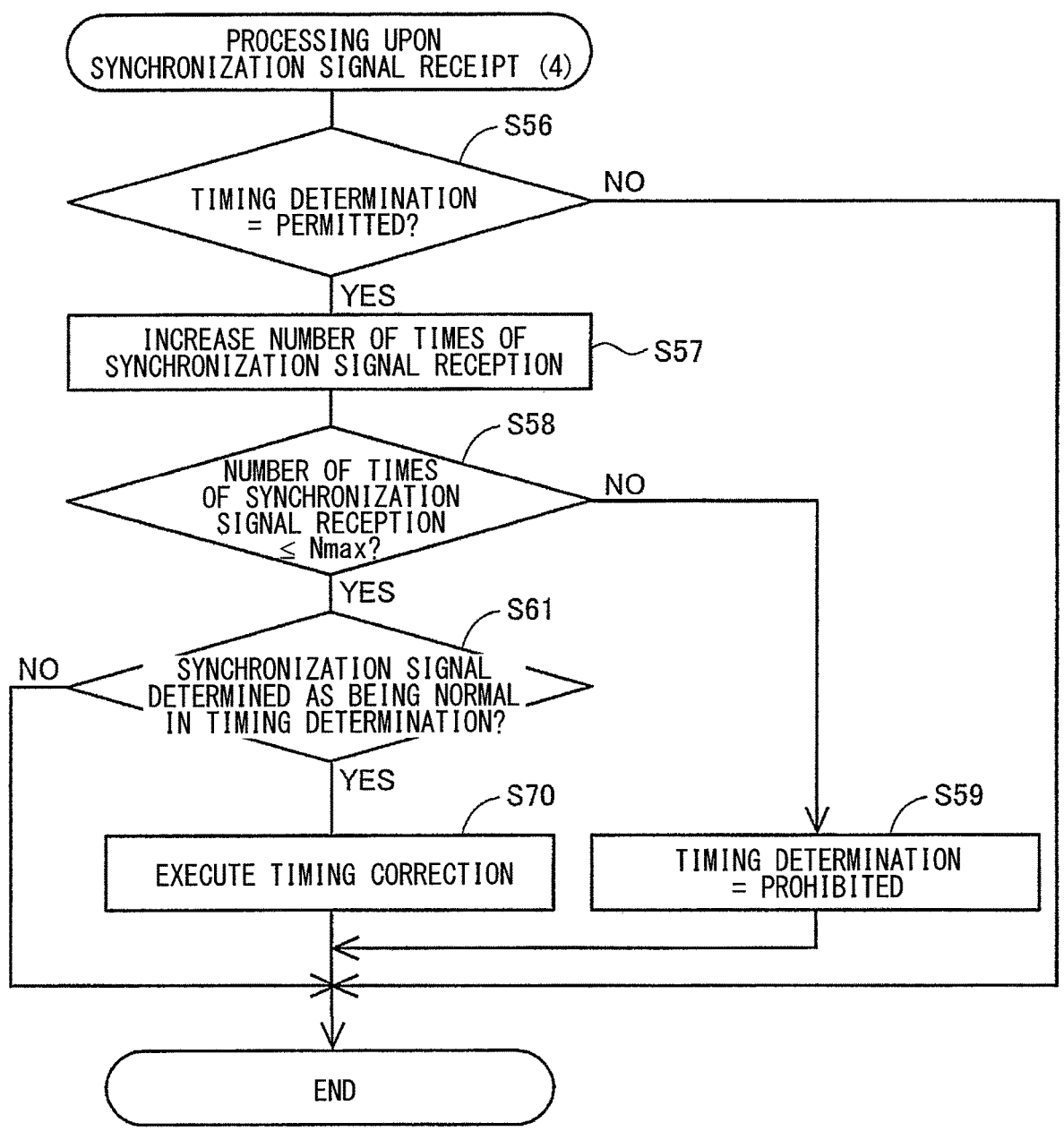
FIG. 33 is a flowchart of processing upon synchronization signal receipt (4) according to a process example (4)
Figure 34:
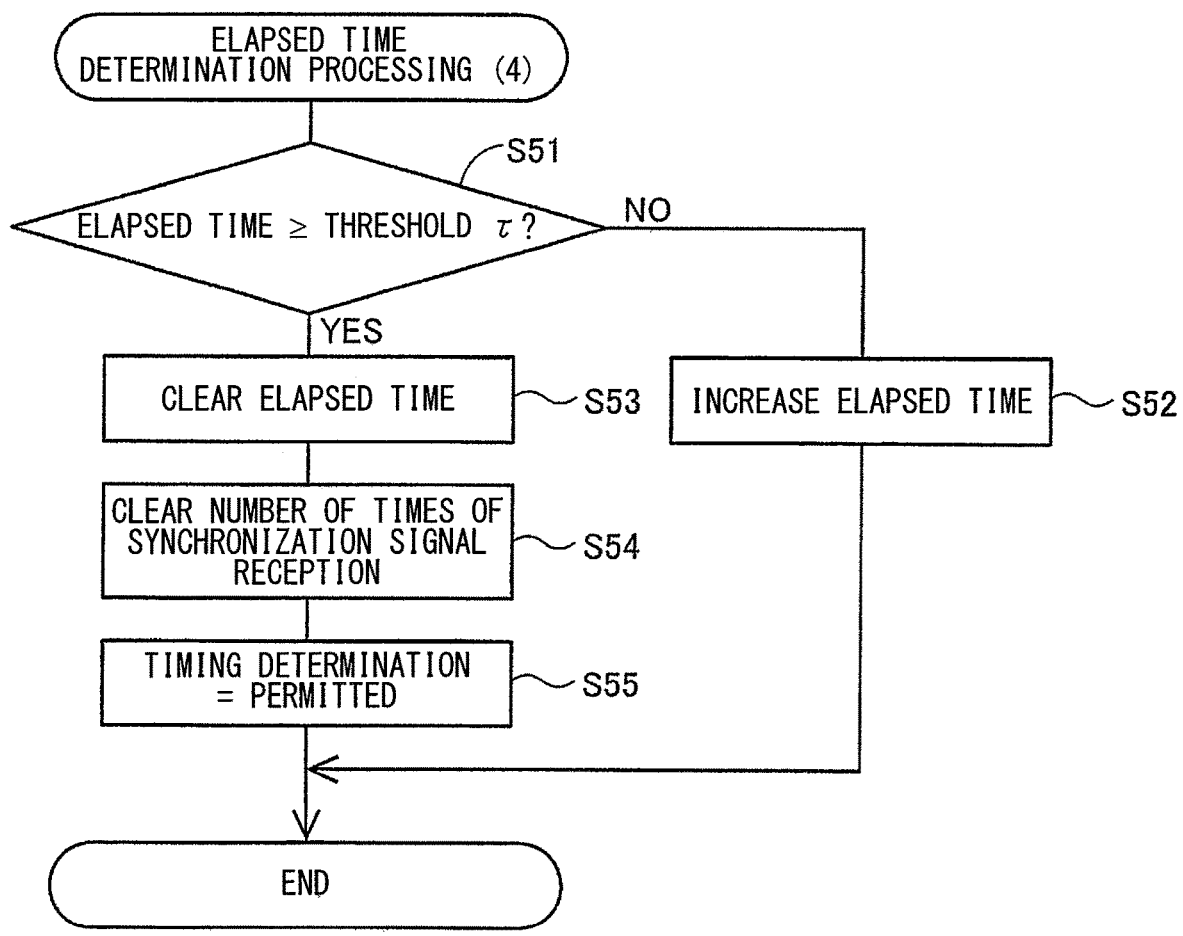
FIG. 34 is a flowchart of elapsed time determination processing (4) according to the process example (4)

FIGS. 33 and 34 are flowcharts of processing upon synchronization signal receipt (4) and elapsed time determination processing (4), respectively, according to the fourth process example. The fourth process example includes limiting the number of times itself of synchronization signal reception and execution of timing determination.

The number-of-times determiner 434 counts the number of times of synchronization signal reception, specifically, synchronization signal reception during the number-of-times monitoring period and execution of timing determination by the timing corrector 422. If the number of times of synchronization signal reception during the number-of-times monitoring period exceeds the maximum number of times Nmax, the timing determiner 432 does not execute timing determination until the number-of-times monitoring period ends, regardless of normality or abnormality of the synchronization signal.

Assume a format for execution of timing determination during interruption with input of a pulse rising edge of the synchronization signal. If timing determination is executed the maximum number of times Nmax during the number-of-times monitoring period, interruption itself is prohibited. Timing determination will thus not be executed even if the synchronization signal is received more than the maximum number of times Nmax during the synchronization permissive interval. Interruption is permitted each time the number-of-times monitoring period elapses and timing determination is enabled again.

Limiting the number of times of timing determination itself in the fourth process example leads to prevention of consumption of enormous arithmetic capacity due to execution of timing determination multiple times.

The processing upon synchronization signal receipt (4) will be described with reference to FIG. 33.

If timing determination is permitted in S55 in the elapsed time determination processing (4) upon synchronization signal receipt, YES is determined in S56 and the number of times of synchronization signal reception is increased in S57. If timing determination is prohibited upon synchronization signal receipt, NO is determined in S56 and the process flow ends.

If the number of times of synchronization signal reception is normally not more than the maximum number of times Nmax after S57, YES is determined in S58 and the process flow proceeds to S61. If the number of times of synchronization signal reception is abnormally exceeding the maximum number of times Nmax, NO is determined in S58 and timing determination is prohibited in S59.

If YES in S58 and the synchronization signal is determined as being normal in timing determination, YES is determined in S61 and timing correction is executed in S70. If the synchronization signal is determined as being abnormal in timing determination, NO is determined in S61 and the process flow ends.

If timing determination is prohibited or if NO in S61, timing correction is not executed.

The elapsed time determination processing (4) will be described with reference to FIG. 34.

Before the elapsed time reaches the threshold τ after last clearing, NO is determined in S51 and the elapsed time is increased in S52. If the elapsed time reaches the threshold τ, YES is determined in S51 and the elapsed time is cleared in S53. The number of times of synchronization signal reception is cleared in S54 and timing determination is permitted in S55.

Explanatory notes of the fourth process example will be described below.

[a2] The processing upon synchronization signal receipt is desirably executed while interrupting synchronization signal reception.

In such a case, processing "timing determination=prohibited" (S59) can be regarded as processing of prohibiting interruption of synchronization signal reception, and processing "timing determination=permitted" (S55) can be regarded as processing of permitting interruption of synchronization signal reception. There is no need to execute, by means of software, processing "timing determination=permitted?" (S56) in the processing upon synchronization signal receipt.

If synchronization signal reception timing is stored and the elapsed time from the synchronization signal reception timing can be corrected upon execution of timing correction, the processing upon synchronization signal receipt may be executed without interrupting.

The item [b1] relevant to the elapsed time determination processing is in common with that in the first process example. The elapsed time may be determined alternatively during the processing upon synchronization signal receipt.

Number-of-times determination processing executed by the number-of-times determiner 434 according to the fifth embodiment has been specifically exemplified above. These process examples may be modified partially or be combined appropriately.

Sixth Embodiment

The sixth embodiment will be described with reference to FIGS. 35 to 38.

The sixth embodiment provides an ECU configured similarly to the ECU 105 depicted in FIG. 23 according to the fifth embodiment. The fifth embodiment includes abnormality determination that the number of times of synchronization signal reception or the number of correction times is too large. In contrast, the sixth embodiment includes abnormality determination that the number of times of synchronization signal reception or the number of correction times is too small, by means of the number-of-times determiner 434.

For example, the first clock generation circuit 651 configured to operate the first microcomputer 401 may have decrease in clock frequency in contrast to the cases exemplified in FIGS. 11 and 14, and the cycle Ts of the synchronization signal transmitted from the first microcomputer 401 may be abnormally long. The number of times of timing correction executed during a predetermined period becomes then less than an expected number of times.

Timing determination may not be executed because the timing corrector 422 does not receive a normal synchronization signal transmitted from the first microcomputer 401, due to abnormality of input capture or the like of the second microcomputer 402.

Figure 35:
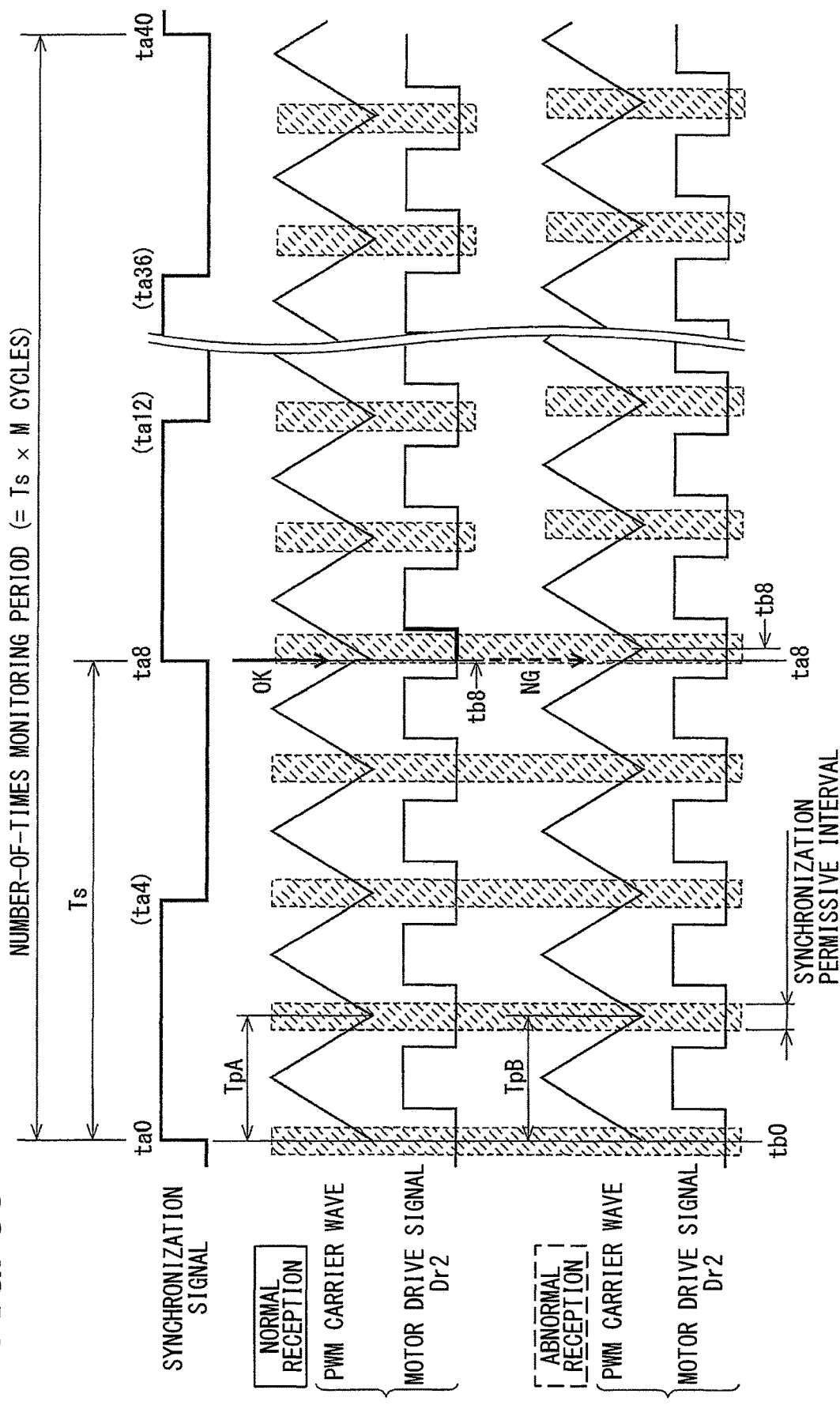
FIG. 35 is a timing chart indicating a number-of-times monitoring period according to the sixth embodiment.

FIG. 35 indicates operation in cases of normal and abnormal synchronization signal reception. When synchronization signal reception is normal, timing correction is executed at the timing ta8 of synchronization signal reception during the synchronization permissive interval, and the bottom timing tb8 of the PWM carrier wave of the second microcomputer 402 matches the synchronization signal rise timing ta8. In the other case where synchronization signal reception is abnormal, timing correction is not executed at the timing ta8. The bottom timing tb8 of the PWM carrier wave of the second microcomputer 402 is kept shifted from the synchronization signal rise timing ta8.

Timing determination itself is not executed upon this abnormality, so that the second microcomputer 402 fails to recognize asynchronous control with the first microcomputer 401. Asynchronous operation for a long period may cause deterioration in steering performance and strange noise.

In view of this, the sixth embodiment includes setting, as the number-of-times monitoring period, a period including M cycles of synchronous operation or the like. The number-of-times determiner 434 determines abnormality if the number of times of synchronization signal reception or the number of correction times during the number-of-times monitoring period is less than a minimum number of times Nmin originally assumed. The sixth embodiment is different from the fifth embodiment in that timing correction is executed to synchronize drive timing of the microcomputers 401 and 402 if the synchronization signal is determined as being normal in timing determination and even if the number of times is abnormally small in number-of-times determination.

When the number of times is abnormally small in number-of-times determination, synchronization signals are not transmitted at proper intervals and the first microcomputer 401 may highly possibly have failure. Abnormality notification to the other ECU 36 in the vehicle and the like or switch to asynchronous control is effectively executed as the procedure upon abnormality.

The number-of-times monitoring period has only to enable determination for the minimum number of times Nmin, and not necessarily corresponds to an integral multiple of the synchronization cycle.

Figure 36:
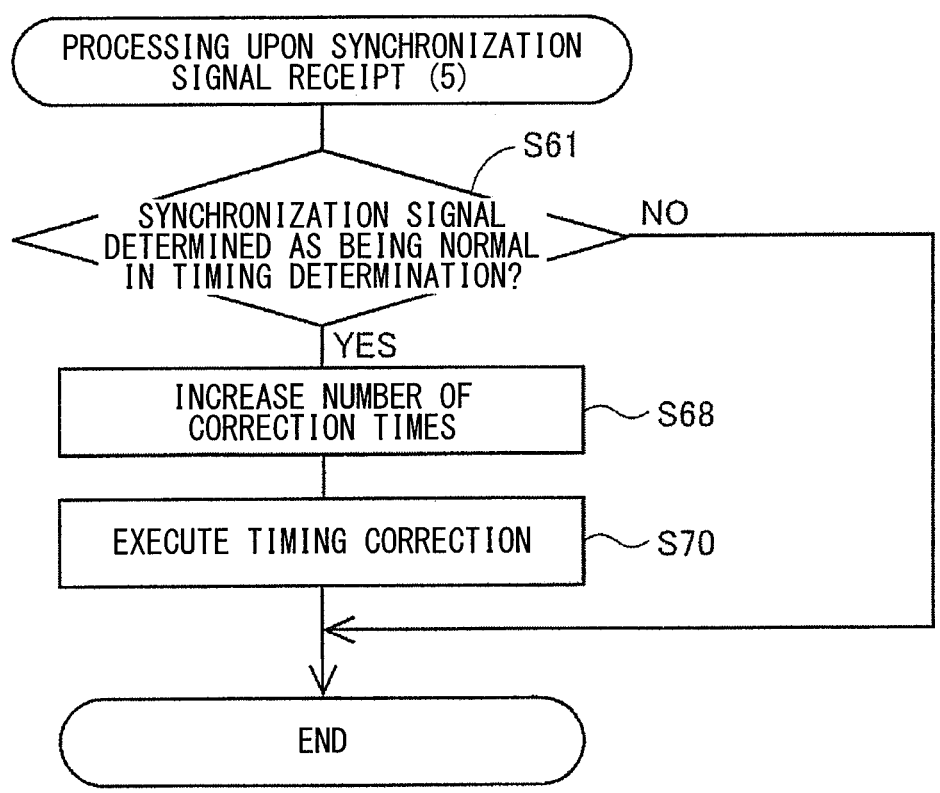
FIG. 36 is a flowchart of processing upon synchronization signal receipt (5) according to a process example (5)
Figure 37:
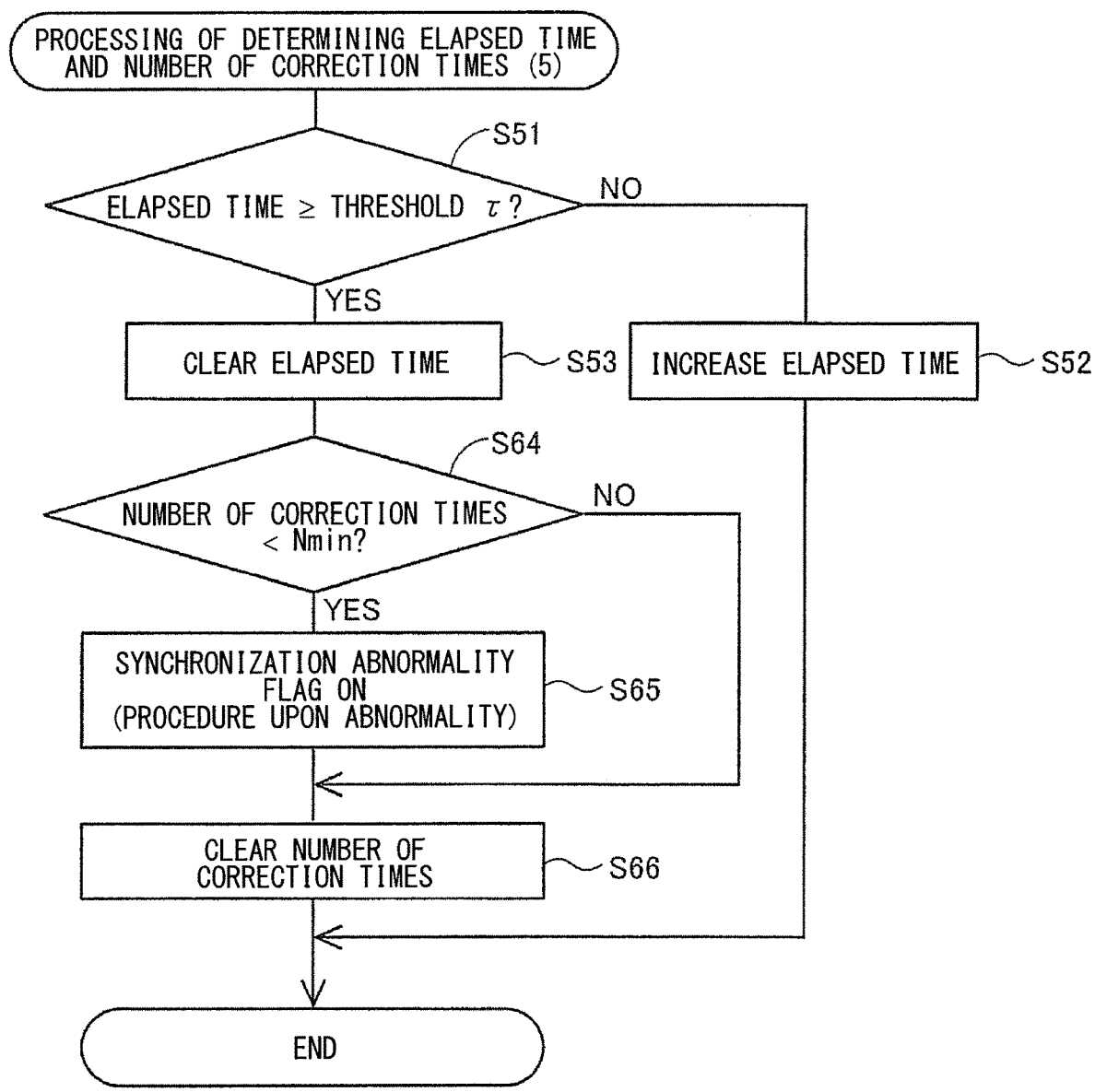
FIG. 37 is a flowchart of processing of determining elapsed time and the number of correction times (5) according to the process example (5)
Figure 38:
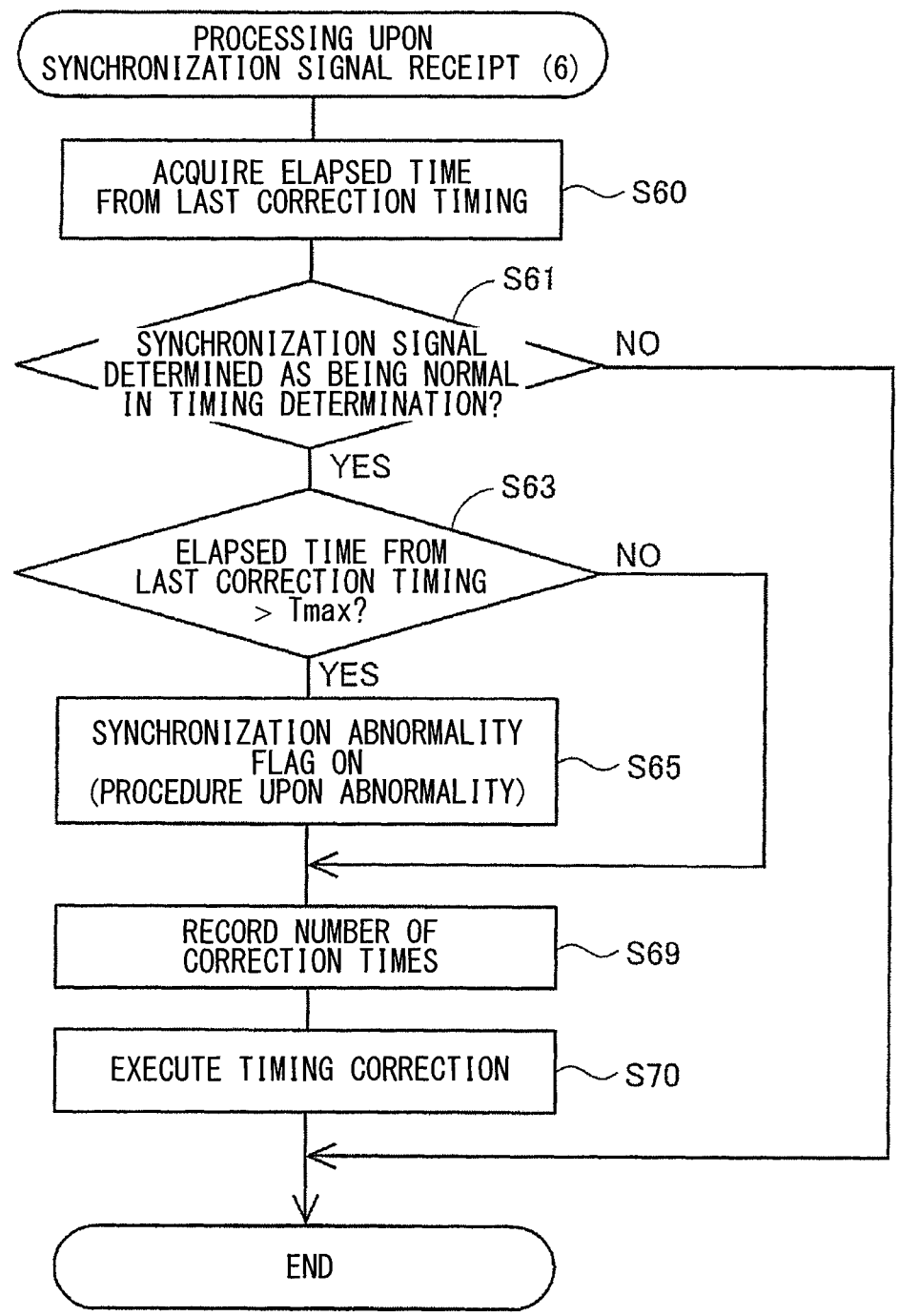
FIG. 38 is a flowchart of processing upon synchronization signal receipt (6) according to a process example (6)

FIGS. 36 to 38 are flowcharts of specific number-of-times determination arithmetic executed by the number-of-times determiner 434 according to the sixth embodiment. The process examples will be numbered by (5) and (6) consecutively from the fifth embodiment, and explanatory notes will also have item numbers given in the fifth embodiment.

When a synchronization abnormality flag is turned ON in S65 of the process example (5) or (6), the second microcomputer 402 may execute the procedure upon abnormality depicted in FIG. 18 or the like.

Fifth Process Example

FIGS. 36 and 37 are flowcharts of processing upon synchronization signal receipt (5) and processing of determining elapsed time and the number of correction times (5), respectively, according to the fifth process example. According to the fifth process example, the number-of-times determiner 434 determines normality if the number of correction times during the number-of-times monitoring period is not less than the minimum number of times Nmin, and determines abnormality if the number of correction times is less than the minimum number of times Nmin.

The number of correction times is increased when the synchronization signal is determined as being normal in timing determination, and number-of-times determination is executed each time the number-of-times monitoring period elapses. The number-of-times determiner 434 clears the number of correction times after number-of-times determination, and executes subsequent number-of-times determination when the subsequent number-of-times monitoring period elapses.

Number-of-times determination after elapse of the number-of-times monitoring period may be executed simultaneously with timing determination or at timing different from the timing determination. Number-of-times determination may be applied to the number of times of synchronization signal reception instead of the number of correction times.

The processing upon synchronization signal receipt (5) will be described with reference to FIG. 36.

If the synchronization signal is determined as being normal in timing determination upon synchronization signal receipt, YES is determined in S61, the number of correction times is increased in S68, and timing correction is executed in S70. If the synchronization signal is determined as being abnormal in timing determination, NO is determined in S61 and the process flow ends.

The processing of determining elapsed time and the number of correction times (5) will be described with reference to FIG. 37.

Before the elapsed time reaches the threshold τ (e.g. the number-of-times monitoring period) after last clearing, NO is determined in S51 and the elapsed time is increased in S52. If the elapsed time reaches the threshold τ, YES is determined in S51 and the elapsed time is cleared in S53.

If the number of correction times is normally not less than the minimum number of times Nmin after the elapsed time is cleared in S53, NO is determined in S64 and the number of correction times is cleared in S66. If the number of correction times is abnormally less than the minimum number of times Nmin, YES is determined in S64, the synchronization abnormality flag is turned ON in S65, and the number of correction times is then cleared in S66.

Explanatory notes of the fifth process example will be described below.

The item [a1] relevant to the processing upon synchronization signal receipt and the item [b1] relevant to the elapsed time determination processing are in common with those in the first process example and the like of the fifth embodiment.

[e] As the procedure upon abnormality upon synchronization abnormality determination, the second microcomputer 402 executes abnormality notification to the other ECU 71 in the vehicle and the like, alarm indication to a driver, switching to asynchronous control, or the like.

Abnormality restoration determination may be added as necessary, such as turning OFF the synchronization abnormality flag if the number of correction times is not less than a certain value upon completion of subsequent elapsed time determination.

The number of correction times may not be cleared in number-of-correction times determination, and the number of correction times may be determined in accordance with difference from the number of correction times upon last determination.

Sixth Process Example

FIG. 38 is a flowchart of processing upon synchronization signal receipt (6) according to the sixth process example. According to the sixth process example, the number-of-times determiner 434 determines that the number of correction times is less than the expected number of times if normality is determined in timing determination and the elapsed time from last correction timing is longer than the maximum time Tmax. In a case where the synchronization signal is expected to be generated at the cycle of 200 [μs] but 400 [μs] elapses from last correction timing upon current timing normality determination, synchronization signal reception is estimated to have failed once.

The processing upon synchronization signal receipt (6) will be described with reference to FIG. 38.

Upon synchronization signal receipt, the elapsed time from last correction timing is acquired in S60.

If the synchronization signal is determined as being normal in timing determination, YES is determined in S61 and the process flow proceeds to S63. If the synchronization signal is determined as being abnormal in timing determination, NO is determined in S61 and the process flow ends.

If YES is determined in S61 and the elapsed time from last correction timing is normally not more than the maximum time Tmax, NO is determined in S63 and the process flow proceeds to S69.

If the elapsed time from last correction timing abnormally exceeds the maximum time Tmax, YES is determined in S63, the number-of-times determiner 434 turns ON the synchronization abnormality flag in S65, and the process flow proceeds to S69. Correction timing is recorded in S69 and timing correction is executed in S70.

Explanatory notes of the sixth process example will be described below.

The item [a1] relevant to the processing upon synchronization signal receipt is in common with that in the fifth process example.

[b6] The elapsed time determination processing may include determining that the elapsed time has reached the maximum time Tmax during interruption, when an interruption timer is preliminarily started after elapse of the maximum time Tmax in the correction timing recording processing. The items [c] and [d] relevant to the elapsed time determination processing are in common with those in the process examples (2) and (3) of the fifth embodiment.

The item [e] relevant to the procedure upon abnormality is in common with that in the fifth process example.

Number-of-times determination processing executed by the number-of-times determiner 434 according to the sixth embodiment has been specifically exemplified above.

(Application Processing in Electric Power Steering Apparatus)

Application processing according to the present embodiment applied to an assist motor drive system in the electric power steering apparatus will be described with reference to FIGS. 39 and 40.

Assume the fifth or sixth embodiment in which the timing corrector 422 of the second microcomputer 402 includes the timing determiner 432 and the number-of-times determiner 434, to basically enable execution of "timing determination and number-of-times determination". In the first embodiment and the like in which the timing corrector 422 does not include the number-of-times determiner 434, "timing determination and number-of-times determination" in the description may be replaced with "timing determination".

(Determination Non-Execution Processing Before Assist Start)

Figure 39:
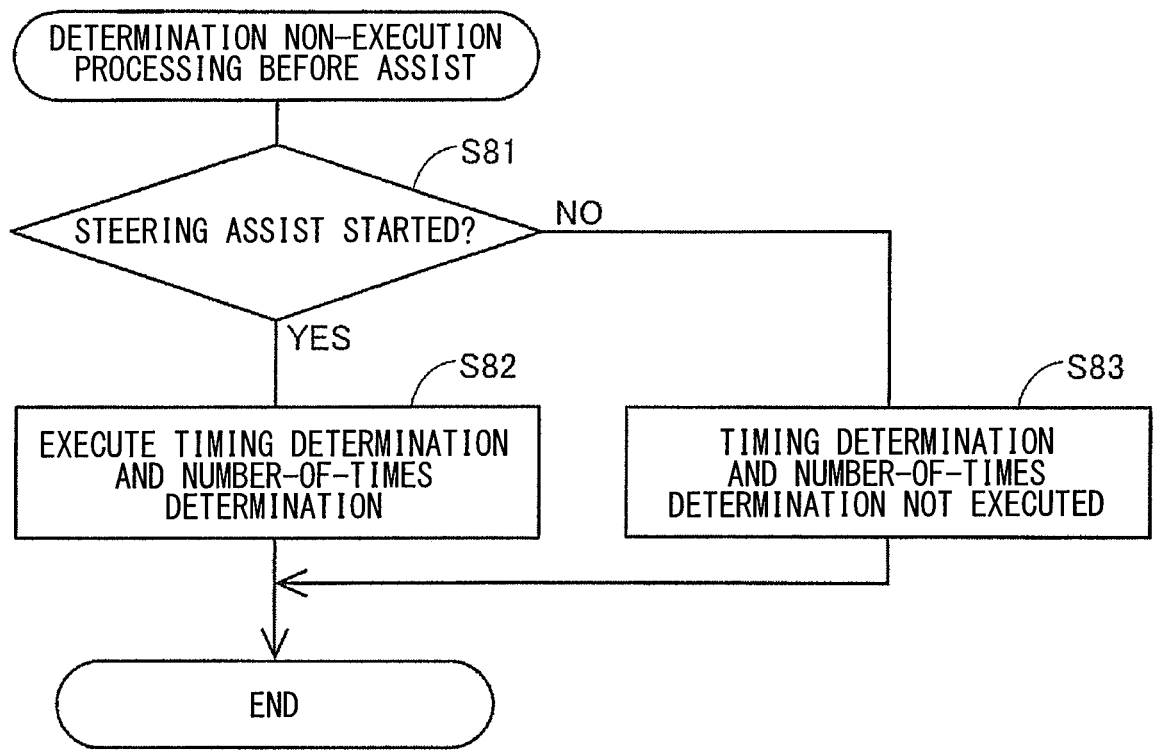
FIG. 39 is a flowchart of determination non-execution processing before assist start in a motor drive system included in an electric power steering apparatus.

The flowchart in FIG. 39 will be referred to next.

In S81, the second microcomputer 402 determines whether an assist motor has started steering assist.

If YES in S81 after assist start, the timing corrector 422 executes timing determination and number-of-times determination in S82.

If NO in S81 before assist start, the timing corrector 422 executes neither timing determination nor number-of-times determination in S83. The second microcomputer 402 executes timing correction upon each synchronization signal receipt.

The synchronization signal is not necessarily required to be normal before motor drive control starts. Non-execution of timing determination and number-of-times determination leads to processing load reduction.

(Number of Abnormality Times Clear Processing)

Figure 40:
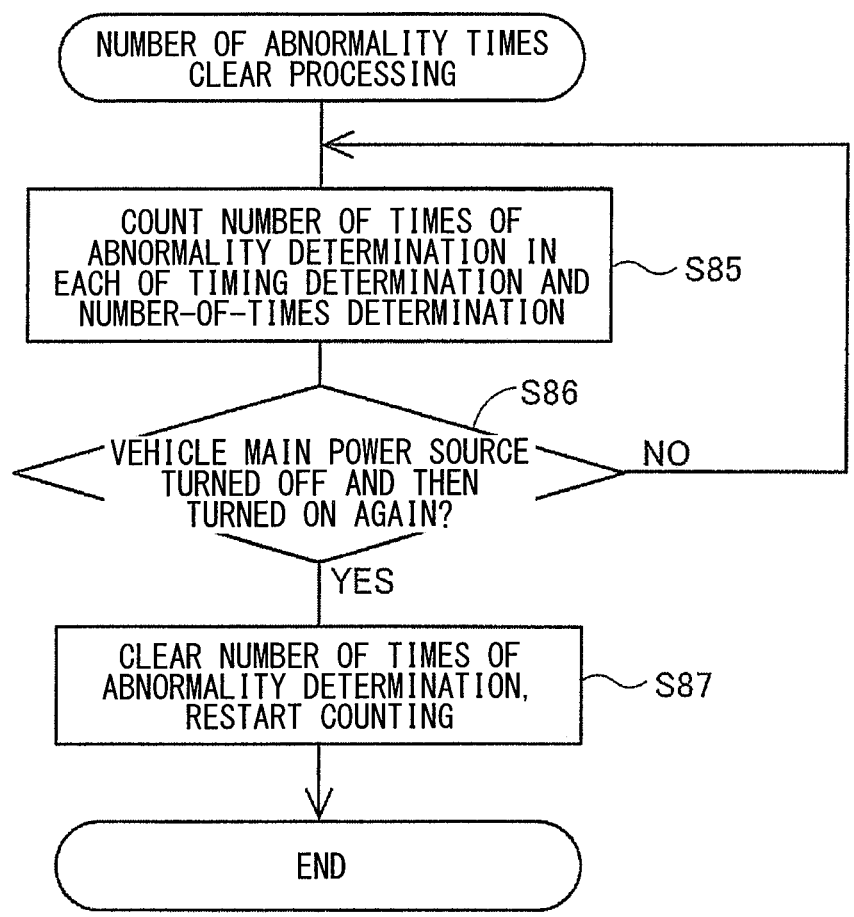
FIG. 40 is a flowchart of number of abnormality times clear processing in the motor drive system.

The flowchart in FIG. 40 will be referred to next.

In S85, the timing corrector 422 counts the number of times of abnormality determination in each of timing determination and number-of-times determination.

Whether a vehicle main power source is turned ON again after being turned OFF is determined in S86. If NO in S86, the process flow returns to before S85.

Such operation of "turning OFF and turning ON again the vehicle main power source" of an engine vehicle correspond to turning OFF and turning ON again an ignition switch. The operation of "turning OFF and turning ON again the vehicle main power source" of a hybrid vehicle or an electric vehicle correspond to being ready OFF and being ready ON again.

If YES in S86, the timing corrector 422 clears the number of times of abnormality determination and restarts counting in S87.

FIG. 40 exemplifies clearing the number of times of abnormality determination when the main power source is turned ON again. The number of times of abnormality determination may alternatively be cleared when the main power source is turned OFF.

This eliminates influence of past abnormality information before motor drive stop, and enables appropriate processing execution according to abnormality information after drive restart.

Other Embodiments (a) The motor 80 to be controlled in the above embodiments is a multiple winding motor including the two coil sets 801 and 802 disposed at the common stator to be shifted from each other by the electrical angle of 30 degrees. A motor to be controlled in other embodiments may alternatively include two or more coil sets disposed to have the same phases. The present disclosure is not limited to such a configuration including a single motor having a common stator provided with two or more coil sets, but is applicable to multiple motors including multiple stators separately provided with the coil sets wound therearound and configured to cooperatively output torque.

The number of phases of a multiphase brushless motor is not limited to three, but may be four or more. The motor to be driven is not limited to an AC brushless motor but may be a DC brush motor. The "motor drive circuit" may be an H bridge circuit in this case.

(b) The above embodiments exemplify the motor control apparatus including the two microcomputers. The present disclosure is also applicable to a motor control apparatus including three or more microcomputers. In a configuration for synchronization signal unidirectional transmission according to the first embodiment, a single transmitter microcomputer may transmit a synchronization signal to each of remaining two or more receiver microcomputers. Alternatively, two or more transmitter microcomputers may each transmit a synchronization signal to each of receiver microcomputers other than the own microcomputer. For example, a device including three or more systems has, as the procedure upon abnormality, a mode of stopping motor drive by at least one transmitter microcomputer and driving the motor by only multiple receiver microcomputers. Such a mode may be called a "part-of-systems drive mode" in contrast to the "single system drive mode" of the device including the two systems.

(c) The motor control apparatus may not include the analog signal sampling portion that is synchronized with the motor drive timing generator. In this case, the motor control apparatus may execute control arithmetic in accordance with externally acquired digital data. The motor control apparatus may alternatively execute feedforward control not in accordance with feedback information.

In the configuration including the analog signal sampling portion, sample timing may match switch timing of the motor drive signal.

(d) The motor drive signals may be generated in accordance with a PWM control technique indicated in FIG. 8 and the like, a pulse pattern technique of selecting an appropriate one from multiple prestored pulse patterns in accordance with a modulation factor or rotational speed, or the like. The carrier wave according to the PWM control technique is not limited to a triangular wave but may be a sawtooth wave.

(e) Timing determination according to the fifth and sixth embodiments is also applicable to a format of timing determination with use of a signal having a specific pulse pattern according to the third and fourth embodiments. In this case, the number-of-times monitoring period is not necessarily overlapped with an interval including the specific pulse pattern itself, but has only to be overlapped with an interval for determination of reception of at least the signal having the specific pulse pattern. In other words, the number-of-times monitoring period is set to "be overlapped with an interval expected to have reception of at least the signal having the specific pulse pattern".

The second embodiment may have an application mode in which each of the first microcomputer 401 and the second microcomputer 402 includes a number-of-times determiner similar to that according to the fifth or sixth embodiment, and is configured to mutually execute timing determination and number-of-times determination as to a synchronization signal generated by the other microcomputer.

(f) The motor control apparatus according to the present disclosure may be applied to a motor for an electric power steering apparatus as well as to a motor for any other purpose.

The present disclosure should not be limited to these embodiments, but may be embodied in various modes within a scope not departing from the purpose.

The present disclosure has been described in accordance with the embodiments. The present disclosure should, however, not be limited to these embodiments and the structures thereof. The present disclosure may include various modification examples as well as modifications made within equivalent ranges. Various combinations and modes, as well as other combinations and modes achieved by adding only one element, more elements, or less elements to the various combinations and modes will fall within the scope and the ideological range of the present disclosure.

Furthermore, for reference, a conventional technique may be described as follows.

There has conventionally been known a motor control apparatus including multiple microcomputers that is provided redundantly, drive-controls a motor, and operates in accordance with clocks generated by independent clock generation circuits. In a case where all the microcomputers are operated with a single clock generation circuit, motor drive is stopped when the clock generation circuit is in failure. Provision of the clock generation circuits independently for the respective microcomputers may improve reliability.

There is a difficulty caused an arithmetic control timing shift between the microcomputers due to production variation or the like between the clock generation circuits.

In view of this, a related art discloses an electric motor control apparatus including multiple microcomputers that transmits and receives a synchronization signal therebetween, and the microcomputer having received the synchronization signal corrects the arithmetic control timing in accordance with the synchronization signal. The arithmetic control timing of the multiple microcomputers is synchronized with each other in this manner to suppress motor torque pulsation.

Aspects of the disclosure described herein are set forth in the following clauses.

The technique according to a related art does not assume a case where the synchronization signal transmitted and received between the multiple microcomputers has abnormality. When the transmitted synchronization signal has abnormality, a receiver microcomputer will execute timing correction in accordance with the abnormal synchronization signal. The receiver microcomputer may have control breakdown depending on a degree of synchronization signal abnormality. This may lead to a worse situation than occurrence of torque pulsation due to a clock shift. For example, a vehicle electric power steering apparatus having an assist function stopped due to motor drive stop will make a driver to feel anxious. There is thus required determination of synchronization signal abnormality and execution of an appropriate procedure against the abnormality.

According to the present disclosure, a motor control apparatus including multiple microcomputers that operates in accordance with clocks independent from each another and transmits and receives a synchronization signal for clock shift correction may be provided. The motor control apparatus may be configured to determine abnormality of the synchronization signal. According to the present disclosure, a motor drive system including the motor control apparatus, and a motor control method with use of the motor control apparatus may be provided.

A motor control apparatus according to the present disclosure may include multiple motor drive circuits, multiple microcomputers, and multiple clock generation circuits.

The multiple motor drive circuits may drive one or more motors each including multiple coil sets.

The multiple microcomputers may include a drive signal generator and a drive timing generator. The drive signal generator may generate a motor drive signal as a command to each of the motor drive circuits. The drive timing generator may generate drive timing as pulse timing of the motor drive signal.

The multiple clock generation circuits may independently generate clocks as operation reference of the multiple microcomputers.

Each clock generation circuit, each microcomputer, and each motor drive circuit may be provided in association with one another, and each portion including these constituent elements will be defined as a "system". The constituent elements in each system control electrification to a corresponding one of the coil sets to allow the motor control apparatus to drive the motor.

The multiple microcomputers may include a transmitter microcomputer as "at least one microcomputer that transmits a synchronization signal synchronized with drive timing of the own microcomputer and synchronizing drive timing of the multiple microcomputers", and a receiver microcomputer as "at least one microcomputer that receives the synchronization signal from the transmitter microcomputer". Each of the microcomputers will refer to the microcomputer itself by the "own microcomputer".

A motor control apparatus according to a first aspect may include the above configurations, as well as the following configurations.

The transmitter microcomputer may include a synchronization signal generator that generates a synchronization signal and transmits the synchronization signal to the receiver microcomputer.

The receiver microcomputer may include a timing corrector that is configured to execute timing correction of correcting drive timing of the own microcomputer to be synchronized with the received synchronization signal. The timing corrector may include received signal determiner that executes received signal determination of determining normality or abnormality of the received synchronization signal.

The receiver microcomputer may permit the timing correction in accordance with at least determination of the synchronization signal as being normal in the received signal determination. If the synchronization signal is determined as being abnormal in the received signal determination, the receiver microcomputer may prohibit the timing correction and drive the motor asynchronously with the transmitter microcomputer.

As described above, the motor control apparatus may be configured to cause the received signal determiner in the receiver microcomputer to determine abnormality of the synchronization signal. If the synchronization signal is determined as being abnormal in the received signal determination, the receiver microcomputer may prohibit the timing correction and drive the motor asynchronously with the transmitter microcomputer. This configuration prevents control breakdown of the receiver microcomputer due to abnormality of the synchronization signal.

In this case, it may be possible that the motor is at least driven continuously even if torque pulsation occurs. This configuration is thus effective specifically in a motor drive system like an electric power steering apparatus, which is highly required for continuation of an assist function through motor drive.

A motor control apparatus according to a second aspect may include the basic configurations described above, and further achieves the following three drive modes:

(1) A synchronous drive mode of driving the motor by the transmitter microcomputer and the receiver microcomputer having received the synchronization signal and being synchronized with the transmitter microcomputer;

(2) An asynchronous drive mode of driving the motor by the transmitter microcomputer and the receiver microcomputer asynchronously with each other, not in accordance with the synchronization signal; and (3) A part-of-systems drive mode of driving the motor only by the receiver microcomputer while the transmitter microcomputer stops driving the motor.

These drive modes may be switched depending on normality or abnormality of the synchronization signal.

The present disclosure may further provide a motor control method with use of the motor control apparatus including the above basic configurations.

The motor control method may include a synchronization signal transmission step of causing the transmitter microcomputer to generate a synchronization signal and transmit the synchronization signal to the receiver microcomputer.

The method may further include a synchronization signal reception step of causing the receiver microcomputer to receive the synchronization signal from the transmitter microcomputer.

The method may further include a received signal determination step of causing the receiver microcomputer to execute received signal determination of determining normality or abnormality of the received synchronization signal.

The method may further include a timing correction permission step of causing the receiver microcomputer to permit "timing correction of correcting drive timing of the own microcomputer to be synchronized with the received synchronization signal" if the synchronization signal is determined as being normal in the received signal determination step.

The method may further include a timing correction prohibition step of causing the receiver microcomputer to prohibit the timing correction and drive the motor asynchronously with the transmitter microcomputer if the synchronization signal is determined as being abnormal in the received signal determination step.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Further alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes multiple steps (also referred to as sections), each of which is represented, for instance, as S10. Further, each step can be divided into several sub-steps while several steps can be combined into a single step.

While various embodiments, configurations, and aspects of a motor control apparatus, a motor drive system, and a motor control method according to the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

What is claimed is:

1. A motor control apparatus comprising:
a plurality of motor drive circuits that drive at least one motor;
a plurality of microcomputers that include
a drive signal generator generating a motor drive signal as a command to each of the motor drive circuits, and
a drive timing generator generating a drive timing as a pulse timing of the motor drive signal; and
a plurality of clock generation circuits that independently generate clocks as operation reference of the plurality of microcomputers,
wherein:
the plurality of microcomputers includes a transmitter microcomputer as at least one microcomputer that transmits a synchronization signal synchronized with the drive timing of an own microcomputer and synchronizing the drive timing of the plurality of microcomputers;
the plurality of microcomputers includes a receiver microcomputer as at least one microcomputer that receives the synchronization signal transmitted from the transmitter microcomputer;
the transmitter microcomputer includes a synchronization signal generator that generates the synchronization signal and transmits the synchronization signal to the receiver microcomputer;
the receiver microcomputer that is configured to execute timing correction of correcting the drive timing of the own microcomputer to be synchronized with the synchronization signal received, and includes a timing corrector that includes a received signal determiner that executes a received signal determination determining whether the synchronization signal received is normal or abnormal;
the receiver microcomputer permits the timing correction in accordance with at least determination of the synchronization signal as being normal in the received signal determination; and
the receiver microcomputer prohibits the timing correction and drives the motor without synchronizing the drive timing with the transmitter microcomputer in response to that the synchronization signal is determined as being abnormal in the received signal determination.

2. The motor control apparatus according to claim 1, wherein:
the plurality of microcomputers further includes an analog signal sampling portions that is synchronized with the drive timing generator and samples an analog signal at timing different from a switch timing of the motor drive signal.

3. The motor control apparatus according to claim 1, wherein:
the synchronization signal generator transmits, as the synchronization signal, a pulse signal having a predetermined cycle; and
the received signal determiner determines the synchronization signal as being normal when the synchronization signal received from the synchronization signal generator has pulse edge timing within a synchronization permissive interval; and
the received signal determiner determines the synchronization signal as being abnormal when the synchronization signal received has pulse edge timing outside the synchronization permissive interval.

4. The motor control apparatus according to claim 3, wherein:
the synchronization signal generator generates the synchronization signal to have pulse edge timing different from switch timing of the motor drive signal.

5. The motor control apparatus according to claim 1, wherein:
the synchronization signal generator transmits the synchronization signal having a specific pulse pattern; and
the received signal determiner determines the synchronization signal as being normal when receiving a signal having the specific pulse pattern.

6. The motor control apparatus according to claim 1, wherein:
at a time of boot of the receiver microcomputer, the receiver microcomputer starts driving the motor when a total number of times of reception of the synchronization signal reaches a predetermined initial number of times.

7. The motor control apparatus according to claim 1, wherein:
at a time of boot of the receiver microcomputer, the received signal determiner starts the received signal determination when a total number of times of reception of the synchronization signal exceeds a predetermined number of standby times.

8. The motor control apparatus according to claim 1, wherein:
when a total number of times of reception of the synchronization signal reaches a predetermined number of restoration times after the received signal determiner determines the synchronization signal as being abnormal, or when the synchronization signal has not been received for a predetermined restoration time,
the receiver microcomputer permits the timing correction after receiving subsequent reception of the synchronization signal and determining the synchronization signal as being normal.

9. The motor control apparatus according to claim 1, wherein:
the received signal determiner confirms abnormality of the synchronization signal when a total number of times of consecutively determining the synchronization signal as being abnormal reaches a predetermined number of confirmation times; and
the receiver microcomputer prohibits the timing correction after abnormality confirmation.

10. The motor control apparatus according to claim 9, wherein:
the receiver microcomputer permits the timing correction until abnormality of the synchronization signal is confirmed, and continues to synchronously perform drive with the transmitter microcomputer.

11. The motor control apparatus according to claim 1, wherein:
the receiver microcomputer further executes a procedure upon abnormality in response to that the synchronization signal received is determined as being abnormal.

12. The motor control apparatus according to claim 11, wherein:
the receiver microcomputer prohibits the timing correction as the procedure upon abnormality hereafter.

13. The motor control apparatus according to claim 11, wherein:
the procedure upon abnormality includes selecting a part-of-systems drive mode in which driving the motor by the transmitter microcomputer is stopped and driving the motor only by the receiver microcomputer is performed.

14. The motor control apparatus according to claim 11, wherein:
in response to abnormality of the synchronization signal, the procedure upon abnormality includes switching between an asynchronous drive mode in which the transmitter microcomputer and the receiver microcomputer asynchronously drive the motor, and a part-of-systems drive mode in which driving the motor by the transmitter microcomputer is stopped and driving the motor only by the receiver microcomputer is performed.

15. The motor control apparatus according to claim 11, further comprising:
a plurality of clock monitoring portions that monitor reference clocks generated by the clock generation circuits,
wherein:
when a clock generation circuit for the transmitter microcomputer generates a normal reference clock and also when the synchronization signal is determined as being abnormal in the received signal determination,
the procedure upon abnormality includes selecting an asynchronous drive mode in which the transmitter microcomputer and the receiver microcomputer asynchronously drive the motor.

16. The motor control apparatus according to claim 11, wherein:
as the procedure upon abnormality, the receiver microcomputer switches a control of generation of the motor drive signal to an asynchronous control different from a normal control.

17. The motor control apparatus according to claim 11, wherein:
the motor control apparatus is mounted on a vehicle and is communicable with a different control device in the vehicle; and
as the procedure upon abnormality, the receiver microcomputer notifies the different control device in the vehicle of abnormality.

18. The motor control apparatus according to claim 1, wherein:
the timing corrector further includes a number-of-times determiner that monitors, during an appropriate number-of-times monitoring period, a total number of reception times as a total number of times of reception of the synchronization signal or a total number of correction times as a total number of times of normality determination in the received signal determination and execution of the timing correction, and executes number-of-times determination of determining the number of reception times or the number of correction times as being normal or abnormal; and
the receiver microcomputer permits the timing correction in response to that the synchronization signal is determined as being normal in the received signal determination and also that the number of reception times or the number of correction times is determined as being normal in the number-of-times determination.

19. The motor control apparatus according to claim 18, wherein:
in a configuration in which the synchronization signal generator transmits a pulse signal having a predetermined cycle as the synchronization signal and the received signal determiner determines the synchronization signal as being normal when the synchronization signal received from the synchronization signal generator has pulse edge timing within a synchronization permissive interval,
the number-of-times monitoring period is set to be at least overlapped with a part of the synchronization permissive interval; or
in a configuration in which the synchronization signal generator transmits the synchronization signal having a specific pulse pattern and the received signal determiner determines the synchronization signal as being normal when a signal having the specific pulse pattern is received,
the number-of-times monitoring period is set to be overlapped with an interval expected to have reception of at least the signal having the specific pulse pattern.

20. The motor control apparatus according to claim 18, wherein:
the number-of-times determiner determines the number of reception times or the number of correction times as being abnormal when the number of correction times or the number of reception times during the number-of-times monitoring period exceeds a predetermined maximum number of times or when an elapsed time from a last timing correction is less than a predetermined minimum time; and
the receiver microcomputer prohibits the timing correction.

21. The motor control apparatus according to claim 20, wherein:
the receiver microcomputer executes a procedure upon abnormality in response to that the number-of-times determination has abnormality determination.

22. The motor control apparatus according to claim 18, wherein:
the number-of-times determiner determines the number of reception times or the number of correction times as being abnormal when the number of correction times or the number of reception times during the number-of-times monitoring period is less than a predetermined minimum number of times or when an elapsed time from a last timing correction exceeds predetermined maximum time.

23. The motor control apparatus according to claim 18, wherein:
the receiver microcomputer prohibits the received signal determination before an elapsed time from a last timing correction reaches a predetermined threshold.

24. The motor control apparatus according to claim 1, wherein:
each of the microcomputers operates as the transmitter microcomputer and the receiver microcomputer, and mutually transmits and receives the synchronization signal.

25. The motor control apparatus according to claim 24, wherein:
the plurality of microcomputers are configured to communicate bidirectionally; and
a transmission of the synchronization signal in a direction between the plurality of microcomputers and a transmission of the synchronization signal in a direction opposite to the direction are different in timing from each other.

26. The motor control apparatus according to claim 1, further comprising:

at least one synchronization signal line that connects the transmitter microcomputer and the receiver microcomputer to allow the synchronization signal to be transmitted and received.

27. The motor control apparatus according to claim 26, wherein:
the at least one synchronization signal line is used in common with a signal line for communication of a signal other than the synchronization signal between the plurality of microcomputers.

28. The motor control apparatus according to claim 1, wherein:
the plurality of microcomputers are disposed with a predetermined space on an identical surface of an identical substrate.

29. A motor drive system comprising:
the motor control apparatus according to claim 1; and
the motor configured as a brushless motor including a plurality of multiphase coil sets that is disposed coaxially and is electrified by the motor control apparatus.

30. The motor drive system according to claim 29, wherein:
the motor control apparatus is provided integrally at an axial end of the motor.

31. A motor drive system included in a vehicle electric power steering apparatus, the motor drive system comprising:
the motor control apparatus according to claim 1; and
the motor that is driven by the motor control apparatus and outputs assist torque.

32. The motor drive system according to claim 31 comprising:
two power sources;
the motor that is provided with two multiphase coil sets that have electric power supplied from the two power sources, respectively;
the motor control apparatus that includes two microcomputers controlling electrification to the two multiphase coil sets, respectively, and two motor drive circuits, each receiving the motor drive signal as a command from the two microcomputers;
two steering torque sensors that detect steering torque and output the steering torque to the two microcomputers; and
two rotation angle sensors that detect electrical angles of the motor and output the electrical angles to the two microcomputers.

33. The motor drive system according to claim 32, wherein:
the motor drive system does not execute the received signal determination before the motor starts steering assist; or
the motor drive system does not execute the number-of-times determination before the motor starts steering assist in a configuration in which the timing corrector further includes a number-of-times determiner that monitors, during an appropriate number-of-times monitoring period, a total number of reception times as a total number of times of reception of the synchronization signal, or a total number of correction times as a total number of times of normality determination in the received signal determination and execution of a timing correction, and executes number-of-times determination of determining the number of reception times or the number of correction times as being normal or abnormal.

34. The motor drive system according to claim 32, wherein:
the motor drive system clears a total number of times of abnormality determination in the received signal determination when a vehicle main power source is turned OFF or is turned ON again; or
the motor drive system clears a total number of times of abnormality determination in the number-of-times determination when the vehicle main power source is turned OFF or is turned ON again in a configuration in which the timing corrector further includes a number-of-times determiner that monitors, during an appropriate number-of-times monitoring period, a total number of reception times as a number of times of reception of the synchronization signal, or a total number of correction times as a total number of times of normality determination in the received signal determination and execution of the timing correction, and executes number-of-times determination of determining the number of reception times or the number of correction times as being normal or abnormal.

35. A motor control apparatus comprising:
a plurality of motor drive circuits that drives at least one motor;
a plurality of microcomputers that includes
a drive signal generator generating a motor drive signal as a command to each of the motor drive circuits, and
a drive timing generator generating a drive timing as pulse timing of the motor drive signal; and
a plurality of clock generation circuits that independently generate clocks as operation reference of the plurality of microcomputers,
wherein:
the plurality of microcomputers includes a transmitter microcomputer as at least one microcomputer that transmits a synchronization signal synchronized with the drive timing of an own microcomputer and synchronizing the drive timing of the plurality of microcomputers;
the plurality of microcomputers includes a receiver microcomputer as at least one microcomputer that receives the synchronization signal transmitted from the transmitter microcomputer;
the motor control apparatus has three drive modes of:
a synchronous drive mode in which the transmitter microcomputer and the receiver microcomputer having received the synchronization signal synchronously drive the motor;
an asynchronous drive mode in which the transmitter microcomputer and the receiver microcomputer drive the motor asynchronously without the synchronization signal in response to determining that the synchronization signal is abnormal; and
a part-of-systems drive mode in which driving the motor by the transmitter microcomputer is stopped and driving the motor only by the receiver microcomputer is performed.

36. A motor control method executed by a motor control apparatus including:
a plurality of motor drive circuits that drives at least one motor;
a plurality of microcomputers that includes
a drive signal generator generating a motor drive signal as a command to each of the motor drive circuits, and
a drive timing generator generating a drive timing as pulse timing of the motor drive signal; and a plurality of clock generation circuits that independently generates clocks as operation reference of the plurality of microcomputers, wherein:

the plurality of microcomputers includes a transmitter microcomputer as at least one microcomputer that transmits a synchronization signal synchronized with the drive timing of an own microcomputer and synchronizing the drive timing of the plurality of microcomputers;

the plurality of microcomputers includes a receiver microcomputer as at least one microcomputer that receives the synchronization signal transmitted from the transmitter microcomputer;

the motor control method comprising:

causing the transmitter microcomputer to generate the synchronization signal and transmit the synchronization signal to the receiver microcomputer;

causing the receiver microcomputer to receive the synchronization signal from the transmitter microcomputer;

causing the receiver microcomputer to execute a received signal determination of determining normality or abnormality of the synchronization signal received;

causing the receiver microcomputer to permit a timing correction of correcting the drive timing of an own microcomputer to be synchronized with the synchronization signal received in response to that the synchronization signal is determined as being normal in the causing the receiver microcomputer to execute a received signal determination; and causing the receiver microcomputer to prohibit the timing correction and to drive the motor without synchronizing the drive timing with the transmitter microcomputer in response to that the synchronization signal is determined as being abnormal in the causing the receiver microcomputer to execute a received signal determination.

* * * * *